United States Patent
Miki

(10) Patent No.: US 9,463,381 B2
(45) Date of Patent: Oct. 11, 2016

(54) GAME APPARATUS, STORAGE MEDIUM, GAME SYSTEM AND GAME CONTROLLING METHOD

(75) Inventor: Kenji Miki, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 1418 days.

(21) Appl. No.: 12/980,689

(22) Filed: Dec. 29, 2010

(65) Prior Publication Data

US 2012/0077557 A1    Mar. 29, 2012

(30) Foreign Application Priority Data

Sep. 29, 2010  (JP) ................................ 2010-218244

(51) Int. Cl.
| | |
|---|---|
| A63F 9/24 | (2006.01) |
| A63F 13/426 | (2014.01) |
| A63F 13/573 | (2014.01) |
| A63F 13/2145 | (2014.01) |
| A63F 13/537 | (2014.01) |
| A63F 13/812 | (2014.01) |
| A63F 13/214 | (2014.01) |

(52) U.S. Cl.
CPC ........... *A63F 13/426* (2014.09); *A63F 13/214* (2014.09); *A63F 13/2145* (2014.09); *A63F 13/537* (2014.09); *A63F 13/573* (2014.09); *A63F 13/812* (2014.09); *A63F 2300/1075* (2013.01); *A63F 2300/204* (2013.01); *A63F 2300/6045* (2013.01); *A63F 2300/8011* (2013.01)

(58) Field of Classification Search
CPC ...... A63F 13/00; A63F 13/005; A63F 13/02; A63F 13/214; A63F 13/2145; A63F 13/812

USPC ......... 463/1, 3, 31, 37, 2; 345/427, 473, 474
See application file for complete search history.

(56) References Cited

U.S. PATENT DOCUMENTS 7,922,586 B2 * 4/2011 Heckendorf et al. ........... 463/42
8,096,876 B2 * 1/2012 Beaudry ......................... 463/31
(Continued)

FOREIGN PATENT DOCUMENTS

| JP | 2002-000939 | 1/2002 |
|---|---|---|
| JP | 2002000939 A * | 1/2002 |

(Continued)

OTHER PUBLICATIONS

Tiger Woods PGA Tour Manual, Nintendo DS, Released Nov. 22, 2004, <http://www.replacementdocs.com/download.php?view.3749>.*

(Continued)

*Primary Examiner* — David L Lewis
*Assistant Examiner* — Chase Leichliter
(74) *Attorney, Agent, or Firm* — Nixon & Vanderhye, P.C.

(57) ABSTRACT

A game apparatus includes a CPU, and the CPU executes game processing of a golf game, and displays a guide path of a circle a part of which is erased in a hitting operation. When the player performs a sliding operation in a clockwise direction so as to trace the guide path, and then inverts the sliding operation in a counterclockwise direction, the player character performs a swing motion according thereto. As to each of backswing, downswing and follow-through, precision, a speed, smoothness of the sliding operation are determined, and in accordance with the results, the movement of a ball is controlled.

28 Claims, 33 Drawing Sheets

(56) References Cited

U.S. PATENT DOCUMENTS

| | | | |
|---|---|---|---|
| 8,328,611 B2* | 12/2012 | Sano et al. ................. | 463/9 |
| 2005/0164794 A1 | 7/2005 | Tahara | |
| 2006/0030384 A1 | 2/2006 | Yoshizawa et al. | |
| 2006/0098015 A1* | 5/2006 | Boswell et al. ............. | 345/474 |
| 2006/0116203 A1* | 6/2006 | Nakada et al. ............. | 463/30 |
| 2006/0128468 A1* | 6/2006 | Yoshikawa et al. ........ | 463/36 |
| 2007/0111768 A1* | 5/2007 | Tipping et al. ............. | 463/6 |
| 2007/0156327 A1* | 7/2007 | Tipping et al. ............. | 701/200 |
| 2007/0262998 A1 | 11/2007 | Boswell et al. | |
| 2009/0163275 A1* | 6/2009 | Ishii et al. ................. | 463/31 |
| 2009/0170579 A1* | 7/2009 | Ishii et al. ................. | 463/2 |
| 2012/0077557 A1 | 3/2012 | Miki | |

FOREIGN PATENT DOCUMENTS

| | | |
|---|---|---|
| JP | 2005-049387 | 2/2005 |
| JP | 2005211242 A | 8/2005 |
| JP | 2006026167 A | 2/2006 |
| JP | 2006-136380 | 6/2006 |
| JP | 2006-181244 | 7/2006 |
| JP | 4213011 | 11/2008 |
| JP | 2010-088711 | 4/2010 |
| JP | 2012-040045 | 3/2012 |

OTHER PUBLICATIONS

"Touch Swing Controls", "New Function Utilizing a Touch Pen, Analog Swing", 4 pgs, English translation attached; URL:http://www.nintendo.co.jp/ds/software/atwj/index.html (retrieved Jul. 23, 2014).

"EA Sports Tiger Woods PGA Tour 2003", Dec. 31, 2002, pp. 1-26, 51, Retrieved from the Internet: URL:http://replacementdocs.com/request.php? 1127 (retrieved on May 22, 2013).

"Microsoft Golf 1998 Edition" in "LOGIN Aug. 8, 1998", vol. 17, No. 8, published by ASCII Corporation, on Aug. 1, 1998, p. 53 (partial English translation).

* cited by examiner

FIG. 6
(A)
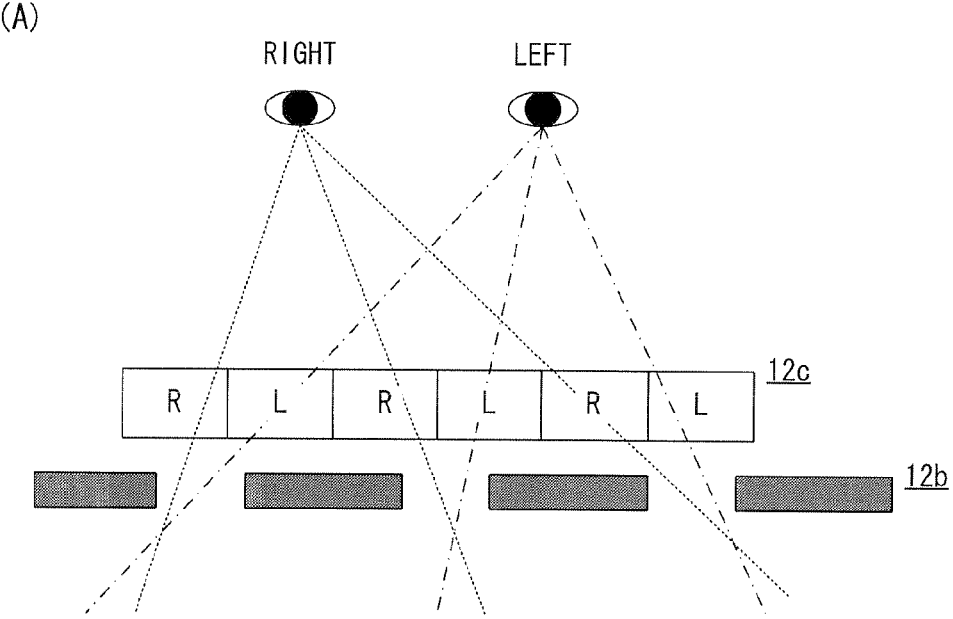
(B)
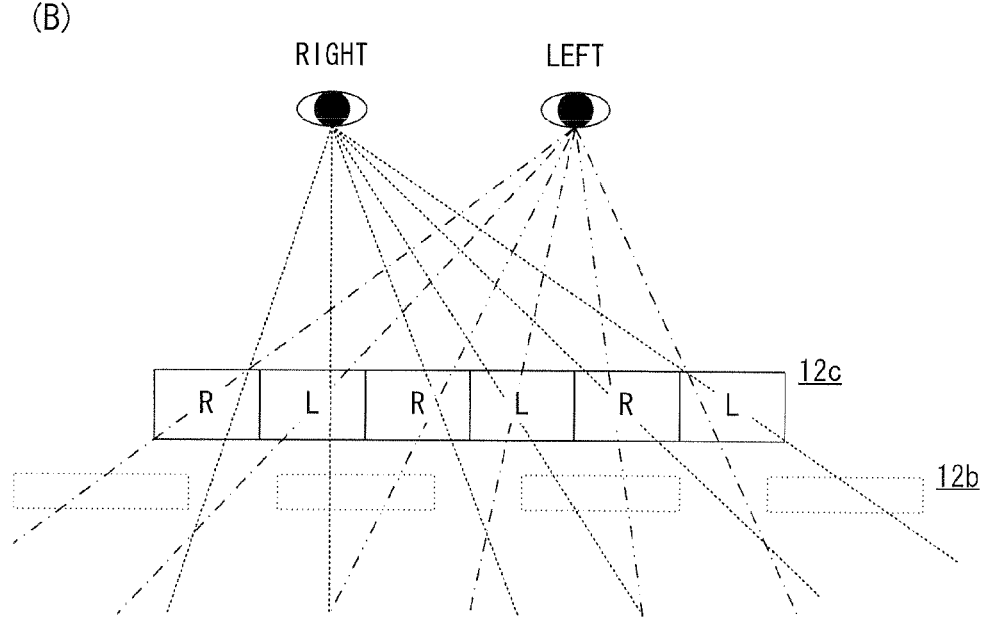

FIG. 9
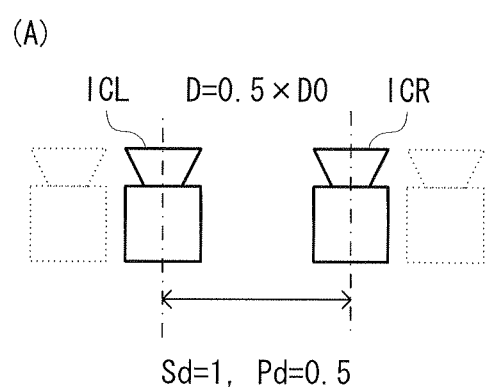
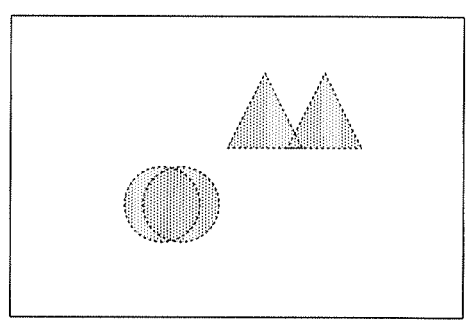

FIG. 10
(A)
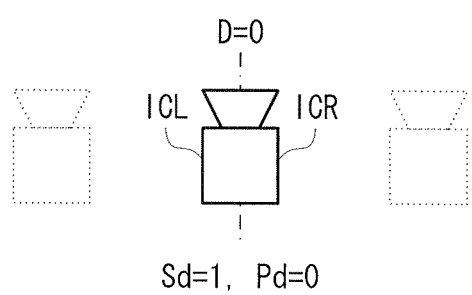
(B)
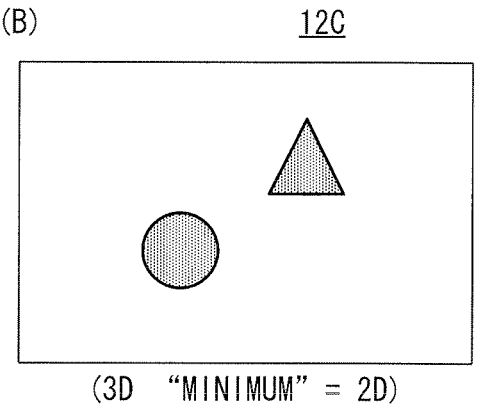

FIG. 11
(A) GAME SCREEN 100
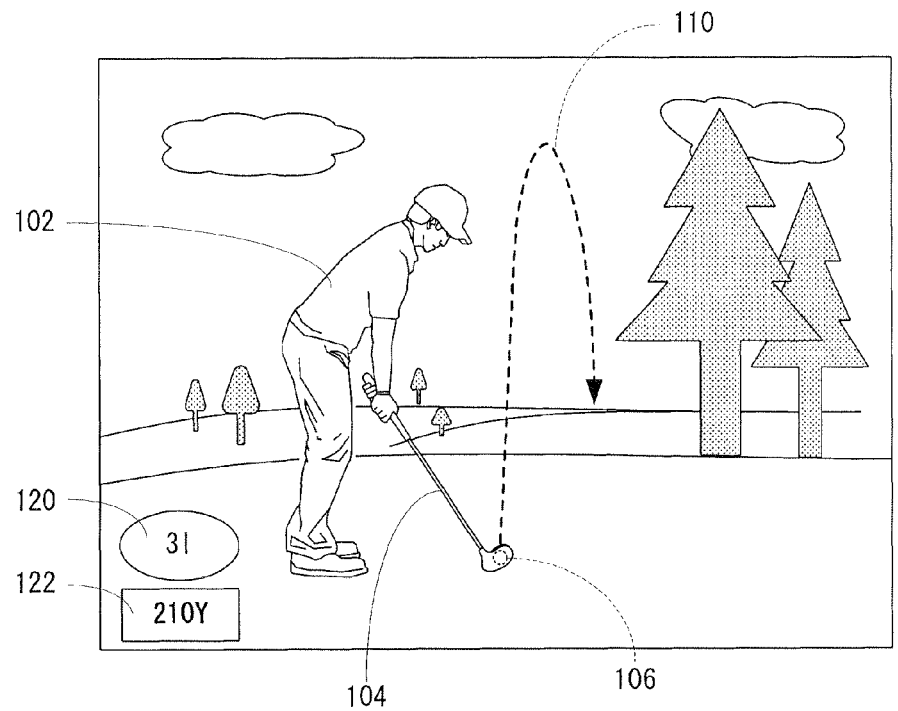
(B) OPERATING SCREEN 200
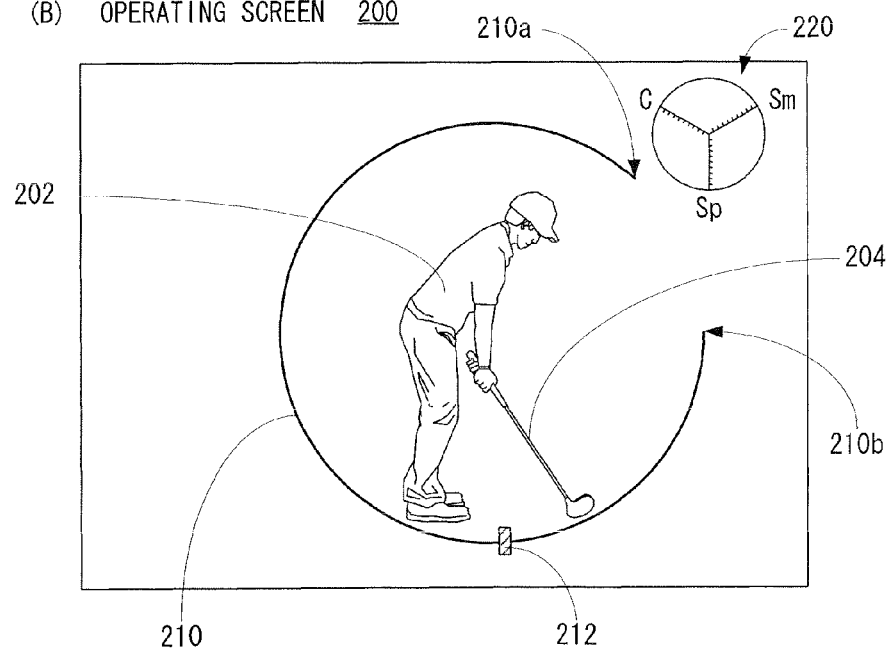

FIG. 12
(A) OPERATING SCREEN 200
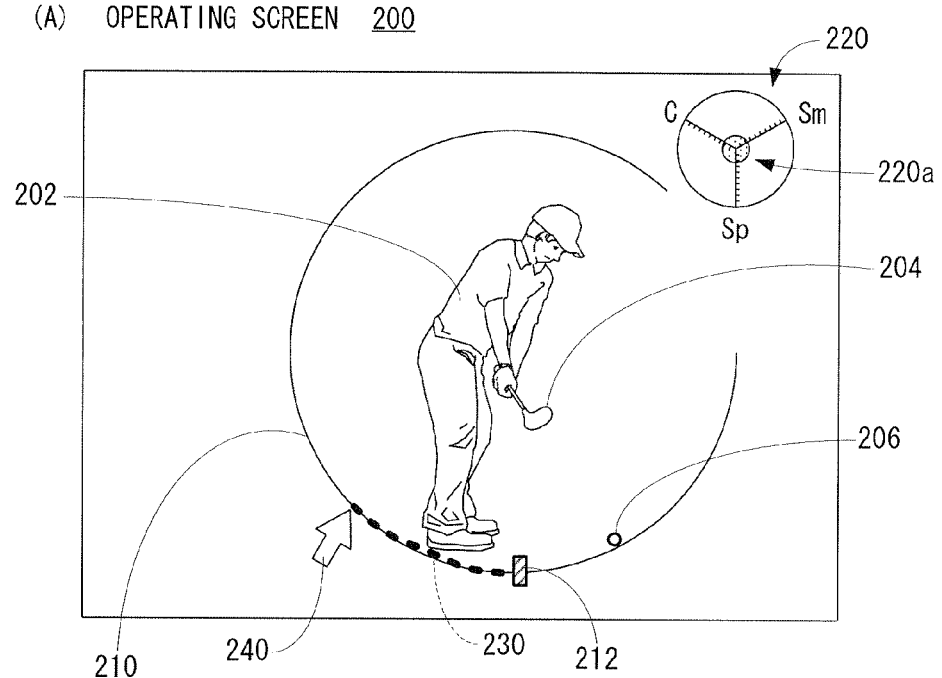
(B) OPERATING SCREEN 200
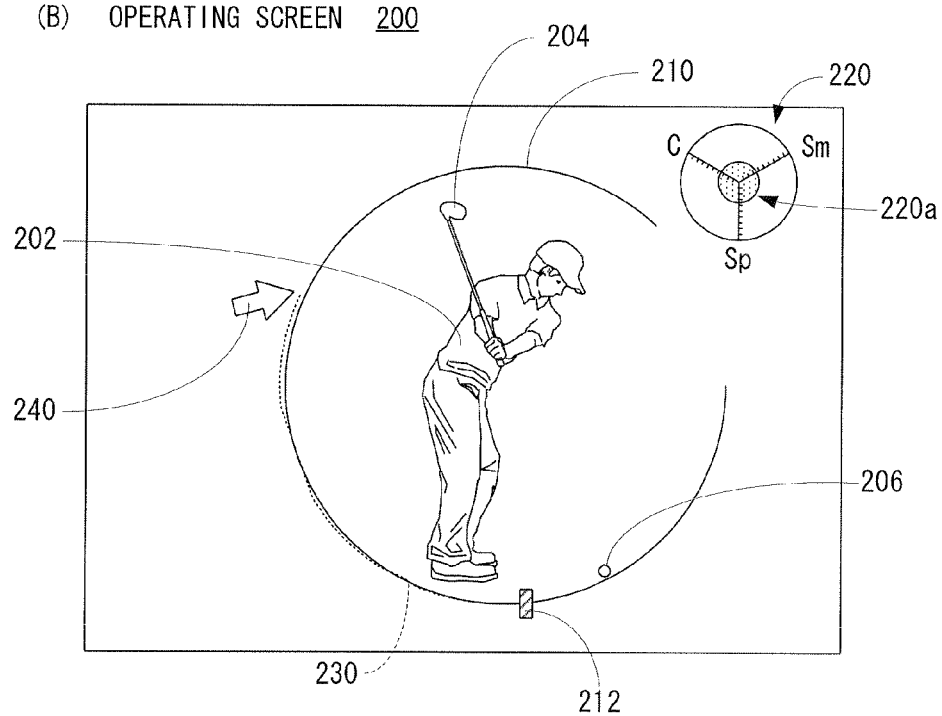

FIG. 13
(A) OPERATING SCREEN 200
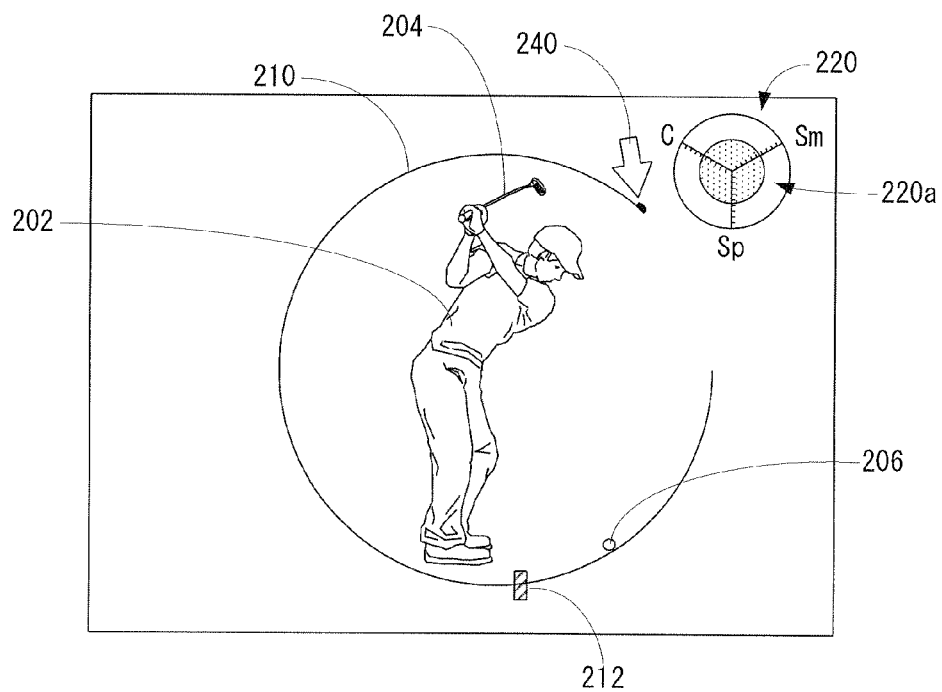
(B) OPERATING SCREEN 200
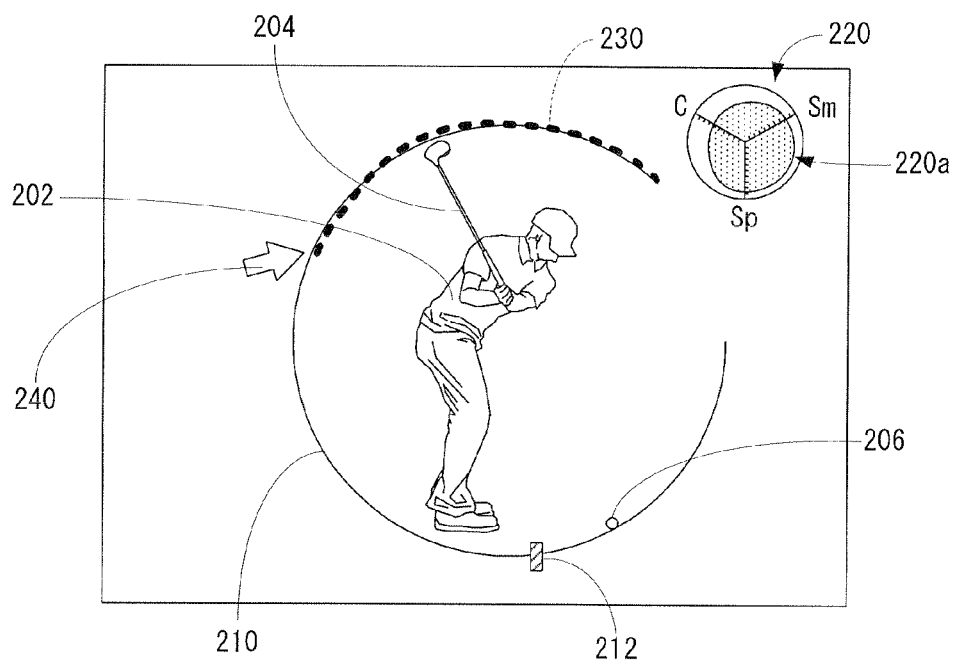

FIG. 14
(A) OPERATING SCREEN 200
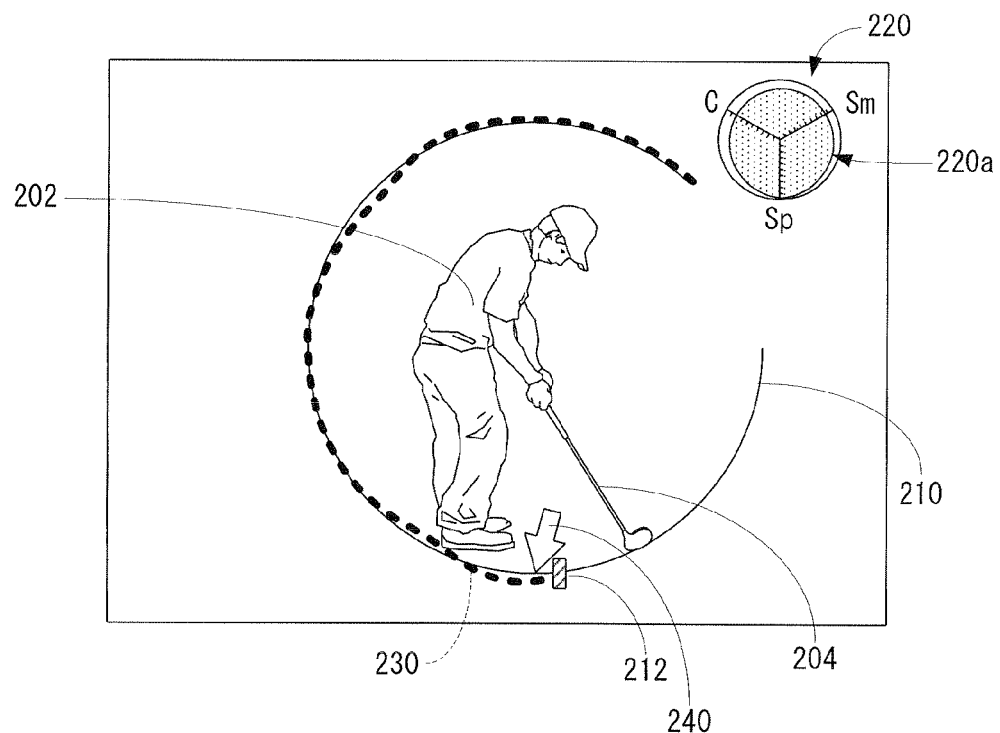
(B) OPERATING SCREEN 200
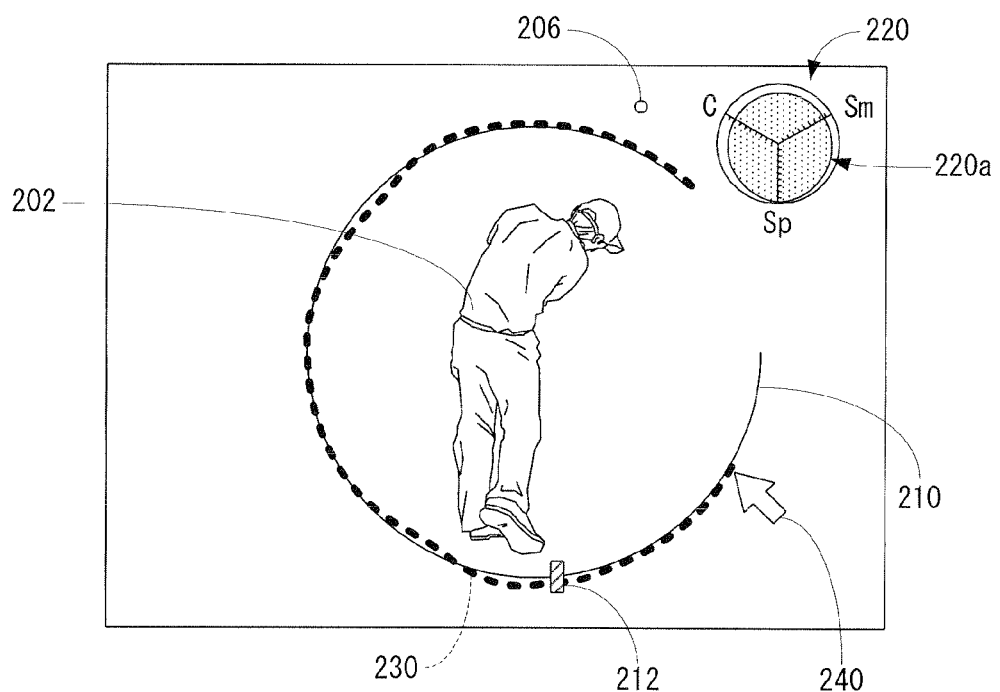

FIG. 15
(A) OPERATING SCREEN  200
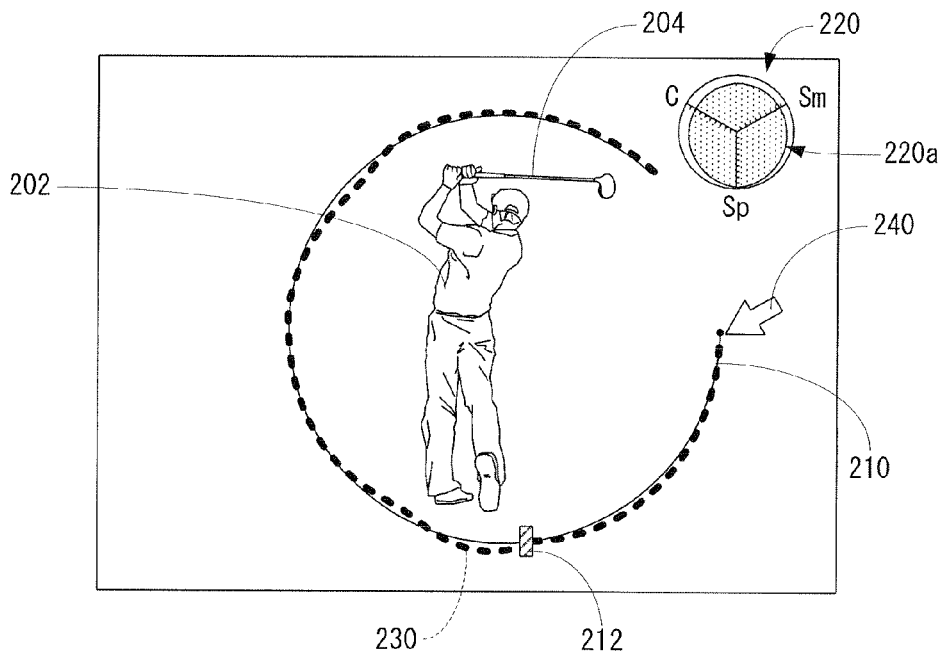
(B) OPERATING SCREEN  200
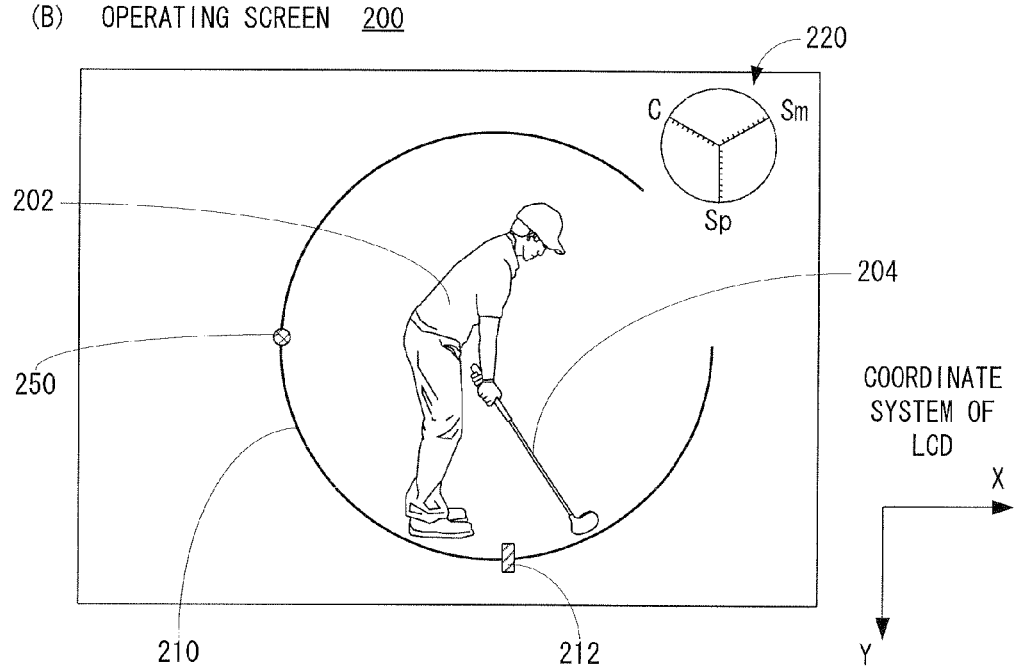
COORDINATE SYSTEM OF LCD FIG. 16
(A) OPERATING SCREEN 200
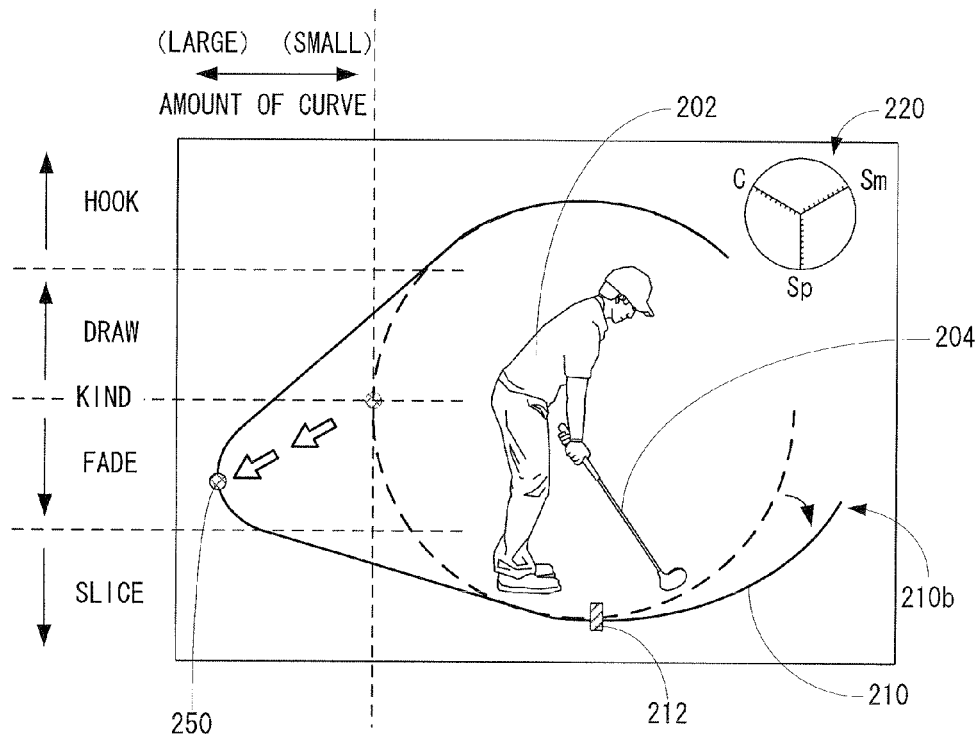
(B) OPERATING SCREEN 200
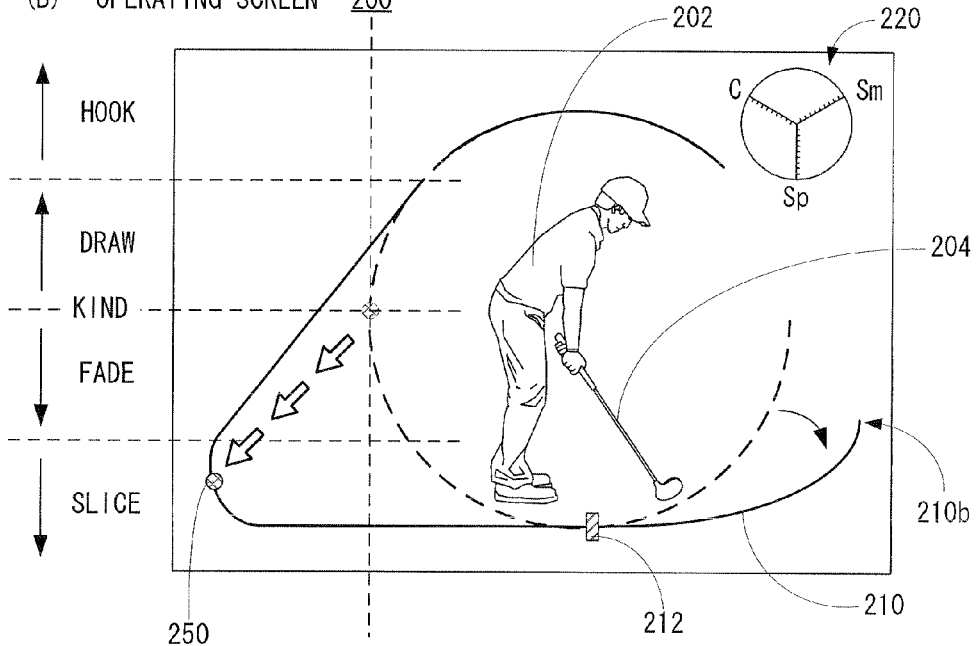

FIG. 17
(A) OPERATING SCREEN 200
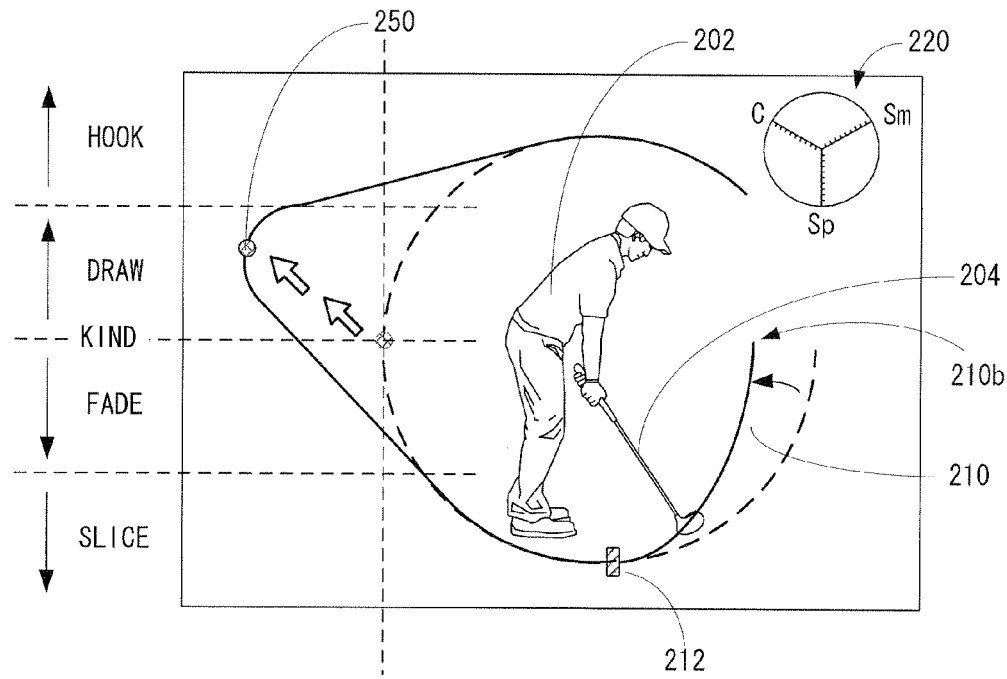
(B) OPERATING SCREEN 200
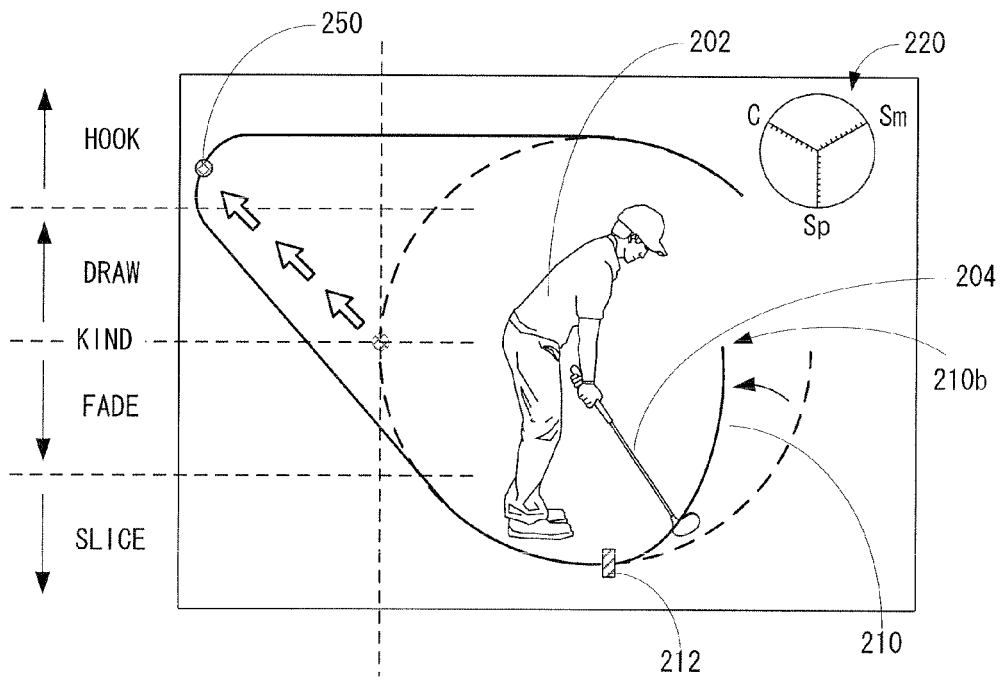

FIG. 18
(A) GUIDE PATH FOR BACKSWING
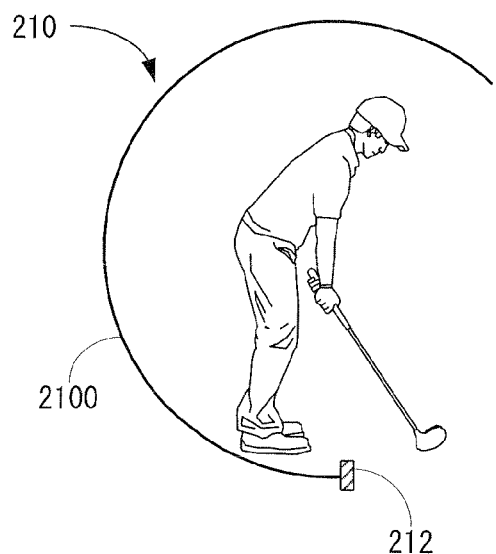
(B) GUIDE PATH FOR DOWNSWING AND FOLLOW-THROUGH
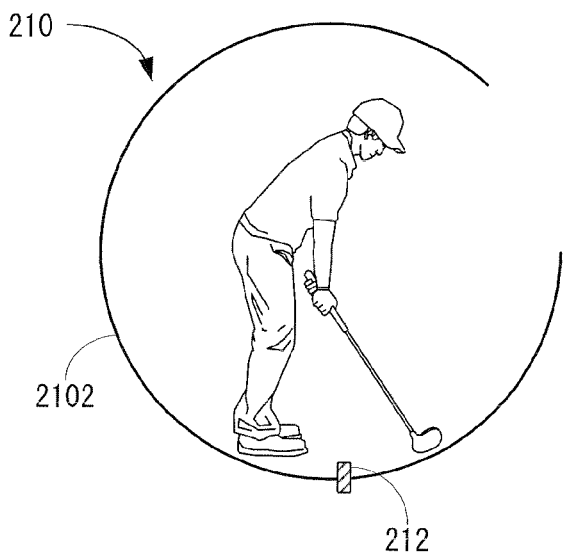

FIG. 19
(A) GAME SCREEN  100
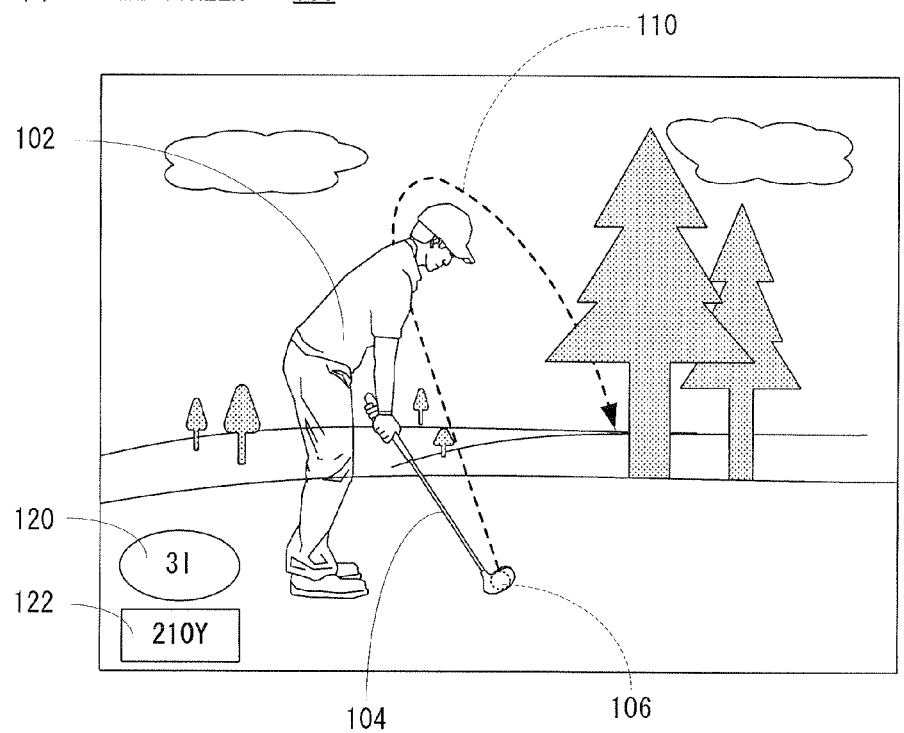
(B) GAME SCREEN  100
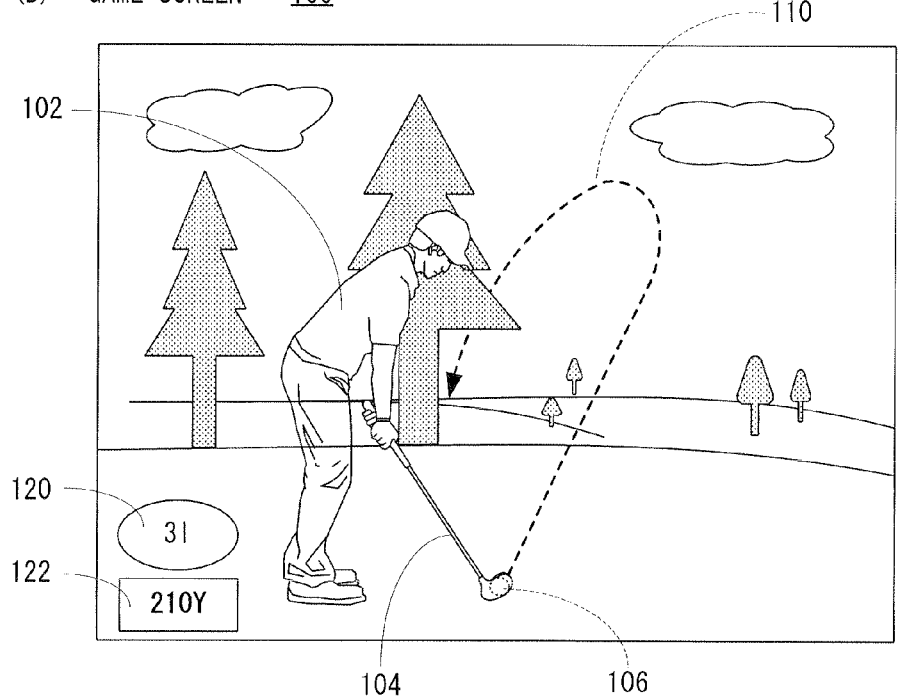

FIG. 20
(A) GUIDE PATH (MIDDLE)
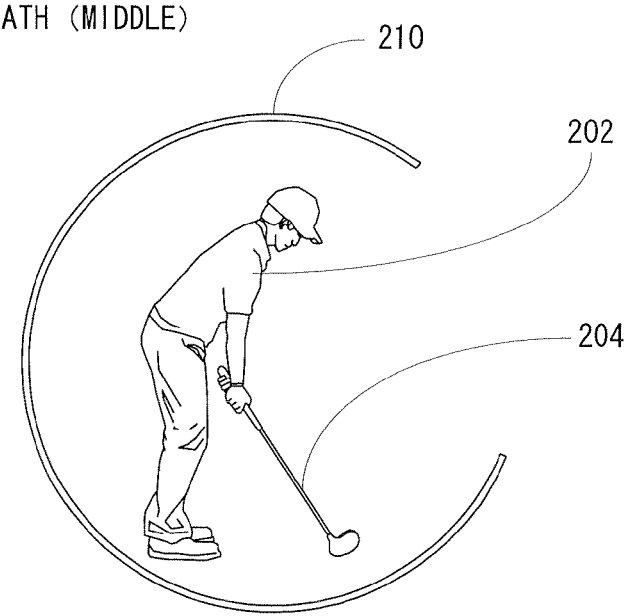
(B) GUIDE PATH (THICK)
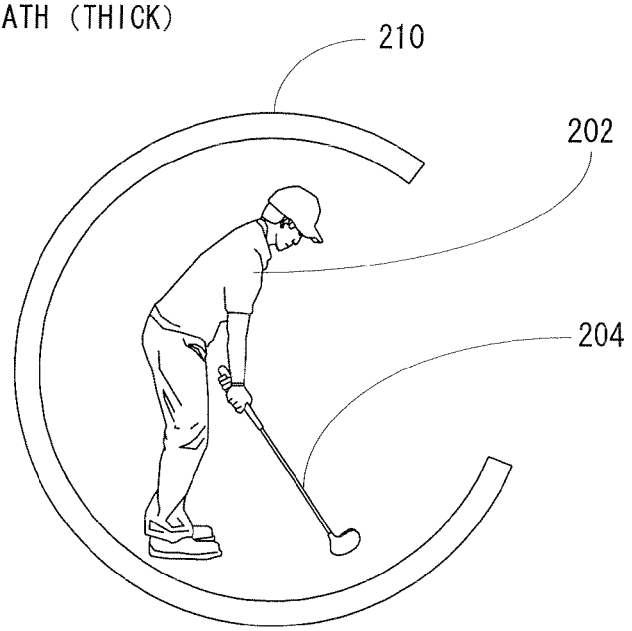

FIG. 22
(A) WHEN BACKSWING
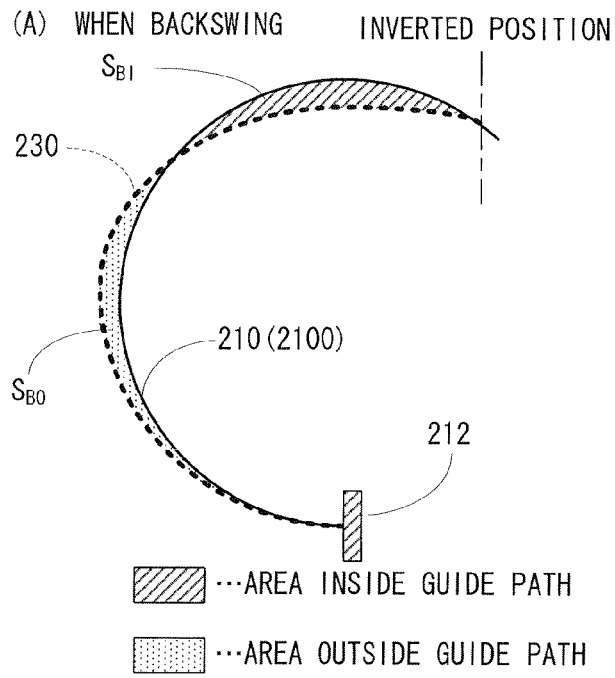
▨ ⋯AREA INSIDE GUIDE PATH
▦ ⋯AREA OUTSIDE GUIDE PATH
(B) WHEN DOWNSWING AND FOLLOW-THROUGH
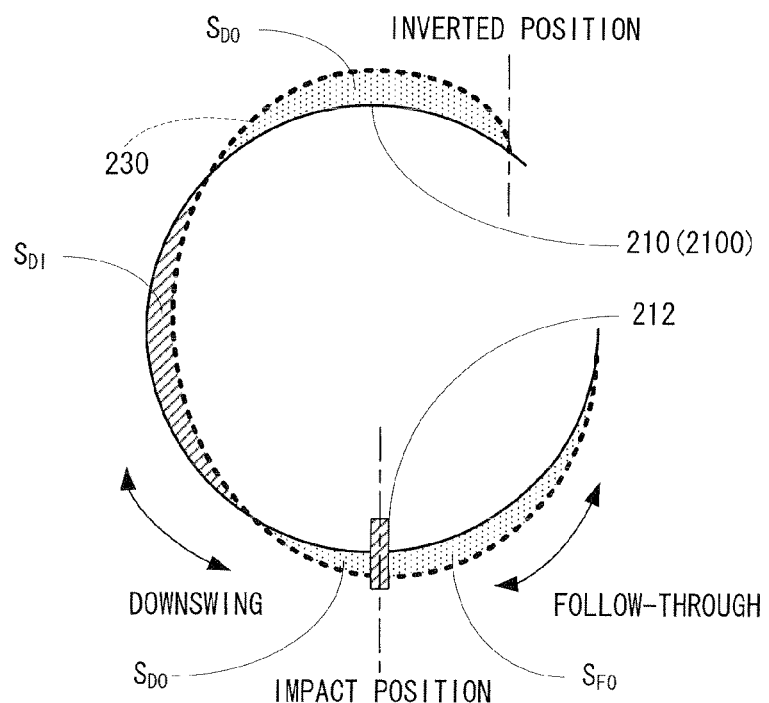

FIG. 23

(A) WEIGHTED TABLE IN CASE OF NORMAL SHOT

|  | BACKSWING | DOWNSWING | FOLLOW-THROUGH |
|---|---|---|---|
| CONTROL | 20% | 70% | 10% |
| SPEED | 20% | 70% | 10% |
| SMOOTH | 20% | 70% | 10% |

(B) WEIGHTED TABLE IN CASE OF INTENTIONAL SHOT

|  | BACKSWING | DOWNSWING | FOLLOW-THROUGH |
|---|---|---|---|
| CONTROL | 20% | 50% | 30% |
| SPEED | 20% | 50% | 30% |
| SMOOTH | 20% | 50% | 30% |

FIG. 25

| DATA MEMORY AREA 504 | |
|---|---|
| OPERATION DATA BUFFER | 504a |
| IMAGE DATA | 504b |
| SELECTED CLUB DATA | 504c |
| SHOT DIRECTION DATA | 504d |
| GUIDE PATH DATA | 504e |
| BALL TRAJECTORY DATA | 504f |
| WEIGHTED TABLE DATA | 504g |
| CURRENT COORDINATE DATA | 504h |
| PREVIOUS COORDINATE DATA | 504i |
| PRECISION DATA | 504j |
| SPEED DATA | 504k |
| SMOOTHNESS DATA | 504m |
| DEPICTED PATH DATA | 504n |
| BACKSWING RATIO DATA | 504p |
| IMPACT RESULT DATA | 504q |
| DIFFERENCE DATA | 504r |
| MISS SHOT DATA | 504s |
| INTENTIONAL SHOT FLAG | 504t |
| IN-SWING FLAG | 504u |
| BACKSWING FLAG | 504v |
| DOWNSWING FLAG | 504w |
| FOLLOW-THROUGH FLAG | 504x |
| ⋮ | |

FIG. 33
(A) GAME SCREEN 100
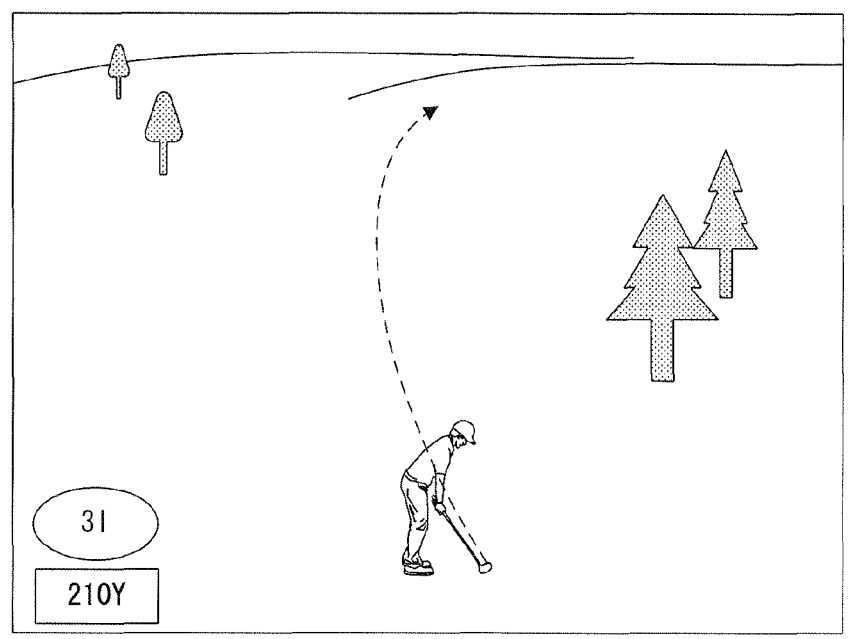
(B) OPERATING SCREEN 200
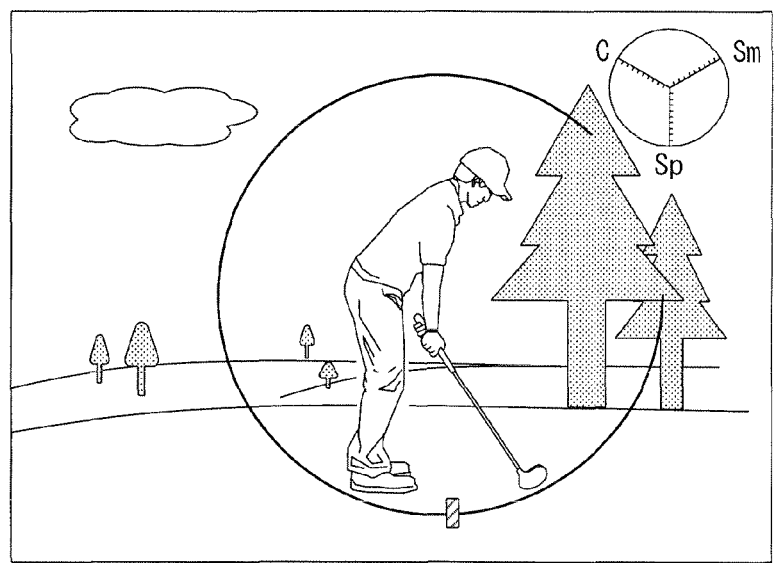

GAME APPARATUS, STORAGE MEDIUM, GAME SYSTEM AND GAME CONTROLLING METHOD

CROSS REFERENCE OF RELATED APPLICATION

The disclosure of Japanese Patent Application No. 2010-218244 is incorporated herein by reference.

BACKGROUND OF THE INVENTION

1. Field of the Invention

The present invention relates to a game apparatus, a storage medium, a game system and a game controlling method. More specifically, the present invention relates to a game apparatus, a storage medium, a game system and a game controlling method that utilizes a pointing device such as a touch panel.

2. Description of the Related Art

One example of a game apparatus of this kind is disclosed in Japanese patent No. 4213011 [A63F 13/00] (Document 1) printed in the patent gazette dated Nov. 7, 2008. In the game apparatus of the Document 1, in a case that a shot motion of the golf game is performed, a power gauge is displayed, and an operation by an operation button is performed three times. The first operation is a shot starting operation, the second operation is a power deciding operation, and a third operation is an impact position deciding operation. More specifically, a cursor moving inside the horizontally-long power gauge starts to move in the left direction at the first operation. When the second operation is performed before the cursor reaches the left end, the power of a shot is set, and then, the cursor move in the right direction. Then, by the third operation, an impact position is decided.

However, in the game apparatus disclosed in the Document 1, by the timing of button operation, a carry and an impact position are decided, and therefore, it is impossible to have a feeling of playing an actual golf. That is, it is difficult to have a feeling of implementing a nice shot by performing a precise swing.

SUMMARY OF THE INVENTION

Therefore, it is a primary object of the present invention to provide a novel game apparatus, a novel storage medium, a novel game system and a novel game controlling method.

Furthermore, another object of the present invention is to provide a game apparatus, a storage medium, a game system and a game controlling method capable of providing a novel operation by utilizing a pointing device.

In addition, the other object of the present invention is to provide a game apparatus, a storage medium, a game system and game controlling method capable of playing a golf game increased in interest.

A first invention is a game apparatus having a displayer, a touch panel, a touched position acquirer, a first determiner, a second determiner, a movement processor, and a display controller. The displayer displays a game image. The touch panel is provided on the displayer. The touched position acquirer acquires a position of a touch input relative to the touch panel. The first determiner determines, when a first slide input of moving a touched position in a first direction along a predetermined path is performed on the touch panel, how the touched position is along the predetermined path. The second determiner determines, when a second slide input of moving the touched position in a second direction opposed to the first direction along the predetermined path is performed following the first slide input, how the touched position is along the predetermined path. The movement processor performs processing of moving a predetermined object within a game space at least on the basis of determination results by the first determiner and the second determiner. The display controller displays a game space on the displayer.

According to the first invention, after a first slide input is performed along a predetermined path in a first direction, a second slide input in a direction opposed to the first direction is performed, and the predetermined object is moved depending on how each slide input is along the predetermined path, and therefore, it is possible to provide a game apparatus which performs a novel operation by utilizing the touch panel.

A second invention is according to the first invention, and the game apparatus further comprises a path setter which sets the path by a curve with a predetermined thickness in a touch area of the touch panel. Each of the first determiner and the second determiner determines whether or not the touched position is on the path.

According to the second invention, the path is set by a curve with a predetermined thickness, and therefore, depending on how the touch input when repetitive motions are designated is along the path, it is possible to move the predetermined object.

A third invention is according to the second invention, and the game apparatus further comprises a path changer which changes a thickness of the path on the basis of a selecting operation by a player. The movement processor, when a fine curve is selected, moves the object at a speed higher than a speed when a bold curve is selected. That is, in a case that a touch input is performed along the predetermined path, it is considered that an operation is more difficult for the fine curve than for the bold curve, and in this case, the object is moved at a higher speed.

According to the third invention, the moving speed of the object is changed by the thickness of the predetermined path, and consequently, depending on how a touch operation is performed, it is possible to change the moving speed of the object.

A fourth invention is according to the first invention, and the game apparatus further comprises a path transformer which transforms the path on the basis of a designation from a player before the first slide input. The movement processor changes a moving direction of the object in correspondence with a transformation of the path.

According to the fourth invention, by transforming the path, the moving direction of the object is changed, and therefore, it is possible to attack the game taking the route when the object is moved into consideration.

A fifth invention is according to the fourth invention, wherein the predetermined path includes a first path for performing the first slide input in the first direction and a second path for performing the second slide input in the second direction. The path transformer transforms only the second path.

According to the fifth invention, only the second path of the predetermined path is changed, and therefore, it is possible to exert an influence on the moving direction of the object depending on how to perform the second slide input.

A sixth invention is according to the fourth invention, wherein the movement processor decides an amount of change of the moving direction of the object in correspondence with the degree of transformation of the path.

According to the sixth invention, the change amount of the moving direction of the object is decided depending on the degree of transformation of the path, capable of setting the route along which the object is moved.

A seventh invention is according to the first invention, and the game apparatus further includes a pass judger which judges whether or not the touched position passes through a predetermined position of the path. The movement processor starts to move the object when the pass judger judge that the touched position passes through the predetermined position of the path.

According to the seventh invention, in a case that the path of the touched position passes through the predetermined position of the path, the movement of the object is started, and therefore, it is possible to perform the start of movement of the object by a touch operation. Thus, there is no need of separately operating a button, etc., allowing for an easy operation.

An eighth invention is according to the seventh invention, wherein a pass judging area with a predetermined width is provided at the predetermined position in a direction orthogonal to the path. The pass judger further judges whether or not the touched position passes through the pass judging area, and the movement processor moves the object irrespective of determination results by the first determiner and said second determiner when said pass judger judges that said touched position does not pass through the pass judging area.

According to the eighth invention, in a case that the touched position does not pass through the pass judging area, the object is moved irrespective of whether or not the touched position is along the predetermined path, and therefore, it is possible to move the object in a direction and at a speed that are not intended by the player, for example.

A ninth invention is according to the first invention, and the game apparatus further comprises a speed detector which detects a moving speed of the touched position. The movement processor further controls a moving speed of the object on the basis of the moving speed of the touched position detected by the speed detector.

According to the ninth invention, depending on the moving speed of the touched position, the moving speed of the object is changed, and therefore, it is possible to control the moving speed of the object depending on how to perform a touch operation by the player.

A tenth invention is according to the ninth invention, and the game apparatus further comprises a moving speed change detector which detects a change of the moving speed of the touched position detected by the speed detector. The movement processor moves the object irrespective of the determination result by the first determiner and the second determiner when the moving speed change detector determines that the change of the moving speed is equal to or more than a predetermined amount.

According to the tenth invention, similar to the eighth invention, it is possible to move the object in a direction and at a speed that are not intended by the player.

An eleventh invention is according to the first invention, wherein the object is an object of a golf ball, and further comprising a character controller which controls a motion of a character which performs a simulation of a golf shot within the game space. The character controller displays the character by an animation of a backswing motion while the first slide input is performed, and displays the character by an animation of at least a downswing motion while the second slide input is performed.

According to the eleventh invention, in the golf game, a swing motion of the character is displayed by an animation according to a touch operation, and depending on the determination result, the movement of the golf ball is controlled, and therefore, it is possible to reflect the operation by the player on the swing motion by the character in the golf game, and in accordance therewith, the golf ball is moved. It can be said that precisely tracing the path with a freehand touch operation is a difficult input, but precisely swinging in the actual golf also accompanies difficulties. Accordingly, in the input of this embodiment, it is possible to obtain feeling of tension and operability as if the player plays the actual golf. Thus, it is possible to increase interest of playing the golf game.

A twelfth invention is a game apparatus, comprising: a displayer which displays a game image; a pointing device provided in relative to the displayer; an input position acquirer which acquires an input position on the displayer designated by the pointing device; a first determiner which, when a first slide input of moving an input position acquired by the input position acquirer in a first direction along a predetermined path is performed, determines how the input position is along the predetermined path; a second determiner which, when a second slide input of moving the input position in a second direction opposed to the first direction along the predetermined path is performed following the first slide input, determines how the input position is along the predetermined path; a movement processor which performs processing of moving a predetermined object within a game space at least on the basis of determination results by the first determiner and the second determiner, and a display controller which displays a game space on the displayer.

According to the twelfth invention as well, similar to the first invention, it is possible to provide a game apparatus which performs a novel operation by utilizing the pointing device.

A thirteenth invention is a storage medium storing a game program of a game apparatus having a displayer for displaying a game image and a touch panel provided on the displayer, the game program causes a computer of the game apparatus to function as: a touched position acquirer which acquires a position of a touch input relative to the touch panel; a first determiner which, when a first slide input of moving a touched position in a first direction along a predetermined path is performed on the touch panel, determines how the touched position is along the predetermined path; a second determiner which, when a second slide input of moving the touched position in a second direction opposed to the first direction along the predetermined path is performed following the first slide input, determines how the touched position is along the predetermined path; a movement processor which performs processing of moving a predetermined object within a game space at least on the basis of determination results by the first determiner and the second determiner, and a display controller which displays a game space on the displayer.

In the thirteenth invention as well, similar to the first invention, it is possible to provide a game program which performs a novel operation by utilizing the touch panel.

A fourteenth invention is storage medium storing a game program of a game apparatus having a displayer displaying a game image and a pointing device provided in relative to the displayer, the game program causes a computer of the game apparatus to function as: an input position acquirer which acquires an input position on the displayer designated by the pointing device; a first determiner which, when a first slide input of moving an input position acquired by the input position acquirer in a first direction along a predetermined path is performed, determines how the input position is along the predetermined path; a second determiner which, when a second slide input of moving the input position in a second direction opposed to the first direction along the predetermined path is performed following the first slide input, determines how the input position is along the predetermined path; a movement processor which performs processing of moving a predetermined object within a game space at least on the basis of determination results by the first determiner and the second determiner, and a display controller which displays a game space on the displayer.

In the fourteenth invention as well, similar to the first invention, it is possible to provide a game program which performs a novel operation by utilizing a pointing device.

A fifteenth invention is a game system, comprising: a displayer which displays a game image; a touch panel provided on the displayer; a touched position acquirer which acquires a position of a touch input performed on the touch panel; a first determiner which, when a first slide input of moving a touched position in a first direction along a predetermined path is performed on the touch panel, determines how the touched position is along the predetermined path; a second determiner which, when a second slide input of moving the touched position in a second direction opposed to the first direction along the predetermined path is performed following the first slide input, determines how the touched position is along the predetermined path; a movement processor which performs processing of moving a predetermined object within a game space at least on the basis of determination results by the first determiner and the second determiner, and a display controller which displays a game space on the displayer.

According to the fifteenth invention as well, similar to the first invention, it is possible to provide a game system which performs a novel operation by utilizing the touch panel.

A sixteenth invention is a game system, comprising: a displayer which displays a game image; a pointing device provided in relative to the displayer; an input position acquirer which acquires an input position on the displayer designated by the pointing device; a first determiner which, when a first slide input of moving an input position acquired by the input position acquirer in a first direction along a predetermined path is performed, determines how the input position is along the predetermined path; a second determiner which, when a second slide input of moving the input position in a second direction opposed to the first direction along the predetermined path is performed following the first slide input, determines how the input position is along the predetermined path; a movement processor which performs processing of moving a predetermined object within a game space at least on the basis of determination results by the first determiner and the second determiner, and a display controller which displays a game space on the displayer.

In the sixteenth invention as well, similar to the first invention, it is possible to provide a game system which performs a novel operation by utilizing the pointing device.

A seventeenth invention is a game controlling method of a game apparatus having a displayer displaying a game image and a touch panel provided on the displayer, following steps of: (a) acquiring a position of a touch input relative to the touch panel; (b) determining, when a first slide input of moving a touched position in a first direction along a predetermined path is performed on the touch panel, how the touched position is along the predetermined path; (c) determining, when a second slide input of moving the touched position in a second direction opposed to the first direction along the predetermined path is performed following the first slide input, how the touched position is along the predetermined path; (d) performing processing of moving a predetermined object within a game space at least on the basis of determination results by the step (b) and the step (c); and (e) displaying a game space on the displayer.

According to the seventeenth invention as well, similar to the first invention, it is possible to provide a game controlling method which performs a novel operation by utilizing the touch panel.

An eighteenth invention is a game controlling method having a displayer displaying a game image and a pointing device provided relative to the displayer, including following steps of: (a) acquiring an input position on the displayer designated by the pointing device; (b) determining, when a first slide input of moving an input position acquired by the input position acquirer in a first direction along a predetermined path is performed, how the input position is along the predetermined path; (c) determining, when a second slide input of moving the input position in a second direction opposed to the first direction along the predetermined path is performed following the first slide input, how the input position is along the predetermined path; (d) performing processing of moving a predetermined object within a game space at least on the basis of determination results by the step (b) and the step (c); and (e) displaying a game space on the displayer.

In the eighteenth invention as well, similar to the first invention, it is possible to provide a game controlling method which performs a novel operation by utilizing the pointing device.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an illustrative view for explaining a principle of a 3D/2D display in a parallax barrier system, FIG. 6(A) shows a state that a parallax barrier is turned on (3D display), and FIG. 6(B) shows a state that a parallax barrier is turned off (2D display);

FIG. 8(A) shows a left image of a VRAM, FIG. 8(B) shows a right image of the VRAM, and FIG. 8(C) shows a stereoscopic image (3D up to maximum of) on an upper LCD;

FIG. 9 is an illustrative view explaining a change of a stereoscopic image according to a distance-between cameras, FIG. 9(A) shows one example of the distance-between cameras (0.5×D0), and FIG. 9(B) shows a stereoscopic image corresponding to the relevant distance (3D is middle);

FIG. 10 is an illustrative view explaining a 3D adjustment according to the distance-between cameras, FIG. 10(A) shows another example of the distance-between cameras (minimum value 0), and FIG. 10(B) shows a stereoscopic image corresponding to the relevant distance (3D is minimum=2D);

FIG. 11 is an illustrative view showing one example of a game screen to be displayed on the stereoscopic LCD and an operating screen to be displayed on the lower LCD in a case that a hitting operation is performed;

FIG. 12 is an illustrative view showing an example in a case that a backswing is designated on the operating screen;

FIG. 13 is an illustrative view showing an example in a case that a downswing is designated on the operating screen;

FIG. 14 is an illustrative view showing an example in a case that a follow-through is designated on the operating screen;

FIG. 15 is an illustrative view showing an example in a case that a swing (sliding operation) is ended on the operating screen and an operating screen in a case that the guide path is transformed;

FIG. 16 is an illustrative view showing another example of the operating screen in a case that the guide path is transformed;

FIG. 17 is an illustrative view showing another example of the operating screen in a case that the guide path is transformed;

FIG. 18 is an illustrative view showing a guide path for backswing and a guide path for downswing and follow-through;

FIG. 19 is an illustrative view showing a situation in which an estimated trajectory on the game screen is changed in accordance with the transformation of the guide path;

FIG. 20 is an illustrative view showing another kind of the guide path;

FIG. 22 is an illustrative view showing a difference between a depicted path by a sliding operation and a guide path;

FIG. 23 is an illustrative view showing weighted tables in a case of a normal shot and in a case of an intentional shot;

FIG. 25 is an illustrative view showing a specific content of a data memory area shown in FIG. 24;

FIG. 33 is illustrative view showing another example of the game screen to be displayed on the stereoscopic LCD and the operating screen to be displayed on the lower LCD in a case that a hitting operation is performed.

DETAILED DESCRIPTION OF THE PREFERRED EMBODIMENTS

Figure 1:
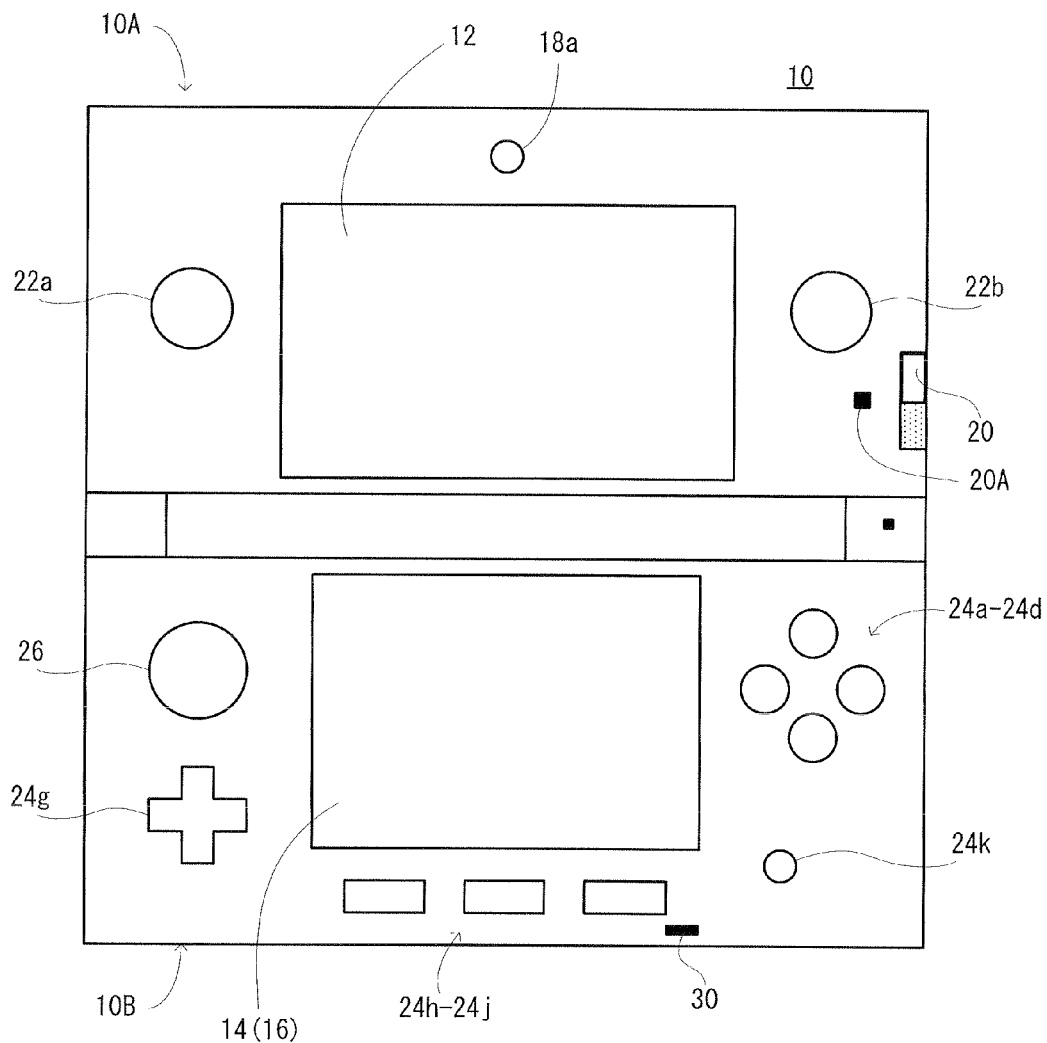
FIG. 1 is an external view of a game apparatus of one embodiment of the present invention, and shows a top surface in an open state.
Figure 2:
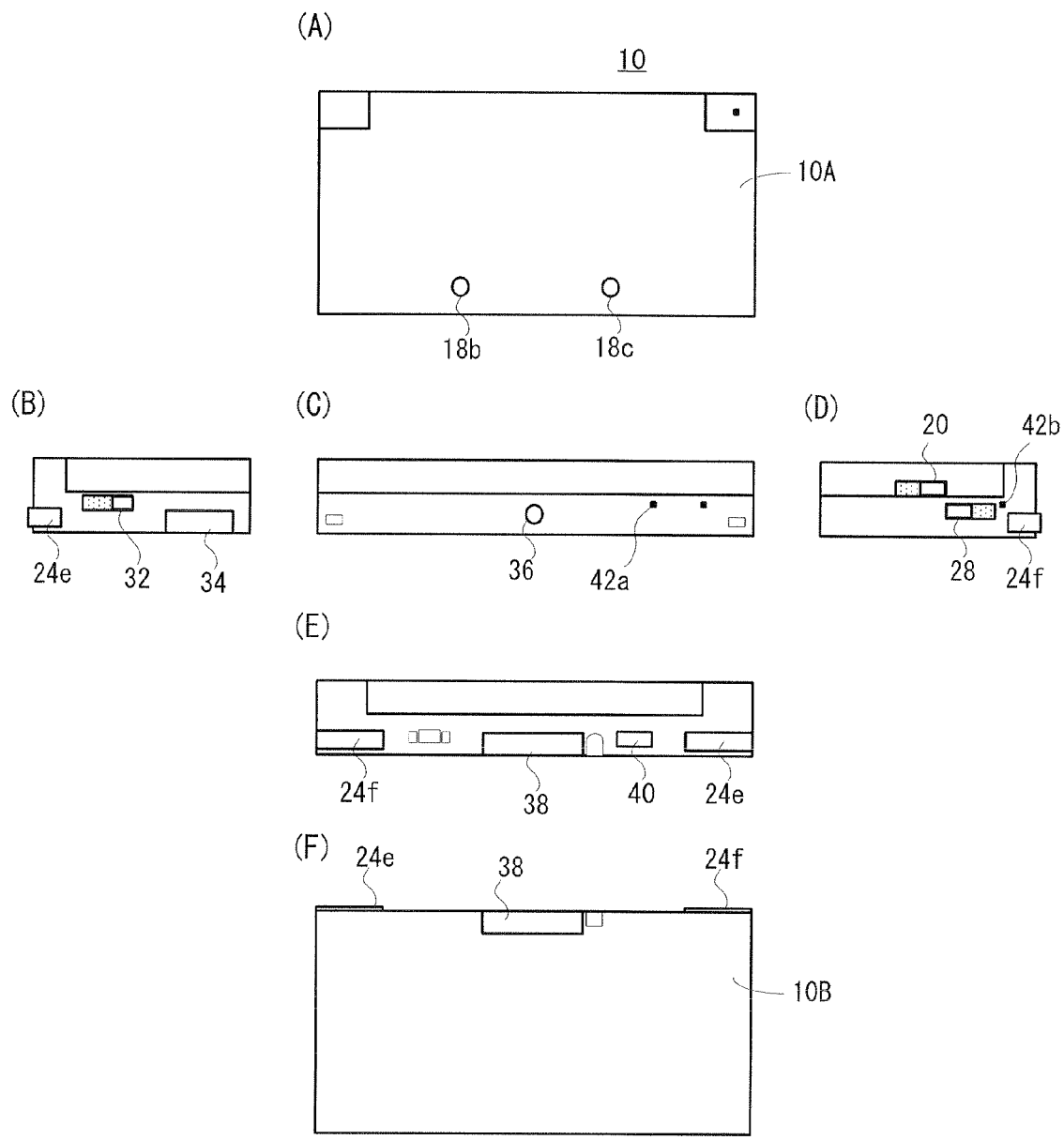
FIG. 2 is an external view of the game apparatus, FIG. 2 (A) shows a top surface in a close state, FIG. 2 (B) shows a left side surface in the close state, FIG. 2 (C) is a front surface in the close state, FIG. 2 (D) is a right side surface in the close state, FIG. 2 (E) shows a back surface in the close state, and FIG. 2 (F) shows a bottom surface in the closed state.

In FIG. 1 and FIG. 2, an appearance of a game apparatus 10 of one embodiment of the present invention is shown. The game apparatus 10 is a foldable game apparatus, FIG. 1 shows a top view of the game apparatus 10 in an open state, FIG. 2 (A) to FIG. 2 (F) respectively show a top surface, a left side surface, a front surface, a right side surface, a back surface and a bottom surface of the game apparatus 10 in a closed state.

The game apparatus 10 has an upper housing 10A and a lower housing 10B that are rotatably connected with each other as shown in FIG. 1, and on a top surface of the upper housing 10A, a stereoscopic LCD 12 compliant with an autostereoscopic display, an inward camera 18a, a 3D adjusting switch 20, a 3D lamp 20A, right and left speakers 22a and 22b, etc. are provided. On a top surface of the lower housing 10B, a lower LCD 14 attached with touch panel 16, A, B, X, Y buttons 24a-24d, a cross key (button) 24g, home, select, start buttons 24h-24j, a power button 24k, an analog pad 26, and a microphone 30 are provided.

Furthermore, as shown in FIG. 2 (A), on a top surface of the game apparatus 10 (reverse side of the upper housing 10A shown in FIG. 1), right and left outward cameras 18b and 18c compliant with 3D imaging are provided. Furthermore, as shown in FIG. 2 (C), on a front surface of the game apparatus 10, a headphone terminal 36, a power lamp 42a, etc. are provided. Also, as shown in FIG. 2 (B), FIG. 2 (E) and FIG. 2 (D), from a left side surface to a back surface of the game apparatus 10, an L button 24e is provided, and from a right side surface to a back surface, an R button 24f is provided. Moreover, on the left side surface of the game apparatus 10, a volume control switch 32, an SD card slot 34, etc. are provided, and on the right side surface of the game apparatus 10, a wireless switch 28, a wireless lamp 42b, etc. are provided. The above-described 3D adjusting switch 20 is exposed from the right side surface. In addition, on the back surface of the game apparatus 10, an infrared ray emitting-receiving portion 40, etc. is provided. Then, as shown in FIG. 2 (E) and FIG. 2 (F), from the back surface to a bottom surface, a game card slot 38 is provided.

The stereoscopic LCD 12 is a 3D liquid crystal (see FIG. 6) according to a parallax barrier system, and displays a stereoscopic image without any glasses (autostereoscopic image). On the stereoscopic LCD 12, by turning a parallax barrier of the liquid crystal off, a planar image display is also made possible. It should be noted that a lenticular system utilizing a sheet with concaves/convexes (lenticular lens) and other autostereoscopic 3D systems may be adopted without being restricted to the parallax barrier system.

The inward camera 18a images a planar image (2D image) while the outward cameras 18b and 18c image stereoscopic images (3D image). A 2D or 3D image imaging the player can be used as an image input to an application program such as a game program. In this case, the game program 72 detects movements of a face, a hand and a gazing direction (direction of eyeballs) of the player by performing image recognition, and executes processing corresponding to the detection result. The 2D image by the inward camera 18a can be displayed on the lower LCD 14, and the 3D images by the outward cameras 18b and 18c can be displayed on the stereoscopic LCD 12.

Figure 3:
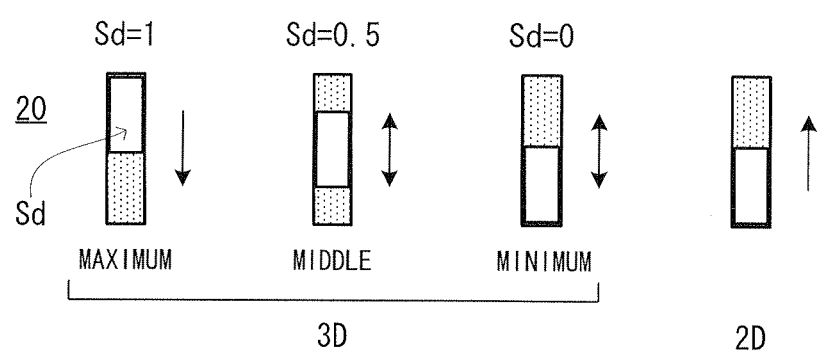
FIG. 3 is an illustrative view for explaining an operation of a 3D adjusting switch.

The 3D adjusting switch 20 manually switches the display of the stereoscopic LCD 12 between the 3D display and the 2D display, and is a slide switch for manually adjusting a three-dimensional effect in the 3D display as well and operates as shown in FIG. 3, for example. The three-dimensional effect of the 3D display becomes a maximum (Sd=1) when the slider Sd is at an upper end, decrease as the slider Sd is moved down, and becomes a minimum (Sd=0) when at a lower end in this embodiment. Then, the 3D display changes to the 2D display when the slider Sd is moved down to the lower end.

Although the detailed description is made later, such a change of the three-dimensional effect of the 3D display is implemented by changing the distance (distance-between cameras D) between the right and left virtual cameras (ICL and ICR: see FIG. 7) arranged within the virtual space (see FIG. 7-FIG. 10). That is, according to an operation of the 3D adjusting switch 20, the distance-between cameras D is adjusted. Then, the distance-between cameras D receives an automatic adjustment (described later) by the game program as well as the manual adjustment.

The 3D lamp 20A is a lamp showing a displaying condition of the stereoscopic LCD 12, and lights up in the 3D display and light off in the 2D display. Here, it may be changed in brightness and color in correspondence with the degree of the 3D display (intensity of the three-dimensional effect) as well as it merely lights up and off.

An operation to the touch panel 16, the A, B, X, Y buttons 24a-24d, the cross key (button) 24g, the home, select, start buttons 24h-24j, or the analog pad 26 is used as a touch/button/pad input to the game program 72. The power button 24k is used for turning on or off the power of the game apparatus 10. The power lamp 42a lights up or off in conjunction with the power-on or the power-off of the power source.

The microphone 30 converts a speech voice by a player, an environmental sound, etc. into sound data. The sound data can be used as a sound input to the game program. In this case, the game program detects the speech voice by the player by performing voice recognition, and executes processing according to the detection result. The sound data by the microphone 30 can be further recorded in a NAND-type flash memory 48 (see FIG. 4), etc.

The speakers 22a and 22b output a game sound, a microphone sound, etc. To the headphone terminal 36, a headphone not shown is connected. The volume control switch 32 is a slide switch for adjusting volumes of the speakers 22a and 22b or an output from the headphone terminal 36.

The SD card slot 34 is attached with an SD memory card (not illustrated) for storing a camera image, a microphone sound, etc., and the game card slot 38 is attached with a game card (not illustrated) storing the game program, etc. The infrared ray emitting-receiving portion 40 is utilized for infrared rays (IR) communications with another game apparatus.

Figure 4:
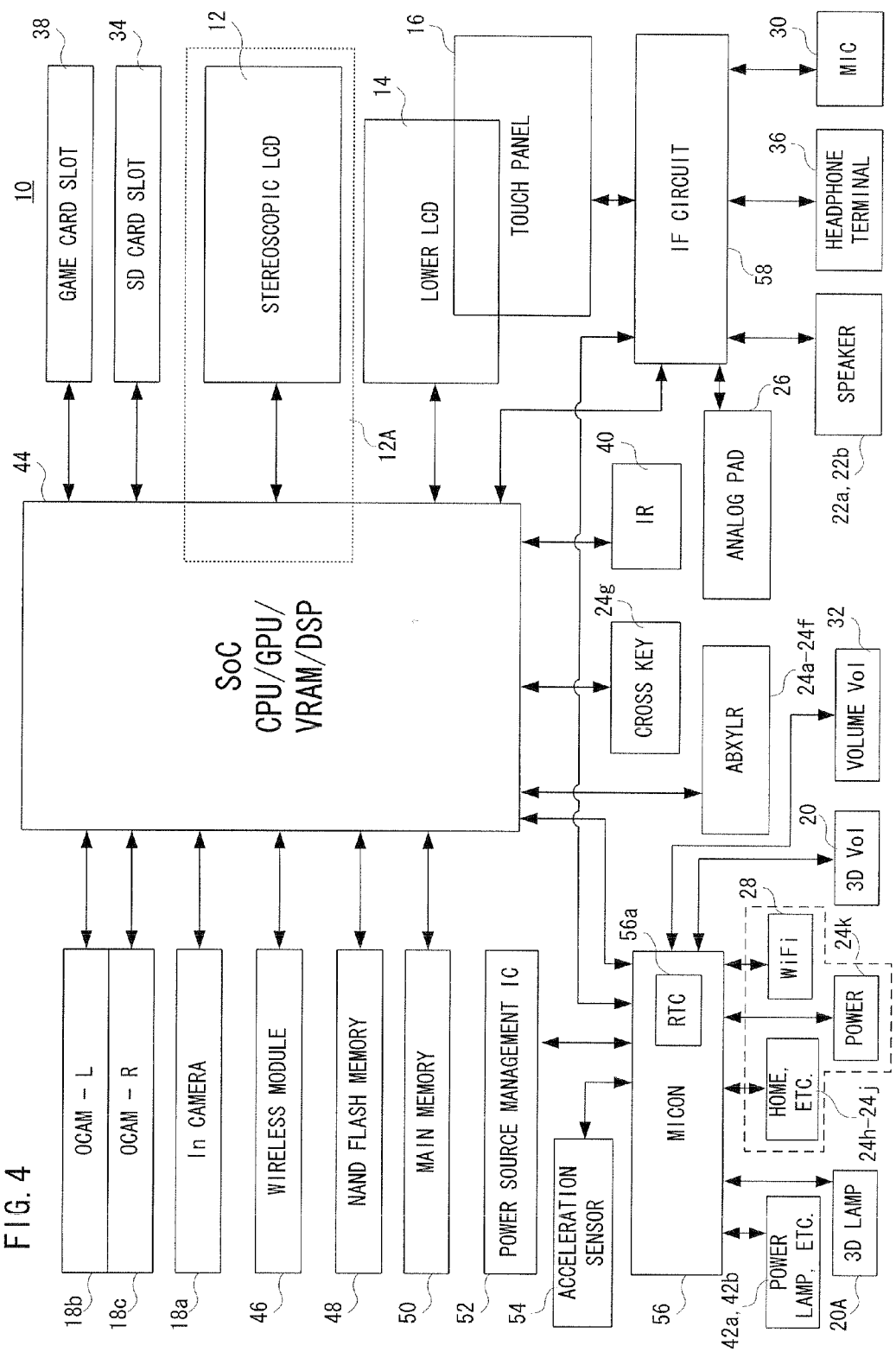
FIG. 4 is a block diagram showing one example of an electric configuration of the game apparatus.

FIG. 4 shows an electric configuration of the game apparatus 10. The game apparatus 10 includes an SoC (System-on-a-Chip) 44 being made up of a CPU, a GPU, a VRAM, a DSP, etc. The SoC 44 is connected with the above-described stereoscopic LCD 12, lower LCD 14, inward camera (In camera) 18a, right and left outward cameras (OCAM-L and OCAM-R) 18b and 18c, A, B, X, Y, L, R buttons 24a-24f, cross button 24g, SD card slot 34, game card slot 38, and infrared ray emitting-receiving portion (IR) 40. The SoC 44 is further connected with the above-described 3D adjusting switch (3D Vol) 20, 3D lamp 20A, home, select, start buttons 24h-24j, power button (Power) 24k, wireless switch (WiFi) 28, volume control switch (volume Vol) 32, and power, wireless lamps 42a, 42b via a microcomputer (hereinafter referred to as "micon") 56. The SoC 44 is moreover connected with the above-described touch panel 16, right and left speakers 22a and 22b, analog pad 26, microphone (Mic) 30 and headphone terminal 36 via an IF circuit 58.

In addition, the SoC 44 is connected with a wireless module 46, the NAND-type flash memory 48 and a main memory 50 as elements other than the above description. The wireless module 46 has a function of connecting to a wireless LAN. The NAND-type flash memory 48 stores data for saved, such as a camera image, a microphone sound, etc. The main memory 50 gives a working area to the SoC 44. That is, in the main memory 50, various data and programs to be used in the application such as the game are stored, and the SoC 44 performs works by utilizing the data and program stored in the main memory 50.

The micon 56 is connected with a power source management IC 52 and an acceleration sensor 54. The power source management IC 52 performs a power source management of the game apparatus 10, and the acceleration sensor 54 detects accelerations in the three-axis directions of the game apparatus 10. The detection result of the acceleration sensor 54 can be used as a motion input to the game program. In this case, the game program calculates a motion of the game apparatus 10 itself on the basis of the detection result, and executes processing according to the calculation result. Furthermore, the micon 56 includes an RTC (real-time clock) 56a, and counts a time by the RTC 56a to supply the same to the SoC 44.

Figure 5:
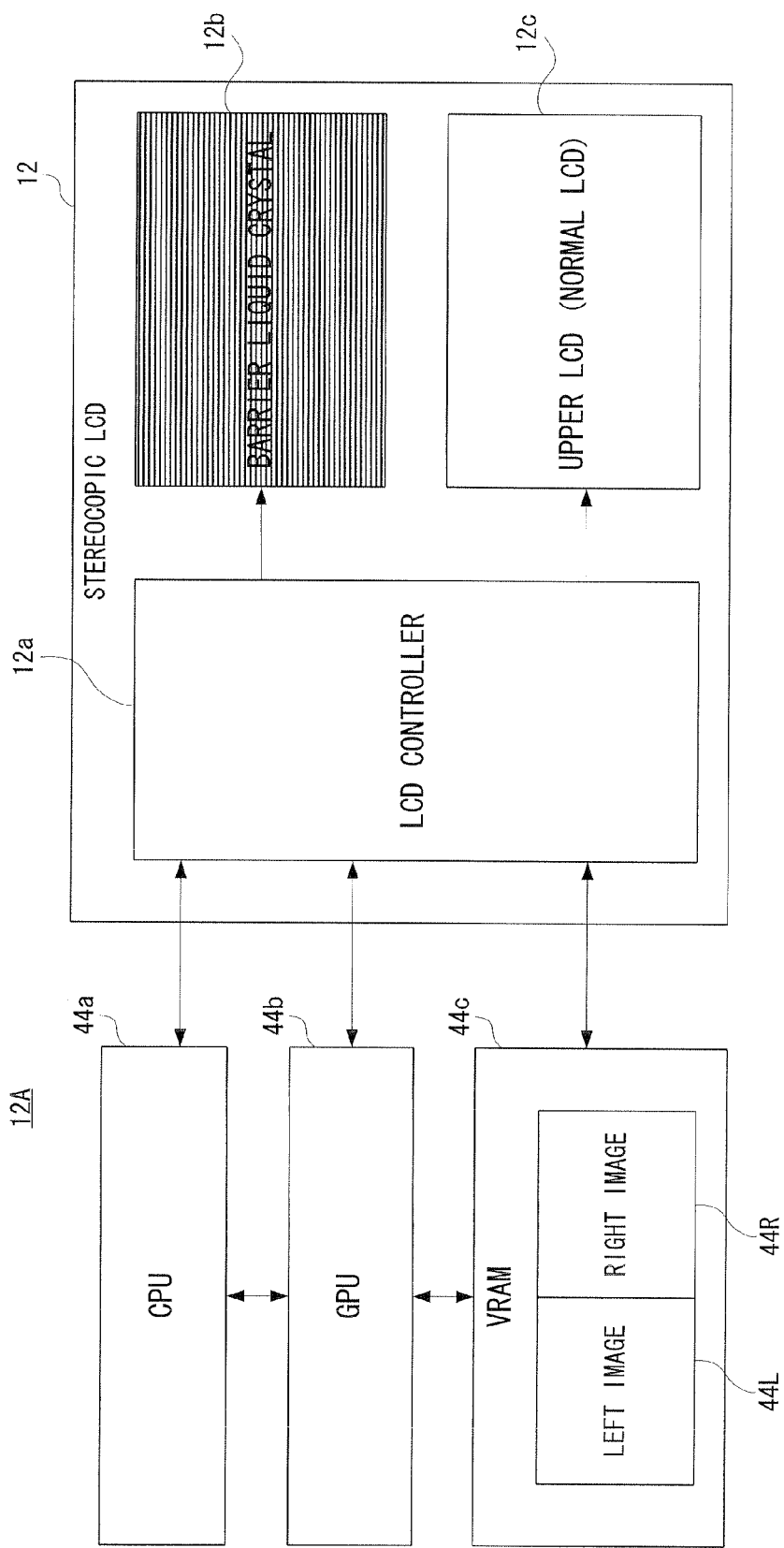
FIG. 5 is a block diagram showing a main part (stereoscopic LCD controller being formed of a stereoscopic LCD and a part of SoC) of the electric configuration in FIG. 4.

FIG. 5 shows a stereoscopic LCD controller 12A being made up of the stereoscopic LCD 12 and a part of the SoC 44. The stereoscopic LCD 12 includes an LCD controller 12a, a barrier liquid crystal 12b, and an upper LCD 12c. The barrier liquid crystal 12b includes a plurality of liquid crystal slits extending in a vertical (row) direction as shown in FIG. 6(A), and makes the right eye and the left eye view beams passing through pixels in a different row of the upper LCD 12c by alternately cutting off the beam from the backlight by the plurality of liquid crystal slits. The upper LCD 12c may be a general liquid crystal (for 2D display) similar to the lower LCD 14. The LCD controller 12a performs drawing on the upper LCD 12c under the control of the GPU 44b and then the CPU 44a, and turns the barrier liquid crystal 12b (applied voltage) on and off. When the barrier liquid crystal 12b is turned off, the right eye and the left eye can view the beams passing through the pixels of all the rows on the upper LCD 12c as shown in FIG. 6(B).

Figure 7:
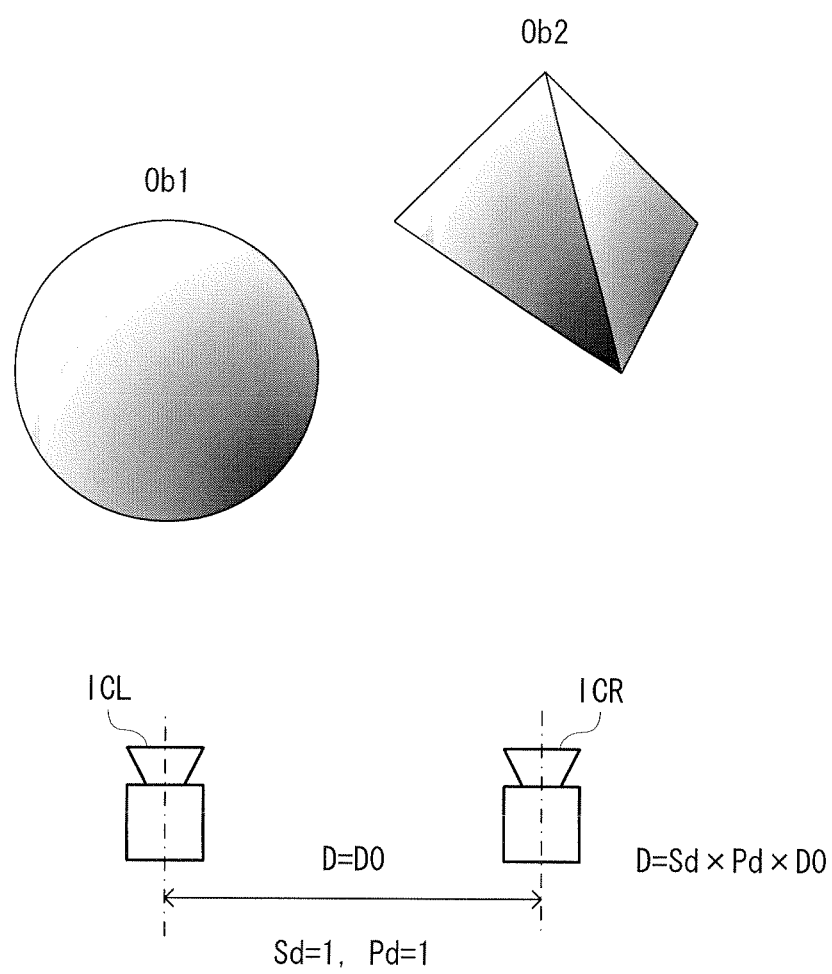
FIG. 7 is an illustrative view showing a situation in which an object is imaged by two right and left virtual cameras in a virtual space.
Figure 8:
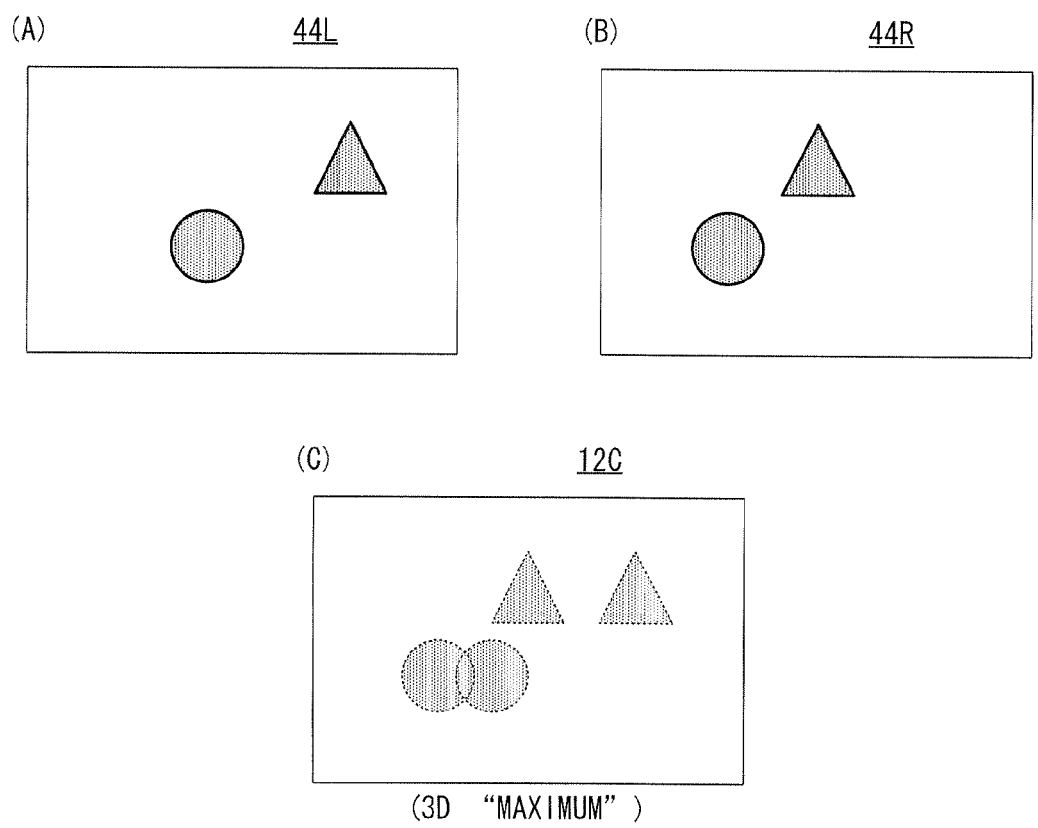
FIG. 8 is an illustrative view showing an imaged image (the distance-between cameras is a maximum value D0) by the two virtual cameras.

More specifically, as shown in FIG. 7, in a case that objects Ob1 and Ob2 are imaged by a left virtual camera ICL and a right virtual camera ICR spacedly arranged right and left (D=D0) within the virtual space, under the control of the CPU 44a, the GPU 44b writes a left image 44L and a right image 44R as shown in FIG. 8(A) and FIG. 8(B) to the VRAM 44c, and the LCD controller 12a alternately reads the left image 44L and the right image 44R stored in the VRAM 44c on a row-by-row basis, and draws them in the upper LCD 12c in order. Thus, on the upper LCD 12c, a stereoscopic image (for implementing a stereoscopic views) as shown in FIG. 8(C) is displayed. When a backlight beam to the stereoscopic image is limited by the barrier liquid crystal 12b, the left eye can view the left image 44L as shown in FIG. 8(A), and the right eye can view the right image 44R as shown in FIG. 8(B), so that autostereoscopy is implemented.

It should be noted that in FIG. 5, the LCD controller 12a, the GPU 44b and the VRAM 44c are provided by being brought into correspondence with the stereoscopic LCD 12, and naturally, an LCD controller, a GPU and a VRAM are provided by being brought into correspondence with the lower LCD 14. As can be understood with reference to FIG. 5, the GPU corresponding to the lower LCD 14 is also connected with the CPU 44a so as to transmit and receive a signal, and the GPU and the VRAM that correspond to the lower LCD 14 are connected with each other so as to transmit and receive a signal. Then, each of the CPU 44a, and the GPU and the VRAM that correspond to the lower LCD 14 is connected to the lower LCD 14 so as to transmit and receive a signal with the LCD controller, to which the lower LCD 14 is connected.

By the way, as described above, the stereoscopic image in FIG. 8(C) is an image when the distance-between cameras D becomes the maximum (D=D0: see FIG. 7), and it changes from FIG. 9(B) to FIG. 10(B) as the distance-between cameras D is shorter from FIG. 9(A) to FIG. 10(A). The distance-between cameras D is calculated according to the following equation (1).

$$D = Sd \times Pd \times D0 \tag{1}$$

Here, Sd is a variable showing a value of the slider Sd of the 3D adjusting switch 20 shown in FIG. 3, and changes within a range from 0 to 1 in accordance with an operation of the slider Sd ($0 \leq Sd \leq 1$). Pd is a variable to be controlled by the game program 72, and similarly changes within a range from 0 to 1 ($0 \leq Pd \leq 1$). D0 is a constant corresponding to a space between the two pupils of the human, and is set to 65 mm, for example (D0=65 mm).

In each of FIG. 7, FIG. 9(A) and FIG. 10(A), the variable Sd is 1, and the slider Sd is fixed at the upper end (Sd=1). The variable Pd changes as in $1 \rightarrow 0.5 \rightarrow 0$ by the game program, so that the distance-between cameras D changes as in $D0 \rightarrow (0.5 \times D0) \rightarrow 0$. Then, in correspondence with the change in a direction in which the distance-between cameras D is decreased, the stereoscopic image changes as in FIG. 8(C)$\rightarrow$FIG. 9(B)$\rightarrow$FIG. 10(B). That is, the parallax between the left image 44L and the right image 44R decreases, and becomes equal to the planar image.

Here, if the variable Sd is fixed at 0.5 (Sd=0.5), the distance-between cameras D changes within the range from 0 to (0.5×D0). Furthermore, if the variable Sd is fixed at 0 (Sd=0), the distance-between cameras D remains 0.

In a case of a state in FIG. 10(A), that is, in a case of the minimum of the 3D display or in a case of the 2D display, the distance-between cameras D becomes 0, so that the left image 44L and the right image 44R which are written to the VRAM 44c become the same (that is, the parallax is 0). In this case as well, the LCD controller 12a alternately reads the left image 44L and the right image 44R stored in the VRAM 44c on a row-by-row basis, and draws them in the upper LCD 12c in order. Thus, a planar image (that is, image without parallax) as shown in FIG. 10(B) is displayed on the upper LCD 12c. When the barrier liquid crystal 12b for restricting the backlight to the stereoscopic image is turned off, the right and left eyes can view the planar image shown in FIG. 10(B).

Here, even if the barrier liquid crystal 12b is not turned off at this time, the planar image shown in FIG. 10(B) can still be viewed. It should be noted that when the barrier liquid crystal 12b is turned off, a suitable viewing position is extended to make the planar image appear bright. Furthermore, the LCD controller 12a may read only one of the left image 44L and the right image 44R in place of alternately reading them to draw it in the upper LCD 12c. In this case as well, the planar image as shown in FIG. 10(B) is displayed on the upper LCD 12c.

When the power button 24k is turned on to turn the main power supply of the game apparatus 10 on, for example, the game apparatus 10 is started-up to display a main menu screen not shown on the lower LCD 14. On the main menu screen, execution of an application executable by the game apparatus 10 such as a virtual game can be designated. When execution of the virtual game (golf game) of this embodiment is designated, a golf game is started, and a player character or a course to be played is selected by the player on an initial screen not shown.

In a case that a hitting operation is performed, a game screen 100 as shown in FIG. 11(A) is displayed on the stereoscopic LCD 12, and an operating screen 200 as shown in FIG. 11(B) is displayed on the lower LCD 14. On the game screen 100 shown in FIG. 11(A), a player character 102 is displayed. As can be understood from FIG. 11(A), the player character 102 has a golf club (hereinafter simply referred to as "club") 104, and the player character 102 is shown in a stance of hitting (stance of address) a golf ball (hereinafter simply referred to as "ball") 106. Furthermore, on the game screen 100, an estimated trajectory 110 indicating an estimated trajectory (moving path) of the ball 106 and a point of impact are displayed. The estimated trajectory 110 is changed depending on a launching direction (shot direction) of the ball 106, the kind of the club 104 (carry of the club Lmax) and the kind of shot (straight, fade, slice, hook, draw).

Furthermore, on the game screen 100, a display region 120 and a display region 122 are provided at the lower left thereof. In the display region 120, the kind of the club 104 to be used by the player character 102 (3-iron (3I), here) is displayed. Additionally, in the display region 122, a distance from the current position of the ball 106 to a green or a cup (210 yard (Y), here) within a virtual game space is displayed.

Although an explanation in detail is omitted, on the game screen 100, an image when a virtual game space, that is, a golf course (hole) is viewed from the rear of the player character 102 is imaged by a virtual camera (not illustrated), and the imaged image is displayed as a background image.

It should be noted that the player character is also displayed on the game screen 200, and therefore, as shown in FIG. 33(A), on the game screen 100, a viewpoint at a long distance and a bird's-eye view may be adopted so as to confirm a situation of a hole covering a wider range.

Although illustration is omitted, the presence or absence of wind, the direction of the wind and a wind speed may be shown by designs (arrows) and characters on the game screen 100.

On the operating screen 200 shown in FIG. 11(B), a player character 202 is displayed. Furthermore, the player character 202 holds a club 204, and is shown in a stance of address for hitting a ball 206 (see FIG. 12, etc.) similar to the game screen 100 until a hitting operation is executed. Although detailed description is omitted, the player character 102, the club 104, and the ball 106 which are displayed on the game screen 100 and the player character 202, the club 204, the ball 206 which are displayed on the operating screen 200 are the same and are merely displayed on the different screens. As shown in FIG. 33(B), on the operating screen 200 as well, the background may be displayed.

Furthermore, on the operating screen 200, a path (guide path) 210 for causing the player to perform a hitting operation (sliding operation) is displayed. The guide path 210 is shown as a circle a part of which is erased. Accordingly, the guide path 210 has two end points 210a, 210b. Furthermore, at the bottommost end of the guide path 210, a judgment image 212 for judging a start of a swing and judging an impact is displayed. For example, the judgment image 212 is shown by a vertically-long rectangle.

In this embodiment, when the judgment image 212 is touched to designate a start of a swing motion, and a sliding operation is executed in a clockwise direction so as to trace the guide path 210, the player character 202 can be made to perform a backswing. Then, when the direction of the sliding operation is reversed before the end point 210a from which the sliding operation is executed in a counterclockwise direction, the player character 202 is made to perform a downswing. In addition, when a sliding operation is executed after the impact position, that is, the judgment image 212 in a counterclockwise direction, the player character 202 can be made to perform a follow-through. Here, the swing motion is ended at the position where a touch off is performed, but when a sliding operation is executed until the end point 210b, the swing motion by the player character 202 is ended without performing a touch off.

In addition, at an upper right of the operating screen 200, a teach image 220 for displaying precision of a swing (hitting operation), that is, a sliding operation, etc. is displayed. The teach image 220 is shown by a circle in which a scale for representing three elements (parameters) in relation to a swing (hitting operation) is displayed. In this embodiment, the teach image 220 shows precision (control: C), a speed (speed:Sp) and smoothness (smooth:Sm) of a swing (hitting operation). The three parameters exert an influence on a carry (moving speed) and a moving (flying) direction of the ball 106 (206) in the virtual game space, and are used for determining whether a miss shot or not.

It should be noted that in this embodiment, the teach image 220 is represented by a circle, but there is no need of being restricted thereto. The precision, speed and smoothness of the swing (hitting operation) may be shown by a bar graph and mere numerical values.

Furthermore, when the home button 24h is operated in a state that the operating screen 200 shown in FIG. 11(B) is displayed, a setting screen is displayed although illustration is omitted, and on the setting screen, the player can change (select) the club 104 (204) to be used and select the change of the type of shot.

In addition, the right and left buttons of the cross key (button) 24g is operated in a state that the operating screen 200 shown in FIG. 11(B) is displayed to thereby change the direction of the player character 202, and according to the direction, a launching direction (shot direction) of the ball 106 (206) can be changed. Furthermore, although an explanation in detail is omitted, the up and down buttons of the cross key (button) 24g is operated in a state that the operating screen 200 shown in FIG. 11(B) is displayed to thereby change the position at which the ball 106 (206) is hit (position in a height direction).

In this embodiment, a swing motion by the player character 202 and a sliding operation by the player are synchronized with each other. Briefly speaking, when a sliding operation is executed with a touch pen, a finger, or the like such that the guide path 210 is traced, an animation in which the player character 202 performs a motion of a backswing, a downswing, and a follow-through is displayed on the operating screen 200.

Although illustration is omitted, an animation in a case that the player character 202 swings is made up of 90 frames (90 animation frames). For example, the animation frame of the 0-th frame shows a situation in which the player character 202 swings up the club 104 up to the top position. As the number of frames increases from the first frame, a posture of the player character 202 and an angle of the club 204 are changed as if the downswing is executed. The 60-th frame shows a situation in which the player character 202 hits the ball 206 (impact state). In addition, as the number of frames increases, the posture of the player character 202 and the angle of the club 204 are changed as if a follow-through is executed. The 90-th frame shows a situation in which the player character 202 completes the swing.

Accordingly, at a start of the operating screen 200 being displayed, the player character 202 is displayed to be stopped at a time of the animation frame of the 60-th frame. When the player touches the judgment image 212 in this state, reproducing (backward reproducing) is started such that frame number of the animation frame decrements. Accordingly, as described above, when the player performs a sliding operation along the guide path 210 in the clockwise direction, the player character 202 is displayed such that it performs a backswing in accordance therewith. When the player inverts the sliding operation, reproducing (forward reproducing) is started such that the frame number of the animation frame increments from the reversed point. Accordingly, as described above, when the player performs a sliding operation along the guide path 210 in the counterclockwise direction, the player character 202 is displayed such that it performs a downswing in accordance therewith.

It should be noted that although an explanation in detail is omitted, in correspondence with the speed of the sliding operation, a reproduction speed of the animation frame (animation frame updating speed) is changed to thereby synchronize the sliding operation with the swing motion (animation).

Thereafter, the forward reproducing is made such that the frame number of the animation frame increases, and when the sliding operation passes through the impact position (the display position of the judgment image 212), the frame number of the animation frame is corrected. More specifically, when the sliding operation passes through the impact position, in a case that the frame number of the animation frame is less than "60", the animation frame updating speed is accelerated to advance up to the 60-th frame. Thus, a designation of hitting by the sliding operation and a motion of hitting the ball 206 by the player character 202 are synchronized. Here, if the frame number of the animation frame is above "60" at a time of impact, the animation frame is not corrected. This is because the direction of the swing is reversed.

Thereafter, the forward reproducing is made such that the frame number of the animation frame increases, and the player character 202 is displayed such that it performs a follow-through according to the sliding operation. Then, when the player performs touch-off, the sliding operation as to the designation of the swing is ended, and then, reproducing the animation frame is stopped at this time. Here, even if touch-off is not performed, when the touched position reaches the end point 210b, the designation of the swing is ended.

It should be noted that in the above-described embodiment, not so large number of animation frames are taken, but in another embodiment, a series of animations, such as an address state, a backswing, a downswing and a follow-through may naturally be reproduced in order. If so, a subtle difference can be given to the posture of the player character 202 between the backswing and the downswing, and therefore, more realistic animation can be displayed.

As described above, in this embodiment, a swing (hitting operation), that is, three indexes (parameters) of the precision (C), the speed (Sp) and the smoothness (Sm) of the sliding operation exert an influence on a carry (moving speed) of the ball 106 (206) and the moving (flying) direction in the virtual game space, or are utilized for determining whether or not a miss shot is performed.

As shown in FIG. 12(A), when a sliding operation is started, and the player character 202 executes a swing motion, a depicted path 230 is displayed on the operating screen 200 according to the sliding operation. In FIG. 12(A) (this holds true for FIG. 12(B) to FIG. 15(A), FIG. 22), the depicted path 230 is represented by a dotted line, but is actually displayed by a solid line similar to the guide path 210. Here, in order to distinguish between the guide path 210 and the depicted path 230, the thickness and color of the line are changed.

Furthermore, for the sake of clarity, on the operating screen 200 (this holds true for FIG. 12(B) to FIG. 15(A)) shown in FIG. 12(A), the touched position is represented by an indicative image 240 of an arrow, but this may not be displayed. Here, in a case that the pointing device except for the touch panel 16 is used, such an indicative image 240 is required to be displayed.

In addition, the teach image 220 is changed according to the sliding operation. In this embodiment, in a case that each of the precision, the speed and the smoothness of the sliding operation satisfies a predetermined condition, the value of each parameter is increased. For example, each parameter is set in a range of from 0 (minimum value) to 100 (maximum value). Accordingly, if each parameter takes a vale above 100 (maximum value), it is corrected to 100 (maximum value). Additionally, as to the precision of the sliding operation, it is determined whether or not the predetermined condition is satisfied depending on whether or not the depicted path 230 precisely traces the guide path 210, that is, whether or not the touched position is on the guide path 210. Furthermore, as to the speed of the sliding operation, it is determined whether or not the predetermined condition is satisfied depending on whether or not the touched position is within a predetermined range decided in advance (the touched position changes by 1 to 5 dots for one game frame). In addition, as to the smoothness of the sliding operation, it is determined whether or not predetermined condition is satisfied depending on whether or not the change of the speed of the sliding operation, that is, the difference between the current speed of the sliding operation and the speed of the sliding operation in the previous game frame is within a predetermined range (2 to 3 dots/game frame). Here, one game frame is a screen updating rate (1/60 seconds).

Accordingly, when the sliding operation is continued in the state shown in FIG. 12(A), in a case that the swing motion advances in accordance with the sliding operation as shown in FIG. 12(B), and each of the precision, the speed, the smoothness of the sliding operation satisfies the predetermined condition, the value of each parameter is summed up (accumulated) to change the index image 220a. The index image 220a is displayed in a circle by connecting the numerical values of the respective parameters with curves. As the index image 220a is close to a perfect circle, this means that the three parameters of the sliding operation are well balanced, and as the index image 220a is far from a circle, this means that the three parameters of the sliding operation are imbalanced.

As shown in FIG. 13(A), in a case that the touched position reaches the end point 210a, for example, when the player makes a turn (inverts) as to the sliding operation, a transition to a designation of the downswing is made. For example, in a case that the sliding operation is performed up to the end point 210a of the guide path 210, the club 204 held by the player character 202 is at a top position (first frame). Furthermore, in this embodiment, for the sake of clarity, when the sliding operation is inverted, the depicted path 230 (the depicted path 230 as to the backswing) is erased (undisplayed).

Here, a case that a sliding operation is performed up to the end point 210a is shown, but by inverting the sliding operation before arrival of the end point 210a of the guide path 210 by the player, the backswing amount can be adjusted. Accordingly, it is possible to change a moving distance of the ball 106 (206). This is because the game processing similar to the normal golf is performed.

In addition, in this embodiment, when the sliding operation is inverted, the depicted path 230 is undisplayed, but may not be undisplayed. For example, the kind of the depicted path 230 (color, thickness, etc.) is changed so as to be discriminated from the depicted path 230 according to the sliding operation for designating the downswing.

Furthermore, although an explanation in detail is omitted, during the sliding operation (swing), the precision, the speed and the smoothness of the sliding operation are always determined, and thus, as shown in FIG. 13(A) and FIG. 13(B), the index image 220a is gradually changed (increased).

Then, as shown in FIG. 14(A), an impact determination is performed when the sliding operation passes through the position (impact position) where the judgment image 212 is displayed. In this embodiment, in a case that the depicted path 230 passes through the judgment image 212, it is basically determined that the player character 202 precisely hits the ball 206. On the other hand, in a case that the depicted path 230 does not pass through the judgment image 212, it is determined that the player character 202 makes an air shot, or the ball 106 shot by the player character 202 is a weak grounder. Here, the "weak grounder" is a kind of missed shot, and means that the ball 106 rolls over only slightly (several yards). Here, in the impact determination, even if the sliding operation (depicted path 230) passes through the judgment image 212, the value of the smoothness of the sliding operation is equal to or less than a predetermined value (50, for example), a miss shot (shank, duffling or pop-up) is determined. Here, the shank means that the ball 106 (206) is hit against near the neck of the clubface, and the ball 106 flies sharply to the right (the left direction in a case of the left-handed hitter). Moreover, the duffling means that the ground beneath the ball 106 (206) is struck by the head of the club 104 (204) to make the ball 106 (206) scarcely fly. In addition, the pop-up means that the shot ball 106 (206) is popped up too high and takes an excessive high flight path.

It should be noted that in a case that the sliding operation (depicted path 230) does not pass through the judgment image 212 at the impact, the air shot or the weak grounder is randomly (arbitrarily) set. Furthermore, even if the sliding operation (depicted path 230) passes through the judgment image 212 at the impact, in a case that the value of the smoothness of the sliding operation is equal to or less than the predetermined value, the shank, the duffling or the pop-up is randomly set.

When the sliding operation passes by the display position of the judgment image 212, the downswing is ended, the impact determination is performed as described above, and according to the result, the ball 206 starts to move. In addition, as shown in FIG. 14(B), when the sliding operation is continued, an animation in which the player character 202 performs a follow swing is displayed. Then, when the player performs touch-off, or the touched position reaches the end point 210b, the sliding operation is completed to end the swing motion as shown in FIG. 15(A).

As shown in FIG. 15(A), when the swing motion (sliding operation) is ended, the trajectory of the ball 106 is calculated to move the ball 106 within the virtual game space as described later. The player can know the precision, the speed, the smoothness of the sliding operation as to the whole of the designation of the swing with reference to the teach image 220 in which each index value (index image 220a) is decided as shown in FIG. 15(A).

It should be noted that although illustration is omitted, a scene directly after the ball 206 is hit is displayed on the operating screen of the lower LCD 14, and a scene in which the ball 106 flies thereafter is displayed on the game screen 100 of the stereoscopic LCD 12.

When the player ends the sliding operation, the flight path (trajectory) of the ball 106 (206) is calculated. In this embodiment, the speed and smoothness of the sliding operation exerts an influence on the carry (moving speed) of the ball 106, and the precision of the sliding operation exert an influence on the moving direction (the degree of curve) of the ball 106.

More specifically, similar to the actual golf, a carry (carry of the club Lmax) as a reference is decided depending on the kind of the club 104. In this embodiment, the carry (carry of the club Lmax) is decided, but it can be said that the moving speed of the bail 106 as a reference is decided. This is because the faster the moving speed is, the longer the carry is, and the slower the moving speed is, the shorter the carry is. Furthermore, the actual carry L is adjusted by the backswing amount, and therefore, in this embodiment, by the backswing amount that is decided by the position where the sliding operation is inverted, the carry of the club Lmax is adjusted. That is, the carry of the club Lmax is adjusted by the ratio (ratio of the backswing amount) $P(0<P\leq1)$ of the length of the depicted path 230 (the depicted path 230 as to the sliding operation designating the backswing) from the position where e judgment image 212 is displayed (starting position of the sliding operation) to the position where the sliding operation is inverted to the length of the guide path 210 from the position where the judgment image 212 is displayed to the end point 210a.

Furthermore, the speed of the sliding operation and the smoothness of the sliding operation also exert an influence on the carry L. In this embodiment, by a correction value α $(0<\alpha\leq1)$ based on the speed of the sliding operation and a correction value β $(0<\beta\leq1)$ based on the smoothness of the sliding operation, the carry of the club Lmax is further adjusted. Although an explanation in detail is omitted, by a correction value γ $(0<\gamma\leq1)$ due to the influence of the state of a lie (fairway, bunker, rough), wind and rain, the carry of the club Lmax is further adjusted. Here, the correction value α and the correction value β are evaluated by dividing the speed and smoothness of the sliding operation (0 to 100) summed up (accumulated) at the sliding operation by 100. Furthermore, the correction value γ is automatically decided by the game program.

$$L=Lmax \times P \times \alpha \times \beta \times \gamma \qquad \text{[Equation 1]}$$

It should be noted that it is considered that the speed of the club head at the impact exerts a great influence on the carry L, and therefore, in a case that the speed of the sliding operation when the sliding operation passes through the judgment image 212 is less than a predetermined value, regardless of the correction value α (it shall be above 0.3) decided based on the value of the speed of the sliding operation, the correction value α may forcibly be set to 0.3.

In addition, as described above, the player can select a change of the type of shot (draw, hook, fade, slice) on the setting screen before the hitting operation. In such a case, the guide path 210 is transformed according to an operation by the player. More specifically, when the change of the type of shot is selected, a point image 250 is displayed at the left end part of the guide path 210 on the operating screen 200 as shown in FIG. 15(B), for example.

When the point image 250 is dragged, the guide path 210 can be transformed to thereby decide the type of shot and the degree of curve. Here, as shown in FIG. 15(B), a two-dimensional coordinate system is set to the lower LCD 14, and the horizontal direction is an X-axis direction and the vertical direction is a Y-axis direction. Furthermore, the vertex at the upper left of the lower LCD 14 is an original point, and the right direction is a plus direction of the X-axis and the downward direction is a plus direction of the Y-axis.

For example, as shown in FIG. 16(A) and FIG. 16(B), when the point image 250 is dragged in a lower left direction of the operating screen 200, a fade or a slice can be selected as a type of shot. In addition, as shown in FIG. 17(A) and FIG. 17(B), when the point image 250 is dragged in the upper left of the operating screen, a hook or a draw can be selected as a type of shot.

The type of shot is decided depending on the Y coordinate of the display position of the point image 250. For example, the vertical length of the lower LCD 14 (192 dots, for example) is divided into four, and if the Y coordinate is 1 to 48 dots, the hook is selected, if the Y coordinate is 49 to 96 dots, the draw is selected, if the Y coordinate is 97 to 144, the fade is selected, and if the Y coordinate is 145 to 196, the slice is selected.

Furthermore, the amount of the curve is decided depending on the X coordinate of the display position of the point image 250. In this embodiment, in a case that the point image 250 is at an initial position, the amount of the curve is set to a minimum, and as the value of the X coordinates of the point image 250 is small, the amount of the curve is made large. Although an explanation in detail is omitted, the amount of the curve shall be decided in advance in correspondence with the X coordinates of the point image 250 for each type of shot.

It should be noted that as a technique of transforming the guide path 210, the existing technique utilized in general graphics software can be used. The technique of transforming the path itself is not essential matter of the present invention, and therefore, an explanation thereof is omitted.

Furthermore, in correspondence with the position of the point image 250, a part where the sliding operation as to the follow-through out of the guide path 210 is also transformed. In this embodiment, as shown in FIG. 16(A) and FIG. 16(B), in a case that the type of shot is the fade or the slice, a transformation is made such that the end point 210b of the guide path 210 is opened out of the circle. Here, the opened amount is decided in advance in correspondence with the type of shot and the X coordinate of the point image 250. As a transformation of the path, the existing technique is adopted as described above. This holds true hereunder.

As to the transformation operation of the guide path 210, a transformation mode may visually easily be represented by translucently displaying the guide path 210 before the touch, and normally displaying it after the touch, for example.

Furthermore, as shown in FIG. 17(A) and FIG. 17(B), in a case that the type of shot is the hook and the draw, a transformation is mad such that the end point 210b of the guide path 210 is closed inside the circle. Here, the closed amount is decided in advance in correspondence with the type of shot and the X coordinates of the point image 250.

It should be noted that when a touch-off is performed, the position of the point image 250 is decided at the touched position at a time of the touch-off, and according thereto, the type of shot and the amount of curve are decided. Thereafter, when the judgment image 212 is touched, and the start of the hitting operation is determined, the type of shot and the amount of the curve are fixed. Accordingly, even if the position of the point image 250 is once decided, the position of the point image 250 can be changed until the hitting operation is started.

Thus, in a case that the type of shot is changed to the intentional shot (fade, slice, hook, draw), the guide path 210 is transformed. This is because in the general golf, it is more difficult to hit the intentional shot than to hit a straight. In the virtual game as well, if the guide path 210 is transformed from the circle to make the amount of curve large, by making the amount of transformation large, the sliding operation is made more difficult than when the sliding operation is performed along the mere circle.

Here, in the normal golf, even if the intentional shot is hit, the backswing itself is almost the same when the straight is hit. Thus, in this embodiment as well, the sliding operations designating the downswing and the follow-through are made different from that when a normal shot is hit, making it possible to hit the intentional shot.

That is, in FIG. 16(A) to FIG. 17(B), although it is omitted for the sake of clarity, the guide path 210 is made up of a guide path 2100 for back swing and a guide path 2102 for downswing and follow-through as shown in FIG. 18(A) and FIG. 18(B). In general, the guide path 2100 and the guide path 2102 are shown so as to be superimposed with each other. Thus, as shown in FIG. 16(A)-FIG. 17(B), in a case that the guide path 210 is transformed, only the guide path 2102 is transformed, and the guide path 2100 remains unchanged. Accordingly, in a case that the backswing is designated, the player performs a sliding operation so as to trace the circle guide path 2100 similar to a normal shot, and in a case that the downswing and the follow-through are designated, a sliding operation is executed so as to trace the transformed guide path 2102. This makes it possible to represent difficulty when the intentional shot is hit.

Furthermore, in a case that the point image 250 is dragged as shown in FIG. 16(A)-FIG. 17(B), an estimated trajectory 110 is changed on the game screen 100 displayed on the stereoscopic LCD 12. For example, if the fade or the slice is selected, the estimated trajectory 110 is displayed such that the ball 106 is launched into an oblique left direction, and then curved into the right gradually as shown in FIG. 19(A). Alternatively, if the hook or the draw is selected, the estimated trajectory 110 is displayed such that the ball 106 is launched into an oblique right, and then curved into the left direction gradually as shown in FIG. 19(B).

Although an explanation in detail is omitted, the estimated path 110 is evaluated from a simulation. At this time, the carry L of the ball 106 is decided only by the carry of the club Lmax, and the launching direction (shot direction) and the amount curve of the ball 106 are decided according to the type of shot and the amount of curve that are decided in correspondence with the position of the point image 250 (XY coordinate).

Also, in this embodiment, depending on the selected club 104 (204), the thickness of the guide path 210 is changed. This is because in the normal golf as well, the difficulty of shot is different depending on the kind of the club. Generally, it is more difficult to make a shot with a long club than with a short club. Accordingly, in this embodiment, the thickness of the guide path 210 is classified into three kinds (thick, middle, thin) depending on the kind of the club 104 (204). Thus, in a case that the kind of the guide path 210 is "middle" and "thick", it becomes easy to trace along the guide path 210, so that precision of the sliding operation is improved. That is, as the club 104 is short, a precise shot can easily be hit.

For example, the kind of the guide path 210 shown in FIG. 11 to FIG. 18 is a "thin (1 dot)", FIG. 20(A) shows the guide path 210 whose kind is "middle (2 dots)", and FIG. 20(B) shows the guide path 210 whose kind is "thick (3 dots)". In this embodiment, in a case that any one of 1W-3W (wood clubs) and 1I-3I (iron clubs) is selected as a club 104, the kind of the guide path 210 is set to "thin". Furthermore, in a case that any one of the 4W, 5W, 4I to 8I is selected as a club 104, the kind of the guide path 210 is set to "middle". Then, in a case that any one of 9I, SW (sand wedge), PW (pitching wedge) and PT (putter) is selected as a club 104, the kind of the guide path 210 is set to "thick".

It should be noted that the classification of the thickness of the guide path 210 is mere one example, and when which club 104 is selected, which kind of thickness the guide path 210 is to be set is a matter arbitrarily set by a developer or a designer of this virtual game. Furthermore, in this embodiment, the thickness of the guide path 210 is set by 3 kinds, but may be set by 2 kinds or 4 kinds or more. Furthermore, a special club capable of hitting a special shot may be set except for the actual clubs. As an example of such a special club, by not displaying at least a part of the guide path 210, etc., an accurate input is made difficult while if the accurate input can be made, a special shot such as a shot of a long carry, a shot capable of surely being the ball on the green can be hit. This makes it possible to more enhance interest as a golf game.

Figure 21:
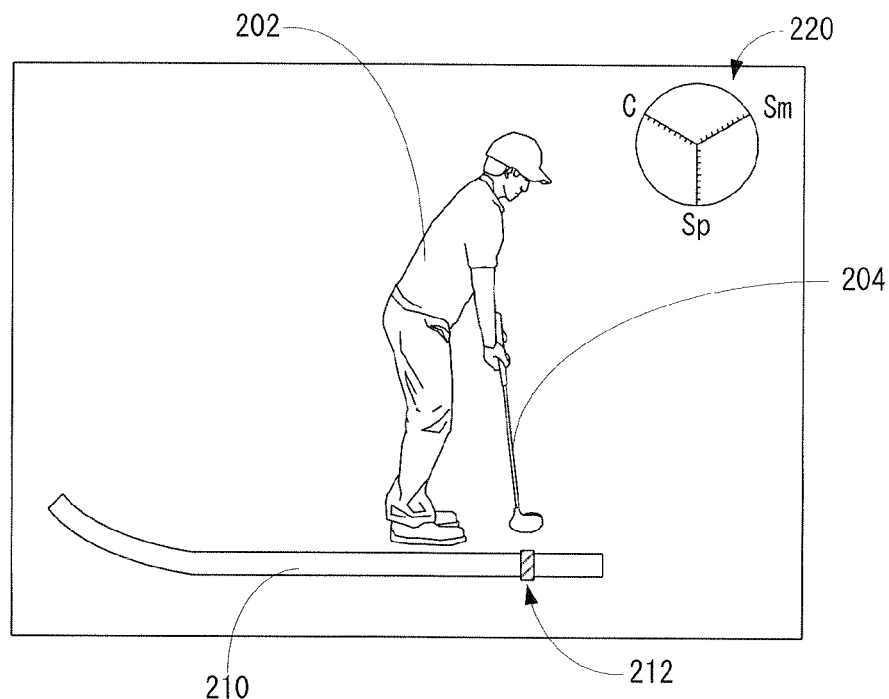
FIG. 21 is an illustrative view showing an example of the operating screen in a case that a putting is designated.

Although an explanation in detail is omitted, as shown in FIG. 21, in a case that a putting motion is designated, the shape of the guide path 210 is different. This is because in the normal golf as well, the swing of the putting is different from the swing by the other clubs 104. As shown in FIG. 21, the guide path 210 is set in an approximate straight line. Furthermore, as described above, if the PT is selected, the kind of the guide path 210 is set to "thick".

In this case as well, when the judgment image 212 is touched, a start of the swing is determined. When a sliding operation is performed in the left direction, the depicted path 230 is displayed according thereto. When the sliding operation is inverted, the ratio P of the backswing amount is decided. The sliding operation to the right direction is made and passes through the position of the judgment image 212 to thereby hit the ball 106 (206). At this time, in a case that the sliding operation (depicted path 230) does not pass through the judgment image 212, an air shot is performed. On the other hand, in a case that the sliding operation (depicted path 230) passes through the judgment image 212, by the ratio P of the backswing amount, the speed of the sliding operation (correction value α), and the smoothness of the sliding operation (correction value β), the moving distance (rolling distance, here) of the ball 106 (206) is decided, and by the precision of the sliding operation (difference between the guide path 210 and the depicted path 230), the moving direction (displaced in a launching direction, that is, a direction at a start of moving, here) of the ball 106 (206) is changed.

It should be noted that the putting is also affected by the sate of a lie, wind and rain (correction value γ).

Also, although an explanation in detail is omitted, the animation in a case of the putting is separately prepared. That is, in the case of the putting, the animation different from that when the shot is performed by the other clubs 104 is displayed. The reproducing method is similar to the above description.

Furthermore, in this embodiment, as described above, by the precision of the sliding operation, the trajectory (moving path) of the ball 106 (206) is changed. That is, the difference between the guide path 210 and the depicted path 230 is detected, and this exerts an influence on the moving of the ball 106 (206). The change of the trajectory is different from the change of the trajectory of the ball 106 by the intentional shot, and is the change not intended by the player.

In this embodiment, the area of a closed region formed by the guide path 210 and the depicted path 230 is calculated as to each of the inside and the outside of the guide path 210. By the total value of the areas, the amount of curve is decided, and by the sizes of the outside area and the inside area, the direction of the curve is decided. Here, as described above, the guide path 210 (2100, 2102) is different between the backswing, and the downswing and the follow-through, and an explanation is shown for each case. In FIG. 22(A), the depicted path 230 and the guide path 210 (2100) when a clockwise sliding operation (designation of the backswing) is performed are shown. Furthermore, in FIG. 22(B), the depicted path 230 and the guide path 210 (2102) when a counterclockwise sliding operation (designation of the downswing and the follow-through) is performed are shown.

In FIG. 22(A) and FIG. 22(B), the closed region formed inside the guide path 210 is shaded, and the closed region formed outside the guide area 210 is represented by a spot pattern. Here, the area of the closed region is represented by the number of dots.

In the example shown in FIG. 22(A), as differences in a case of the backswing, an area $S_{BO}$ outside the guide path 2100 and an area $S_{BI}$ inside the guide path 2100 are calculated. Furthermore, in the example shown in FIG. 22(B), as differences in a case of the downswing, an area $S_{DO}$ outside the guide path 2102 and an area $S_{DI}$ inside the guide path 2102 are calculated, and as differences in a case of the follow-through, an area $S_{FO}$ outside the guide path 2102 and an area $S_{FI}$ (0 in a case of FIG. 22(B)) inside the guide path 2102 are calculated.

Here, as to the downswing and the follow swing, the respective areas are calculated by being divided at the display position of the judgment image 212 (impact position).

In this embodiment, as shown in Equation 2, by a total sum of the areas, the amount of curve R by the difference is decided. The amount of curve R is a scalar quantity of a vector for curving the trajectory calculated as to the ball 106 (206) right or left with the trajectory centered. Here, a change to be given to the trajectory of the ball 106 (206) by the amount of curve is made a certain amount of time (2 to 3 seconds, for example) after the movement of the ball 106 (206). Also, K is a coefficient for conversion to the amount of curve, and is a value set in advance by the developer or the programmer of the virtual game. Furthermore, each of the $w_1$ to $w_3$ ($w_1+w_2+w_3=1$) is a weight coefficient set as described later.

$$R=K\{w_1(S_{BO}+S_{BI})+w_2(S_{DO}+S_{DI})+w_3(S_{FO}+S_{FI})\} \quad \text{[Equation 2]}$$

Furthermore, it is considered that the reason why the ball 106 (206) curves in an unintended direction is mainly due to a way of the downswing. Thus, in this embodiment, on the basis of the sizes of the outside area $S_{DO}$ and the inside area $S_{DI}$ in a case that the downswing is designated, a direction of the curve (moving direction) is decided. That is, by the amount of the curve R and the direction of the curve (moving direction), a vector (change vector) for changing the trajectory of the ball 106 (206) is decided. In this embodiment, in a case that the outside area $S_{DO}$ is larger than the inside area $S_{DI}$, the amount of curve R is added to the right direction, and the trajectory of the ball 106 is changed like a slice (curved to the right). In the reverse case, the amount of curve R is added to the left direction, and the trajectory of the ball 106 is changed like a hook (curved to the left).

Accordingly, similar to the normal golf, a dramatic effect can be given. Example is that a hook or a slice occurs irrespective of a straight ball being hit, or the trajectory is not curved more than the estimated trajectory 110 or the trajectory is curved more than the estimated trajectory 110 irrespective of a fade or a draw being hit.

It should be noted that in this embodiment, the moving direction (direction of the curve) is decided on the basis of the difference in a case that the downswing is designated, but there is no need of being restricted thereto. That is, the moving direction may be decided on the basis of the differences as to all of the backswing, the downswing and the follow-through. Furthermore, on the basis of the differences in a case that the downswing and the follow-through are designated, the moving direction may be decided. In addition, on the basis of the differences in a case that the backswing and the downswing are designated, the moving direction may be decided.

Although illustration is omitted, as described above, in a case that the guide path 210 (2102) is transformed, the differences in a case that the downswing and the follow-through are designated are calculated from the transformed guide path 2102 and the depicted path 230.

In addition, FIG. 22(A) and FIG. 22(B) show a case that the closed regions are formed between the guide path 210 and the depicted path 230, but these paths are not necessarily crossed with each other. In such a case, by connecting a point (position where the speed of the sliding operation is 0) where a sliding operation is reversed or touch-off is performed and a point on the guide path 210 having the shortest distance, the closed region is formed to calculate the area.

Furthermore, as described above, in a case that a sliding operation is executed, the precision, the speed, the smoothness of the sliding operation are reflected on the moving distance and the moving direction of the ball 106. Here, when separately considered on the backswing, the downswing and the follow swing, it can be said that the influence given to the moving distance and the moving direction by the ball 106 is the greatest as to the downswing. Furthermore, in a case of the intentional shot, the follow-through after the impact is relatively important. Accordingly, in this embodiment, as shown in FIG. 23(A) and FIG. 23(B), in a case that the backswing, the downswing and the follow-through are designated in a sliding operation, the influence given to the ball 106 is weighted.

As shown in FIG. 23(A), in a case of the normal shot, the influence exerted on the moving amount and the moving direction of the ball 106 by the precision, the speed and the smoothness of the sliding operation is 20% for the backswing, 70% for the downswing, and 10% for the follow-through.

Furthermore, as shown in FIG. 23(B), in a case of the intentional shot, the influence exerted on the moving amount and the moving direction of the ball 106 by the precision, the speed and the smoothness of the sliding operation is 20% for the backswing, 50% for the downswing, and 30% for the follow-through.

Accordingly, as shown in FIG. 12(A) to FIG. 15(A), the value of each of the parameters, such as the precision, the speed and the smoothness of the sliding operation is added in accordance with a sliding operation, but in this embodiment, the value to be added is different among the backswing, the downswing and the follow-through. Furthermore, in this embodiment, it is determined whether or not each of the precision, the speed and the smoothness of the sliding operation satisfies the predetermined condition for each game frame. In a case that the predetermined condition is satisfied, a predetermined point is added, but the point to be added is different by the weight set in correspondence with the backswing, the downswing, and the follow-through.

For example, in a case of the weight of the normal shot shown in FIG. 23(A), when it is determined that each of the precision, the speed and the smoothness of the sliding operation satisfies the predetermined condition, 0.2 point is added at the backswing, 0.7 point is added at the downswing and 0.1 point is added at the follow-through, and if the conditions are not satisfied, no point is added. A point may be added at a ratio in correspondence with the result of the comparison with the condition regarding the above-described values as maximum values as well as the determination of the presence or absence of the addition.

In addition, as shown in FIG. 23(B), in a case of the intentional shot, if it is determined that each of the precision, the speed and the smoothness of the sliding operation satisfies the predetermined condition, 0.2 point is added at the backswing, 0.5 point is added at the downswing, and 0.3 point is added at the follow-through.

It should be noted that the weights shown in FIG. 23(A) and FIG. 23(B) are mere one example, and need not be restricted thereto. For example, each of the precision, the speed and the smoothness of the sliding operation can variably be set for each of the backswing, downswing and follow-through.

Figure 24:
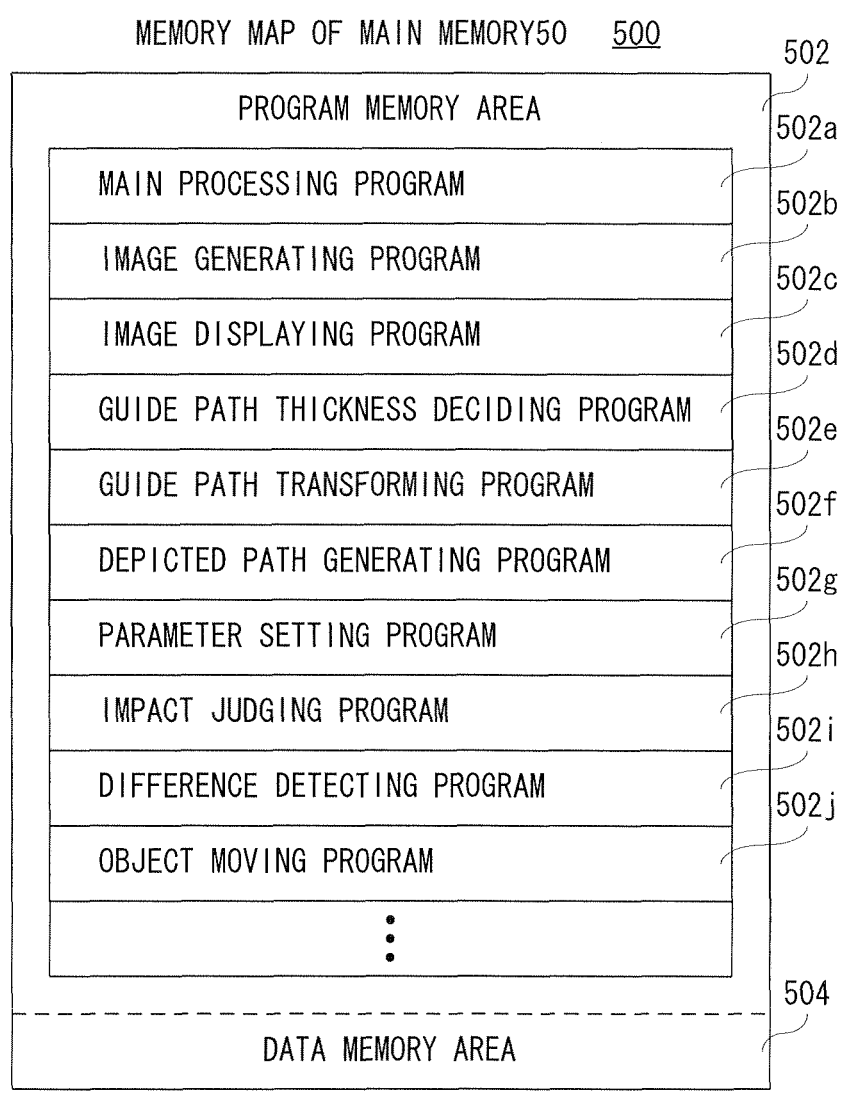
FIG. 24 is an illustrative view showing one example of a memory map of a main memory shown in FIG. 4.

FIG. 24 is an illustrative view showing one example of a memory map 500 of a main memory 50 shown in FIG. 4. As shown in FIG. 24, the main memory 50 includes a program memory area 502 and a data memory area 504. In the program memory area 502, the game program of the golf game of this embodiment is stored. The game program is read from the SD card and the game card respectively attached to the SD card slot 34 and the game card slot 38 or read from the NAND flash memory 48, and developed (loaded) into the main memory 502. This holds true for various data and flags described later.

A game program is made up of a main processing program 502a, an image generating program 502b, an image displaying program 502c, a guide path thickness deciding program 502d, a guide path transforming program 502e, a depicted path generating program 502f, a parameter setting program 502g, an impact judging program 502h, a difference detecting program 502i, an object moving program 502j, etc.

The main processing program 502a is a program for processing a main routine of a virtual game (golf game) of this embodiment. The image generating program 502b is a program for generating display image data to display a screen, such as the game screen 100 and the operating screen 200 by utilizing image data 504b described later. The image displaying program 502c is a program for outputting the display image data generated according to the image generating program 502b on the stereoscopic LCD 12 or the lower LCD 14.

The guide path thickness deciding program 502d is a program for deciding the thickness (the number of dots) of the guide path 210 displayed on the operating screen 200. More specifically, the guide path thickness deciding program 502d decides the thickness of the guide path 210 depending on the kind of the club 104 selected by the player. The guide path transforming program 502e is a program for transforming the guide path 210 displayed on the operating screen 200. More specifically, the guide path transforming program 502e transforms the position of the point image 250 in response to a drag of the point image 250 by the player, and transforms the guide path 2102 in correspondence with the position.

The depicted path generating program 502f is a program for generating the depicted path 230 according to a sliding operation by the player, and a set of coordinate data as to the touched positions in chronological order for each game frame, for example. The parameter setting program 502g is a program for setting a parameter in relation to the move of the ball 106. More specifically, the parameter setting program 502g sets a carry of the club Lmax depending on the kind of the club 104 selected by the player, sets the correction value γ due to the state of a lie, wind and rain, and sets and updates the ratio P of the backswing amount, a change vector by the precision of the sliding operation, the correction value α by the speed of the sliding operation and the correction value β of the smoothness of the sliding operation in accordance with a sliding operation by the player.

The impact judging program 502h is a program for determining whether or not the sliding operation (depicted path 230) passes through the impact position (the display position of the judgment image 212), and determining whether or not the depicted path 230 passes through the judgment image 212. Here, the impact judging program 502h determines that the depicted path 230 passes through the impact position in a case that the X-coordinate of the touched position is large than the X-coordinate of the display position of the judgment image 212 at a time of the downswing (downswing flag 504w is turned on).

The difference detecting program 502i is a program for detecting the difference between the guide path 210 and the depicted path 230. As described above, the area of the closed region formed by the guide path 210 and the depicted path 230 is calculated.

The object moving program 502j is a program for moving the ball 106 (ball object) within the virtual space according to a determination result by the impact judging program 502h and each parameter set by the parameter setting program 502g.

It should be noted that although illustration is omitted, in the program memory area 502, a sound output program and a backup program that are included in the game program are also stored. The sound output program is a program for generating and outputting sound necessary for the game, such as voice (onomatopoeic sound) of the player character, sound effect, BGM by using sound data not shown. The backup program is a program for storing (saving) game data (proceeding data, result data) stored in the main memory 50 (data memory area 504) according to a designation by the player and a predetermined event in a memory area, etc. provided to the SD card, the NAND flash memory 48, and the game card.

The game program and game data may be stored in any one of the storage medium such as the game card, the NAND flash memory 48, the SD card, etc. before being read and stored in the main memory 50. In addition, by communications, course data of the golf, etc. are received, and additional data can be stored in the storage medium to be used.

Here, in an example shown in FIG. 24, only a case that the game program of the golf game (application program) is stored is explained, but another application program may sometimes be stored in place of the game program or together with the game program.

FIG. 25 shows the contents of the data memory area 504 included in the main memory 50 in detail. Referring to FIG. 25, the data memory area 504 is provided with an operation data buffer 504a. The operation data buffer 504a stores (temporarily stores) operation data (coordinate data) from the touch panel 16 and operation data from the A, B, X, Y buttons 24a to 24d, the L button 24e, the R button 24f, the cross key (button) 24g, the home, select, start buttons 24h to 24j, and the analog pad 26. The operation data temporarily stored in the operation data buffer 504a is used in the processing by the CPU 44a and erased.

Furthermore, in the data memory area 504, image data 504b, selected club data 504c, shot direction data 504d, guide path data 504e, ball trajectory data 504f, weighted table data 504g, current coordinate data 504h, previous coordinate data 504i, precision data 504j, speed data 504k, smoothness data 504m, depicted path data 504n, backswing ratio data 504p, impact result data 504q, difference data 504r, miss shot data 504s, an intentional shot flag 504t, an in-swing flag 504u, a backswing flag 504v, a downswing flag 504w, and a follow-through flag 504x are stored.

The image data 504b is polygon data and texture data for generating the above-described display image data, and includes animation data for representing a swing motion by the player character 202.

The selected club data 504c is data indicating the kind of the club 104 (204) selected by the computer (CPU 44a) or the player. This makes it possible to decide the carry of the club Lmax and thickness of the guide path 210. The shot direction data 504d is data as to a launching direction (shot direction) of the ball 106 in the virtual space. The guide path data 504e is data of the guide path 210 with the thickness decided depending on the kind of the club 104 (204) represented by the selected club data 504c, and is specifically coordinate data as to a plurality of points making up of the guide path 210. Here, when the guide path 210 is transformed, the guide path data 504e is also updated according thereto. Furthermore, when the kind of the club 104 is decided, the guide path data 504e as to the guide path 210 in a case that the normal shot is hit with the thickness of the club 104 decided depending on the kind of the club 104 is read from the medium (SD card, game card, NAND flash memory 48) from which the game program is read.

The ball trajectory data 504f is data as to the trajectory of the ball 106. As described above, the trajectory is calculated by a simulation according to a shot direction of the ball 106, the kind (carry of the club Lmax) of the selected club 104 (204), the kind of shot, each parameter and the change vector.

The weight table 504g is data of the weighted table in a case of the normal shot shown in FIG. 22(A) and the weighted table in a case of the intentional shot shown in FIG. 22(B). The current coordinate data 504h is coordinate data as to coordinates of a touched position of a current game frame. The previous coordinate data 504i is coordinate data as to coordinates of a touched position directly before the current game frame.

The precision data 504j is data as to a value (0 to 100) of the precision of the sliding operation. The speed data 504k is data as to the value of the speed of the sliding operation (0 to 100). The correction value $\alpha$ is calculated on the basis of the value of the speed of the sliding operation. The smoothness data 504m is data as to a value (0 to 100) of the smoothness of the sliding operation. The correction value $\beta$ is calculated on the basis of the value of the smoothness of the sliding operation.

The depicted path data 504n is a plurality of coordinate data to be input according to a sliding operation, and a plurality of coordinate data are arranged in a chronological order. The backswing ratio data 504p is data as to the ratio P of the backswing amount ($0<P\leq 1$) of the sliding operation of designating the backswing to the maximum backswing amount set to the guide path 210.

The impact result data 504q is data of a determination result as to whether or not the depicted path 230 passes through the judgment image 212 in a case that the sliding operation (depicted path 230) passes through the impact position. The difference data 504r is data of a difference between the guide path 210 and the depicted path 230, and is data as to an area of the closed region formed by the guide path 210 and the depicted path 230. As described above, the area of the closed region formed outside the guide path 210 and the area of the closed region formed inside the guide path 210 are calculated for each of the backswing, the downswing and the follow-through.

The miss shot data 504s is data for setting the kind of miss shot decided in accordance with the impact determination result and smoothness of the swing operation. In this embodiment, as a miss shot, an air shot, a weak grounder, a shank, a duffling or a pop-up are enumerated, and the identification information of the set miss shot is stored (set) as miss shot data 504s. Accordingly, in a case that the miss shot is not performed, null data is stored as miss shot data 504s, for example. Here, if the downswing is stopped halfway through the swing, that is, if touch-off is performed in the course of the sliding operation designating the downswing as well, an air shot or a weak grounder is set.

The intentional shot flag 504t is a flag for determining whether or not hitting the intentional shot is selected, and is constructed of one bit register. When the intentional shot flag 504t is established (turned on), a data value of "1" is set to the register. On the other hand, when the intentional shot flag 504t is not established (turned off), a data value of "0" is set in the register. Here, whether the intentional shot is hit or not is selected by the player on the setting screen (not illustrated).

The in-swing flag 504u is a flag whether or not a swing is being performed, that is, whether or not the player is executing a sliding operation for hitting, and is constructed of one bit register. When the in-swing flag 504u is turned on, a data value "1" is set to the register. On the other hand, if the in-swing flag 504u is turned off, a data value "0" is set to the register.

The backswing flag 504v is a flag for determining whether a sliding operation for designating a backswing or not, and is constructed of one bit register. When the backswing flag 504v is turned on, the data value "1" is set to the register. On the other hand, when the backswing flag 504v is turned off, a data value "0" is set to the register.

The downswing flag 504w is a flag for determining whether a sliding operation for designating a downswing or not, and is constructed of one bit register. When the downswing flag 504w is turned on, a data value "1" is set to the register. On the other hand, when the downswing flag 504w is turned off, a data value "0" is set to the register.

The follow-through flag 504x is a flag for determining whether a sliding operation for designating the follow-through or not, and is constructed of one bit register. When the follow-through flag 504x is turned on, a data value "1" is set to the register. On the other hand, when the follow-through flag 504x is turned off, a data value "0" is set to the register.

Naturally, in a case that any one of the backswing flag 504v, the downswing flag 504w and the follow-through flag 504x is turned on, the other two flags are turned off.

It should be noted that although an illustration is omitted, in the data memory area 504, other data, such as data as to the estimated trajectory 110 and the sound data are stored, or other flags and timers (counters) necessary for execution of the game program are also set.

Figure 26:
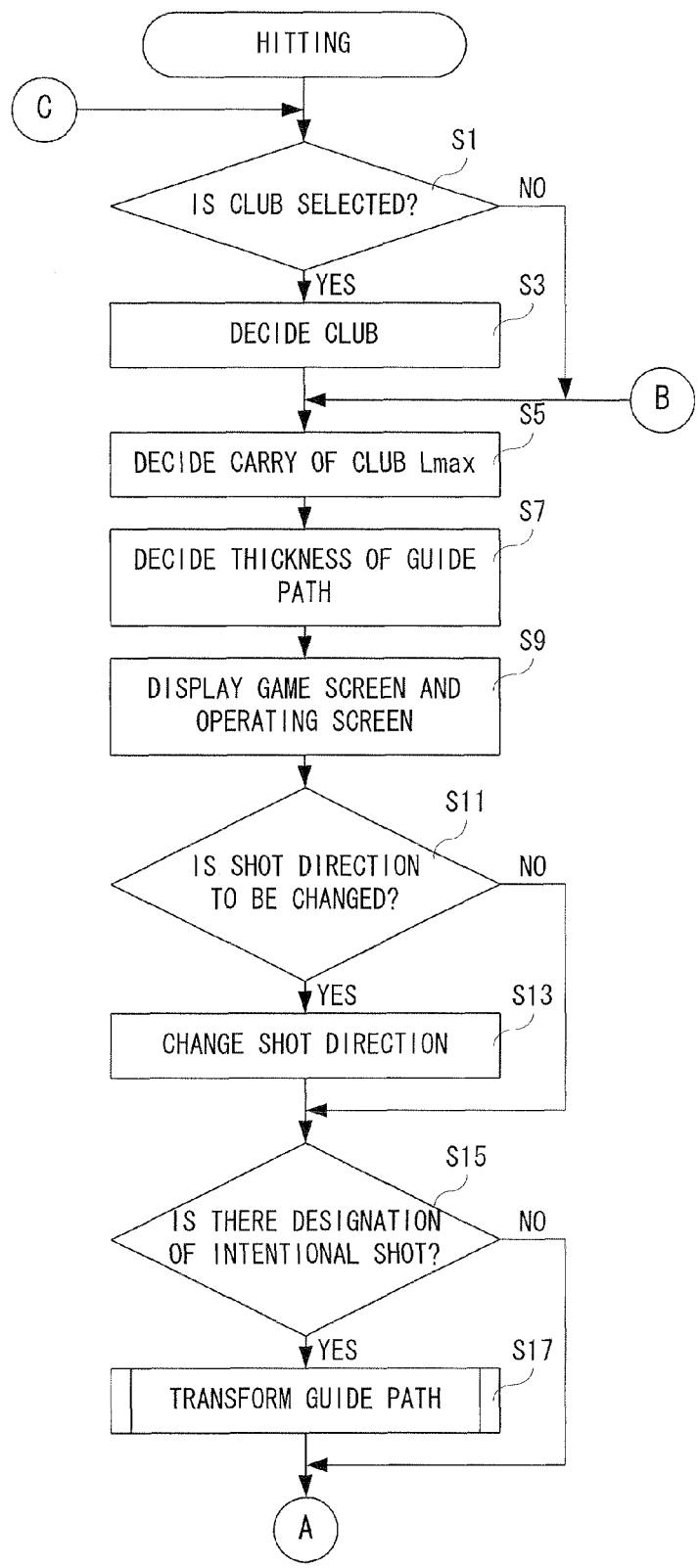
FIG. 26 is a flowchart showing a first part of hitting processing by the CPU shown in FIG. 4.

FIG. 26 to FIG. 31 is a flowchart showing hitting processing of the golf game of this embodiment. As shown in FIG. 26, when starting the hitting processing, the CPU 44a determines whether or not the club 104 is selected in a step S1. That is, the CPU 44a determines whether or not the setting screen not shown is displayed on the lower LCD 14, and selecting the club 104 (204) is designated.

It should be noted that although illustration is omitted, at a start of the hitting processing, the club 104 (204) selected by the computer (CPU 44a) is decided as a club 104 (204) to be used in accordance with a distance to the green or the cup or the state of the lie. Thus, it is possible to select the club 104 (204) decided in advance.

If "NO" in the step S1, that is, if selecting the club 104 is not designated, the process proceeds to a step S5 as it is. On the other hand, if "YES" in the step S1, that is, if selecting the club 104 is designated, the selected club 104 is decided as a club 104 to be used in a step S3, and a carry of the club Lmax is decided in a step S5.

In a succeeding step S7, thickness of the guide path 210 is decided. Here, the CPU 44a reads the guide path data 504e as to the guide path 210 in a case that a normal shot is hit with the thickness decided depending on the club 104 to be used, and stores the same in the data memory area 504. Next, in a step S9, the game screen 100 shown in FIG. 11(A) is displayed on the stereoscopic LCD 12, and the operating screen 200 shown in FIG. 11(B) is displayed on the lower LCD 14. At this time, on the operating screen 200, the guide path 210 according to the guide path data 504e is displayed at a predetermined position. Here, the player character 202 holding the club 204 selected by the player or the computer (CPU 44a) and being in an address state is displayed at a predetermined position inside the guide path 210, and the teach image 220 is displayed at a predetermined position in the upper right direction of the guide path 210.

In a succeeding step S11, it is determined whether or not the shot direction is to be changed. Here, the CPU 44a determines whether or not the operation data as to the left button or the right button of the cross key (button) 24g is stored in the operation data buffer 504a. If "NO" in the step S11, that is, if the shot direction is not to be changed, the process proceeds to a step S15 as it is. On the other hand, if "YES" in the step S11, that is, if the shot direction is to be changed, the shot direction is changed according to an operation by the player in a step S13, and then, the process proceeds to the step S15.

It should be noted that although illustration in detail is omitted, before the hitting operation, the computer (CPU 44a) decides the direction connecting from the current position of the ball 106 to the position of the cup by the straight line as a shot direction (two-dimensional direction), and the shot direction data 504d corresponding thereto is stored. Thus, it is possible to change the shot direction set in advance.

In the step S15, it is determined whether or not there is a designation of the intentional shot. Here, the CPU 44a determines whether or not the intentional shot is selected on the setting screen not shown. If the intentional shot is not selected here, the normal shot is selected. If "NO" in the step S15, that is, if there is no designation of the intentional shot, the process proceeds to a step S19 shown in FIG. 27 as it is. On the other hand, if "YES" in the step S15, that is, if there is a designation of the intentional shot, guide path transforming processing (see FIG. 32) described later is executed in a step S17, and the process proceeds to the step S19.

Figure 27:
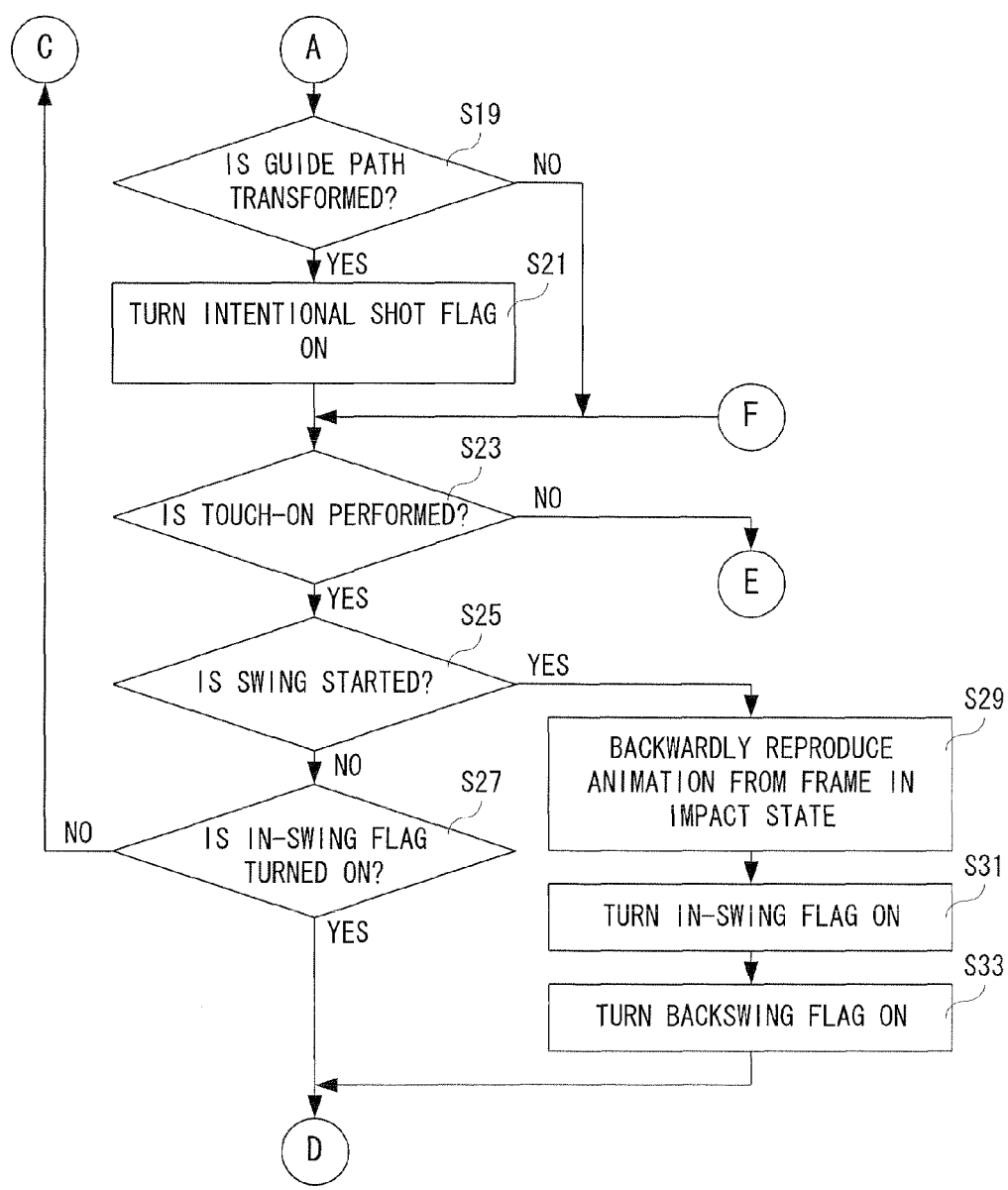
FIG. 27 is a flowchart showing a second part of the hitting processing by the CPU shown in FIG. 4 and being a sequel to FIG. 26.

In the step S19 shown in FIG. 27, it is determined whether or not the guide path 210 is transformed. That is, the CPU 44a determines whether or not the point image 250 is moved to a position except for the initial position. If "NO" in the step S19, that is, if the guide path 210 is not transformed, the process proceeds to a step S23. On the other hand, if "YES" in the step S19, that is, if the guide path 210 is transformed, the intentional shot flag 504t is turned on in a step S21, and the process proceeds to the step S23.

In the step S23, it is determined whether or not touch-on is performed. That is, the CPU 44a determines whether or not the coordinate data from the touch panel 16 is stored in the operation data buffer 504a. If "NO" in the step S23, that is, if touch-off is performed, the process proceeds to a step S81 shown in FIG. 31. If "YES" in the step S23, that is, if touch-on is performed, it is determined whether or not a swing is started in a step S25. That is, the CPU 44a determines whether or not a touch-off state shifts to a touch-on state, and the touched position is on the judgment image 212.

If "NO" in the step S25, that is, if it is not the start of the swing, it is determined whether or not the in-swing flag 504u is turned on in a step S27. That is, it is determined whether or not a sliding operation for designating a motion of the swing is started. If "NO" in the step S27, that is, if the in-swing flag 504u is turned off, it is determined that the sliding operation of designating the swing motion is not started, and the process returns to the step S1 shown in FIG. 26. On the other hand, if "YES" in the step S27, that is, if the in-swing flag 504u is turned on, it is determined that the sliding operation of designating the swing motion is started, and the process proceeds to a step S35 shown in FIG. 28.

On the other hand, if "YES" in the step S25, that is, if the swing is started, the animation frame is backwardly reproduced from the frame in the impact state (the 60-th frame) in a step S29. Accordingly, the motion of the backswing is started. Succeedingly, in a step S31, the in-swing flag 504u is turned on, and in a step S33, the backswing flag 504 vis turned on, and the process proceeds to the step S35.

Figure 28:
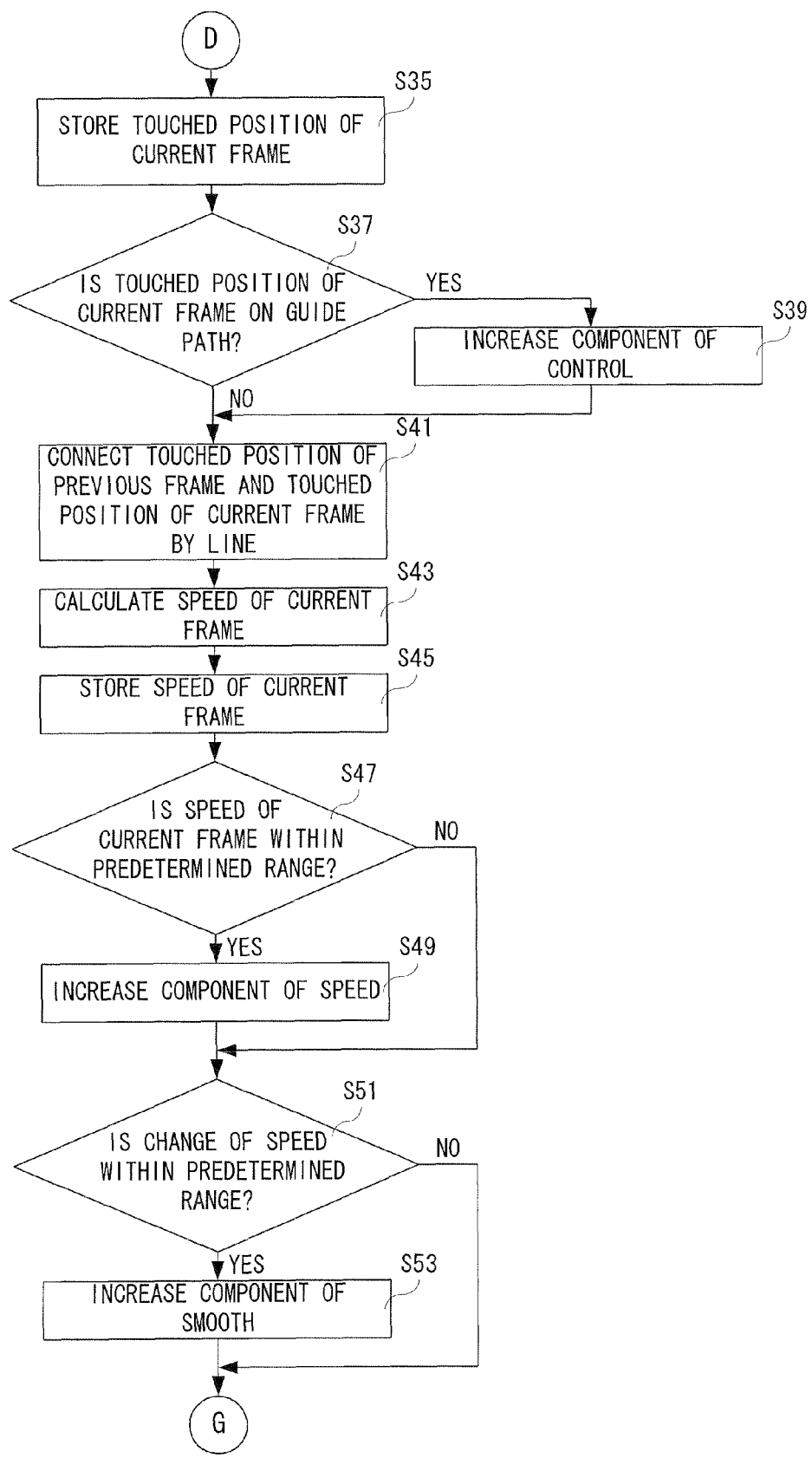
FIG. 28 is a flowchart showing a third part of the hitting processing by the CPU shown in FIG. 4 and being a sequel to FIG. 27.

As shown in FIG. 28, in the step S35, the touched position of the current frame is stored. Here, the CPU 44a stores a copy of the current coordinate data 504h as previous coordinate data 504i, and reads the coordinate data as to the touched position of the current frame from the operation data buffer 504a to store the same in the current coordinate data 504*h*. In a next step S37, it is determined whether or not the touched position of the current frame is on the guide path 210. That is, the CPU 44*a* determines whether or not coordinate data the same as the current coordinate data 504*h* is included in the guide path data 504*e*.

If "YES" in the step S37, that is, if the touched position of the current frame is on the guide path 210, it is determined that a sliding operation is precisely performed, the component of the control is increased in a step S39, and the process proceeds to a step S41. That is, in the step S39, the CPU 44*a* adds a point of a ratio indicated by the weight table depending on the kind of shot and the swing motion with reference to the intentional shot flag 504*t*, the backswing flag 504*v*, the downswing flag 504*w* and the follow-through flag 504*x*. That is, the precision data 504*j* is updated, and the display of the component (C) of the precision of the teach image 220 is updated. This holds true for a case that the parameter is updated (point is added) in steps S49 and S53 described later. On the other hand, if "NO" in the step S37, that is, if the touched position of the current frame is not on the guide path 210, it is determined that the sliding operation is not precise, and the process proceeds to the step S41 as it is.

In the step S41, the touched position of the previous frame and the touched position of the current frame are connected by a line. That is, the position indicated by the previous coordinate data 504*i* and the position indicated by the current coordinate data 504*h* are connected by a line to thereby draw a path as to a sliding operation by the player. That is, the depicted path 230 is displayed (updated). In a next step S43, the speed of the current frame is calculated. More specifically, a distance between the position indicated by the previous coordinate data 504*i* and the position indicated by the current coordinate data 504*h* is calculated, and the calculated distance is divided by one game frame (1/60 second), to thereby calculate the speed of the current frame. That is, the speed of the sliding operation is calculated. When the speed of the current frame is calculated, the speed is stored in chronological order in a buffer area (illustration is omitted) of the data memory area 504 in a step S45.

Successively, in a step S47, it is determined whether or not the speed of the current frame is within a predetermined range (the touched position changes by one to five dots for one game frame, for example). If "NO" in the step S47, that is, if the speed of the current frame is out of the predetermined range, it is determined that the sliding operation is too quick or too late, and the process proceeds to a step S51 as it is. On the other hand, if "YES" in the step S47, that is, if the speed of the current frame is within a predetermined range, it is determined that the speed of the sliding operation is within an assumed range, and the component of the speed is increased in the step S49, and the process proceeds to the step S51. That is, in the step S49, the speed data 504*k* is updated, and thus, the display of the component of the speed (Sp) of the teach image 220 is updated.

In the step S51, it is determined whether or not the change in speed is within a predetermined value (two to three dots/game frame, for example). The CPU 44*a* determines whether or not the difference (change of speed) between the speed of the current frame and the speed of the previous frame is within a predetermined value with reference to the speed of each frame stored in the buffer area in chronological order. If "NO" in the step S51, that is, if the change of speed is above the predetermined value, it is determined that the sliding operation is not smooth, and the process proceeds to a step S55 shown in FIG. 29 as it is. On the other hand, if "YES" in the step S51, that is, if the change of speed is within the predetermined value, it is determined that the sliding operation is smooth, and the component of the smooth is increased in the step S53, and the process proceeds to the step S55. That is, in the step S53, the smoothness data 504*m* is updated, and thus, the display of the component of smoothness (Sm) of the teach image 220 is updated.

Figure 29:
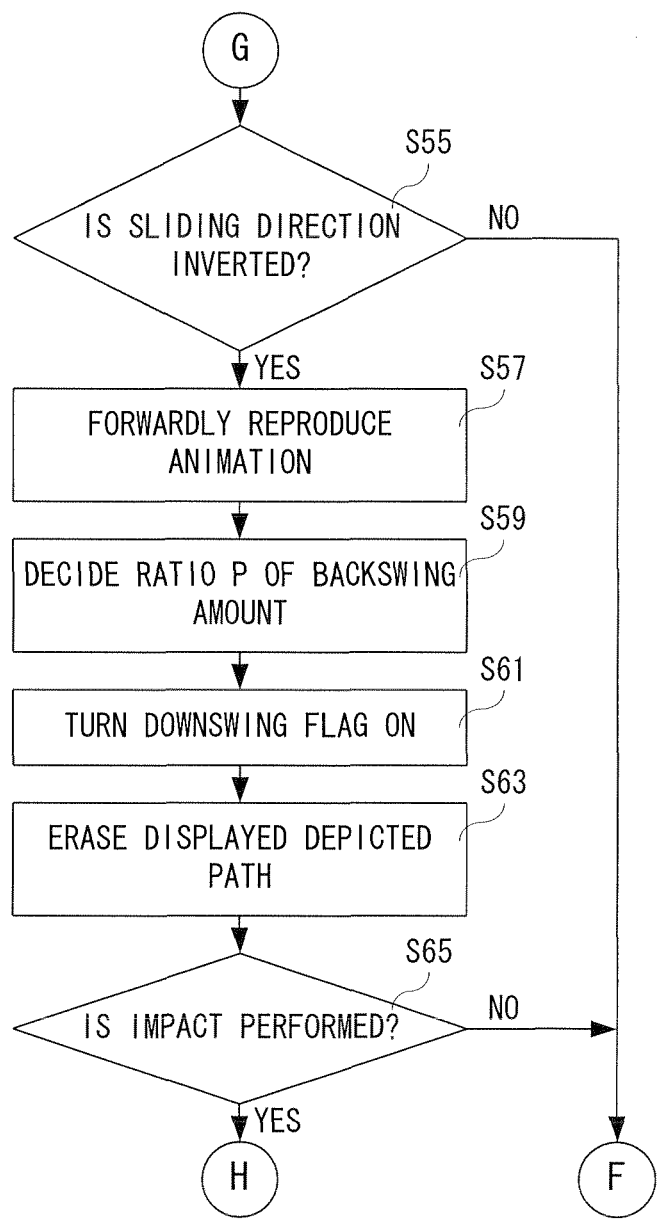
FIG. 29 is a flowchart showing a fourth part of the hitting processing by the CPU shown in FIG. 4, and being a sequel to FIG. 28.
Figure 30:
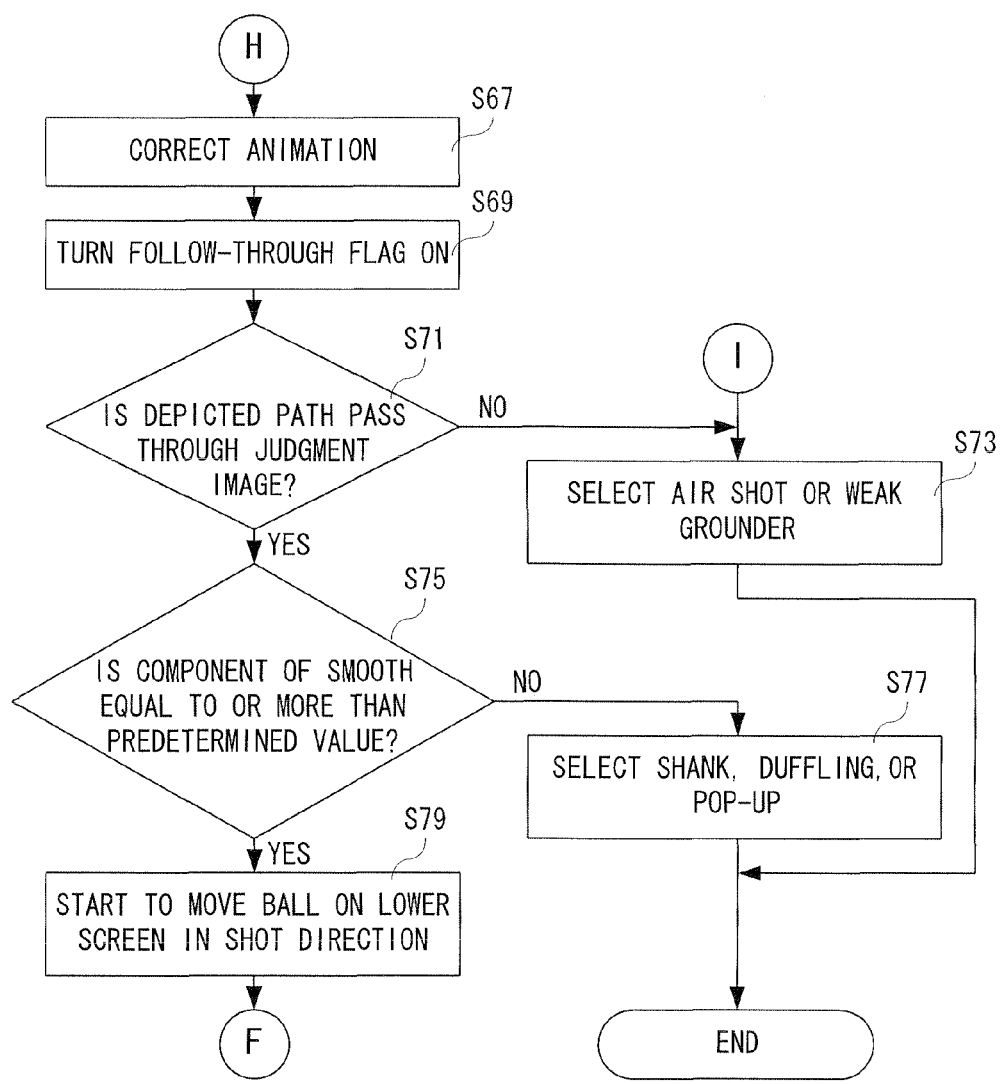
FIG. 30 is a flowchart showing a fifth part of the hitting processing by the CPU shown in FIG. 4, and being a sequel to FIG. 29.

In the step S55 shown in FIG. 29, it is determined whether or not the sliding direction is inverted. Here, the CPU 44*a* determines whether or not the touched position detected at the game frame directly before the game frame when the speed of the sliding operation (speed of the current frame) is 0 ("noting frame", here) and the touched position detected at the game frame directly after the noting frame are in the same or approximately the same direction when viewed from the touched position detected at the noting frame. Then, the CPU 44*a* determines that the sliding direction is inverted if they are in the same or approximately the same direction, and determines that the slide direction is not inverted if the directions are different from each other by 90 angles or more.

If "NO" in the step S55, that is, if the sliding direction is not inverted, it is determined that the designation of the backswing is continued, and the process returns to the step S23 shown in FIG. 27 as it is. On the other hand, if "YES" in the step S55, that is, if the sliding direction is inverted, the animation frame is forwardly reproduced from the frame number in a step S57. Accordingly, a motion of the downswing is started. In a step S59, the ratio P of the backswing amount is decided, and in a step S61, the downswing flag 504*w* is turned on. Although illustration is omitted, when the downswing flag 504*w* is turned on, the backswing flag 504*v* and the follow-through flag 504*x* are turned off. In addition, in a step S63, the displayed depicted path 230 is erased. That is, the depicted path 230 as to the designation of the backswing is erased.

In a next step S65, it is determined whether or not an impact is performed. Here, the CPU 44*a* determines whether or not the downswing flag 504*w* is turned on, and X-coordinate of the touched position is larger than X-coordinate of the display position of the judgment image 212. If "NO" in the step S65, that is, if an impact is not performed, it is determined the sliding operation as to the designation of the downswing is performed, and the process returns to the step S23. On the other hand, if "YES" in the step S65, that is, if the impact is performed, the animation is corrected in a step S67 shown in FIG. 30. Here, if the frame number of the animation frame is less than "60", the updating speed is accelerated to the animation frame (the 60-th frame) as to the impact. Here, if the animation frame is equal to or more than "60", a correction is not required, thus, the process proceeds to a step S69 without execution of the processing in the step S67.

In the next step S69, the follow-through flag 504*x* is turned on. Although illustration is omitted, when the follow-through flag 504*x* is turned on, the backswing flag 504*v* and the downswing flag 504*w* are turned off. In a succeeding step S71, it is determined whether or not the depicted path 230 passes through the judgment image 212. That is, the CPU 44*a* determines whether or not there is a position within the range of the display position of the judgment image 212 out of the positions indicated by the coordinate data included in the depicted path data 504*n*. If "NO" in the step S71, that is, if the depicted path 230 does not pass through the judgment image 212, the air shot or the weak grounder is randomly selected in a step S73, and the hitting processing is ended. That is, in the step S73, the identification information indicating the air shot or the weak grounder is set as miss shot data 504s. Thus, in the main routine of the golf game not shown, the game screen 100 showing a situation in which the player character performs an air shot and a weak grounder is displayed on the stereoscopic LCD 12. Here, in a case of the weak grounder, the ball 106 is moved in the trajectory set in advance. In a case that the sliding operation (depicted path 230) is not across the judgment image 212, a miss shot, such as an air shot and a weak grounder is selected irrespective of the precision, the speed and the smoothness of the sliding operation.

Furthermore, if "YES" in the step S71, that is, if the depicted path 230 passes through the judgment image 212, it is determined whether or not the component of the smooth is equal to or more than a predetermined value (50, for example) in a step S75. That is, the CPU 44a determines whether or not the value indicated by the smoothness data 504m is equal to or more than the predetermined value. If "NO" in the step S75, that is, if the component of the smooth is less than the predetermined value, shank, duffling or pop-up is randomly selected in a step S77 to thereby end the hitting processing. That is, in the step S77, the identification information indicating the shank, the duffling or the pop-up is set as miss shot data 504s. Accordingly, in the main routine of the golf game, a game screen 100 showing a situation in which a shank, a duffling or a pop-up is performed is displayed on the stereoscopic LCD 12, and the ball 106 is moved according to the trajectory set in advance. Thus, in a case that the precision of the sliding operation (depicted path 230) is extremely bad, the miss shot, such as the shank, the duffling or the pop-up is selected irrespective of the speed and the smoothness of the sliding operation.

Furthermore, if "YES" in the step S75, that is, if the smooth component is equal to or more than the predetermined value, the ball 206 displayed on the operating screen 200 starts to be moved in the shot direction in a step S79, that is, the operating screen 200 showing a situation in which the player character 202 hits the ball 206 is displayed, and the process returns to the step S23.

It should be noted that in this embodiment, in order to prevent a fraud such as execution of a speed-up of the sliding operation only at a time of the impact, whether the miss shot or not is determined by the smoothness as to the entire sliding operation. However, there is no need of being restricted thereto. For example, in a case that a significant change in speed occurs at a part of the sliding operation as well, the miss shot may be performed. In such a case, for example, it is determined whether or not the change amount of the speed is equal to or more than a certain threshold value (5 dots/game frame, for example) between the steps S49 and S51, or between the steps S53 and S55. In a case that the change amount of the speed is equal to or more than the threshold value, a miss shot (shank, duffling, or pop-up, for example) is determined, and if the change amount of the speed is less than the threshold value, the swing motion may be continued.

Figure 31:
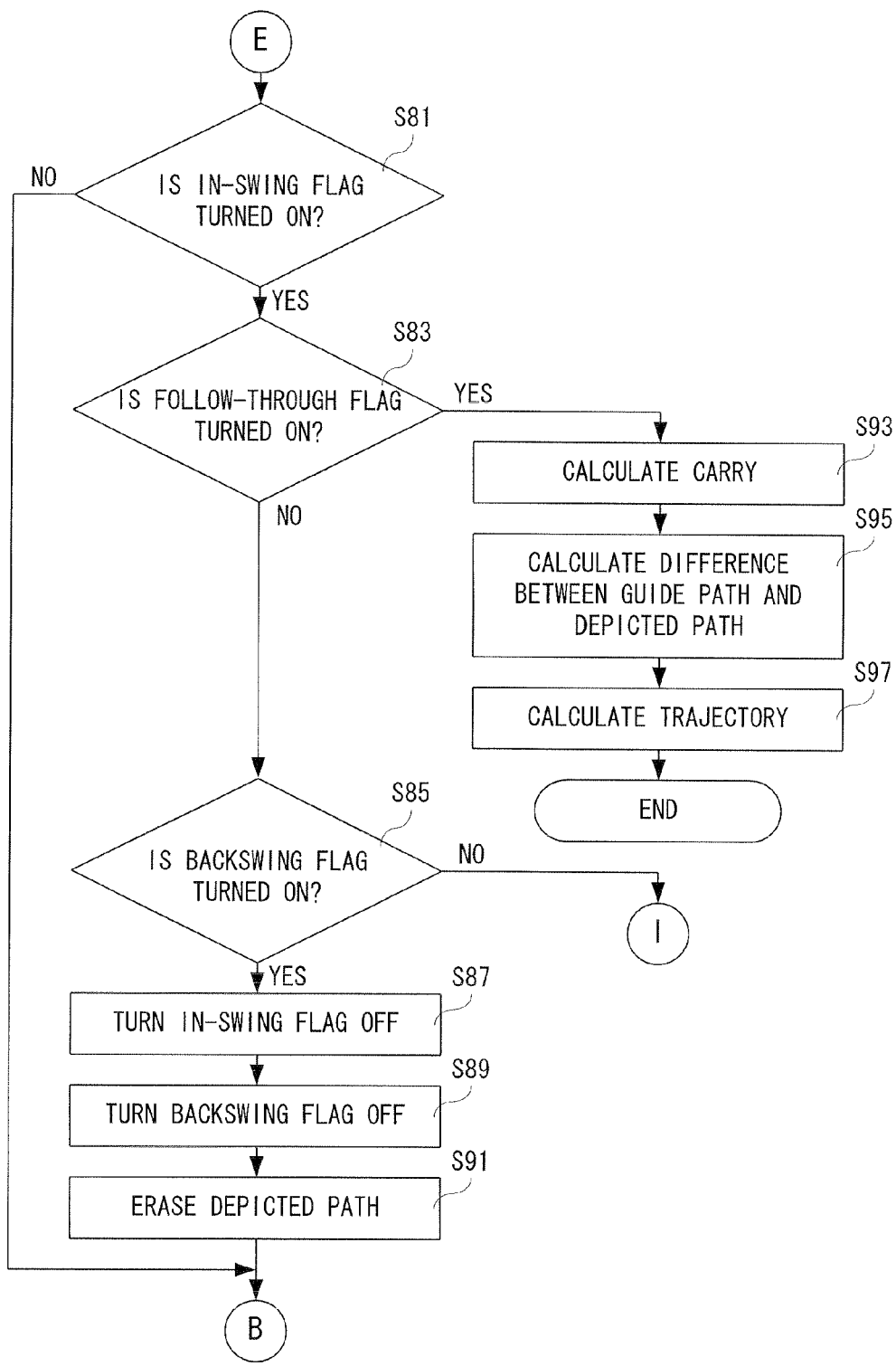
FIG. 31 is a flowchart showing a sixth part of the hitting processing by the CPU shown in FIG. 4, and being a sequel to FIG. 27.

As described above, if "NO" in the step S23, that is, if touch-off is performed, it is determined whether or not the in-swing flag 504u is turned on in the step S81 shown in FIG. 31. That is, the CPU 44a determines whether or not the designation of the swing motion is performed. If "NO" in the step S81, that is, if the in-swing flag 504u is turned off, it is determined that the designation of the swing motion is not performed, and the process returns to the step S1 shown in FIG. 26.

However, if "YES" in the step S81, that is, if the in-swing flag 504u is turned on, that is, if the designation of the swing motion is performed, it is determined that the end is designated, and then, it is determined whether or not the follow-through flag 504x is turned on in a step S83. That is, the CPU 44a determines whether the designation of the swing motion is stopped halfway, or the designation of the swing motion is totally performed and ended.

If "NO" in the step S83, that is, if the follow-through flag 504x is turned off, the designation of the swing motion is stopped halfway, and it is determined whether or not the backswing flag 504v is turned on in a step S85. If "NO" in the step S85, that is, if the backswing flag 504v is turned off, it is determined that the downswing is being performed, and then, the process proceeds to the step S73 shown in FIG. 30. That is, the miss shot (air shot, weak grounder) is determine by the stop of the downswing halfway. On the other hand, if "YES" in the step S85, that is, if the backswing flag 504v is turned on, it is determined that the swing is restarted, in a step S87, the in-swing flag 504u is turned off, in a step S89, the backswing flag 504v is turned off, in a step S91, the depicted path 230 is erased, and the process returns to the step S5 shown in FIG. 26. Here, in the step S91, the depicted path data 504n is totally erased.

Furthermore, if "YES" in the step S83, that is, if the follow-through flag 504x is turned on, it is determined that the designation of the swing motion is totally performed and ended, and in a step S93, a carry L is calculated according to the Equation 1. At this time, the club carry Lmax of the club 104 selected by the player or the computer (CPU 44a) is used. Furthermore, the ratio of the backswing P indicated by the backswing ratio data 504p decided by the sliding operation, a correction value α based on the point indicated by the speed data 504k, and a correction value β based on the point indicated by the smoothness data 504m are utilized. In addition, the correction value γ by the state of lie, etc. decided in the virtual space is utilized.

In a next step S95, the difference between the guide path 210 and the depicted path 230 is calculated. As described above, as to each of the backswing, the downswing and the follow-through, a difference (area of the closed region) is calculated. Then, the correction value of the trajectory of the ball 106, that is, a change vector (direction and moving amount) is decided.

Then, in a step S97, the trajectory of the ball 106 is calculated by a simulation. That is, in the step S97, by using the kind of shot, the shot direction, the carry L calculated in the step S93, and the change vector calculated in the step S95, the trajectory of the ball 106 is calculated. Accordingly, in the main routine of the golf game, the ball 106 moves according to the calculated trajectory. Then, the situation is displayed on the stereoscopic LCD 12. Here, an image at an instant when the ball 106 (206) is hit and an image directly after (2 to 3 seconds after) are displayed on the lower LCD 14, and a situation in which the ball 106 moves is displayed on the stereoscopic LCD 12 so as to inform the player of the situation thereafter.

It should be noted that in the hitting processing shown in FIG. 26 to FIG. 31, in a case that touch-off is performed, the designation of the swing is ended, but as described above, in a case that touch-on is performed, when the touched position reaches the end point 210b as well, the designation of the swing is ended. In such a case, the touched position does not necessarily designate the end point 210b, and therefore, in a case that the follow swing flag 504x is turned on, if the Y-coordinate of the touched position is equal to or less than the Y-coordinate of the end point 210b, it is determined that the designation of the swing is ended.

Figure 32:
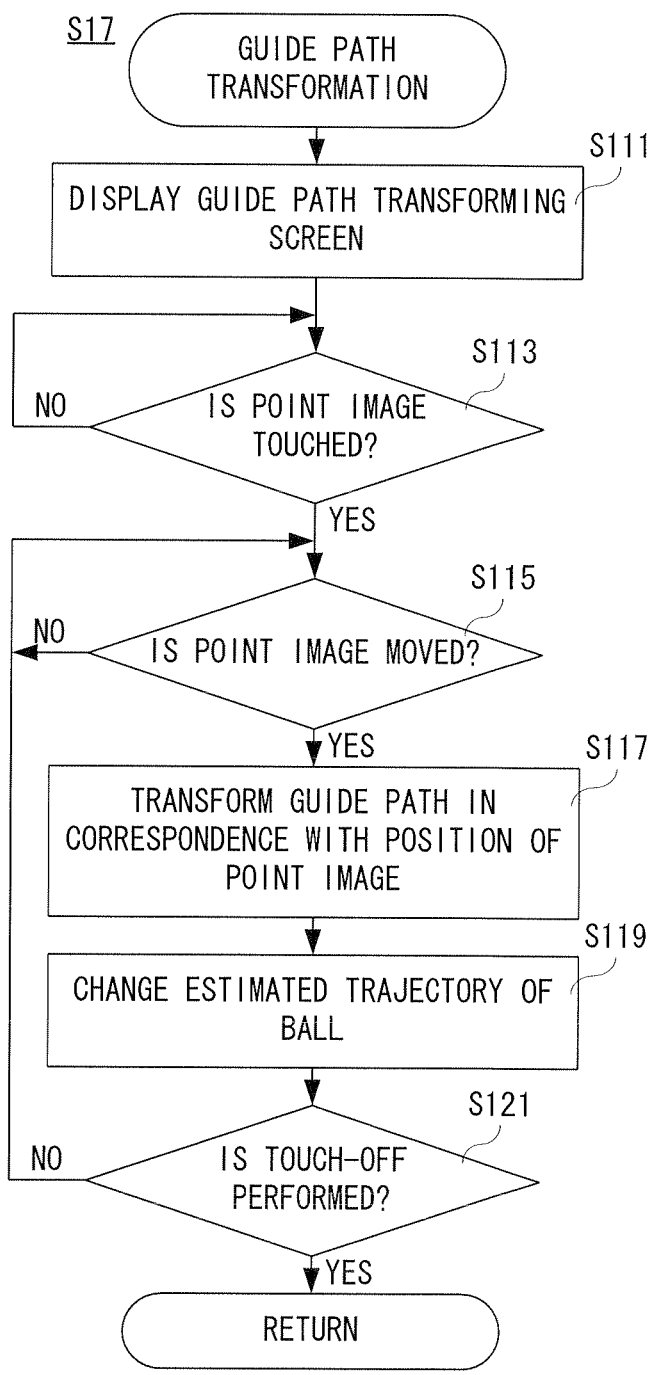
FIG. 32 is a flowchart showing guide path transforming processing by the CPU shown in FIG. 4.

FIG. 32 is a flowchart showing guide path transforming processing in the step S17 shown in FIG. 26. As shown in FIG. 32, when starting the guide path transforming processing, the CPU 44a displays a guide path transforming screen on the lower LCD 14 in a step S111. That is, as shown in FIG. 15(B), the operating screen 200 on which the point image 250 is displayed is displayed on the lower LCD 14.

In a succeeding step S113, it is determined whether or not the point image 250 is touched. If "NO" in the step S113, that is, if the point image 250 is not touched, the process returns to the same step S113 as it is. On the other hand, if "YES" in the step S113, that is, if the point image 250 is touched, it is determined whether or not the point image 250 is moved in a step S115. Here, the point image 250 is moved according to a dragging operation, and therefore, the CPU 44a may determine whether or not the touched position is changed.

If "NO" in the step S115, that is, if the point image 250 is not moved, the process returns to the step S115 as it is. On the other hand, if "YES" in the step S115, if the point image 250 is moved, the guide path 210 (guide path 2102) is transformed in correspondence with the position of the point image 250 in a step S117. That is, in the step S117, the coordinate data included in the guide path data 504e is updated. In a next step S119, the estimated trajectory 110 of the ball 106 is changed. That is, in the step S119, by using the kind of shot decided in correspondence with the position of the point image 250 (touched position) and the amount of curve decided in correspondence with the X coordinate of the position, the estimated trajectory 110 is changed.

In a succeeding step S121, it is determined whether or not touch-off is performed. If "NO" in the step S121, that is, if touch-off is not performed, the process returns to the step S115 as it is. On the other hand, if "YES" in the step S121, that is, if touch-off is performed, the process returns to the hitting processing.

According to this embodiment, depending on the precision, the speed and the smoothness of the sliding operation in a case that the guide path is traced to the swing of the golf, the movement of the ball is controlled, capable of having a feeling as if the player actually plays the golf. That is, it is possible to provide the game apparatus allowing a novel operation with the use of the pointing device, such as the touch panel. Furthermore, it is possible to increase interest of the golf game.

It should be noted that in this embodiment, only the hand-held game apparatus provided with a touch panel is explained, but this can be applied to the Wii (registered trademark, game apparatus manufactured and marketed by the applicants) or game apparatuses utilizing other pointing devices such as a computer mouse, a pen tablet or a touch pad. In this case, an indicative image as described in this embodiment is displayed on the operating screen to thereby need to inform the player of the designated position by the pointing device.

Furthermore, in this embodiment, only the guide paths as to the downswing and the follow-through may be transformed at a time of transforming the guide path, but the guide path of the backswing may also be transformed.

In addition, in this embodiment, a sliding operation is executed so as to trace the guide path in the hitting operation of the golf game, and the movement of the golf ball is controlled in correspondence with the precision, but there is no need of being restricted thereto. For example, in a throwing motion of a bowling game, the guide path as shown in the above description is displayed, and a sliding operation is executed so as to trace the guide pass, to thereby perform a movement control of the bowling ball (ball object) in correspondence with the precision, the speed, and the smoothness.

In addition, in this embodiment, an explanation is made on the game apparatus, but the present invention can be applied to an information processing apparatus (PC, PDA, cellular phone, TV, electronic photo frame, sound/video player, various information appliance, etc. other than the game apparatus) for displaying a virtual space on an autostereoscopic displayable display.

Furthermore, in this embodiment, the display (stereoscopic LCD 12, lower LCD 14) is integrally provided with the game apparatus, but it may be provided independent of the game apparatus. The input device (touch panel 16, button 24a-24k, analog pad 26, microphone 30, cameras 18a-18c, etc., for example) may also be provided integrally with or independent of the game apparatus.

This invention can be applied to a game system (information processing system) in which respective processing by the game processing (information processing) is distributedly performed by a plurality of computers, etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for playing a game, comprising:
   a display configured to display a game image;
   a touch panel provided on the display;
   a processing system comprising at least one processor communicatively coupled to the display and to the touch panel, configured to perform operations comprising:
      receive a first slide input of moving a touched position in a first direction on the touch panel, and a second slide input of moving the touched position in a second direction opposed to the first direction, the second slide input being performed following the first slide input;
      based upon the first slide input, determining a first precision amount representing how precisely a first path defined by the first slide input corresponds to a predetermined path, wherein the first precision amount varies based on a magnitude of a difference between the first path and the predetermined path;
      based upon the second slide input, determining a second precision amount representing how precisely a second path defined by the second slide input corresponds to the predetermined path, wherein the second precision amount varies based on a magnitude of a difference between the second path and the predetermined path;
   performing processing of moving an object within a virtual game space at least on the basis of the determined first precision amount and the determined second precision amount; and
   displaying a game image from the virtual game space on the display.

2. The apparatus according to claim 1, the operations further comprising:
   setting the predetermined path by a curve with a predetermined thickness in a touch area of the touch panel, wherein the determining a first precision amount and the determining a second precision amount each includes determining whether or not the touched position is on the predetermined path.

3. The apparatus according to claim 2, the operations further comprising:
changing a thickness of the predetermined path on the basis of a selection by a player, wherein
the performing of the processing of moving the object includes, when a finer curve is selected, moving the object at a speed higher than a speed when a bolder curve is selected.

4. The apparatus according to claim 1, the operations further comprising:
transforming the predetermined path on the basis of a designation from a player before the first slide input, wherein
the performing of the processing of moving the object includes changing a moving direction of the object in correspondence with a transformation of the predetermined path.

5. The apparatus according to claim 4, wherein
the predetermined path includes a third path for performing the first slide input in the first direction and a fourth path for performing the second slide input in the second direction, and
the performing of the processing of moving the object including transforming only the fourth path.

6. The apparatus according to claim 4, wherein
the performing of the processing of moving the object includes determining an amount of change of the moving direction of the object in correspondence with the degree of transformation of the predetermined path.

7. The apparatus according to claim 1, the operations further comprising:
determining whether or not the touched position passes through a predetermined position of the predetermined path, wherein
the performing of the processing of moving the object includes starting to move the object when the determining of whether or not the touched position passes through the predetermined position determines that the touched position passes through the predetermined position of the predetermined path.

8. The apparatus according to claim 7, wherein
a pass judging area with a predetermined width is provided at the predetermined position in a direction orthogonal to the predetermined path, wherein
the determining of whether or not the touched position passes through the predetermined position includes determining whether or not the touched position passes through the pass judging area, and wherein
the performing of the processing of moving the object includes moving the object irrespective of determination results by the determining a first precision amount and the determining a second precision amount when the determining of whether or not the touched position passes through the predetermined position determines that the touched position does not pass through the pass judging area.

9. The apparatus according to claim 1, the operations further comprising:
detecting a moving speed of the touched position, wherein
the performing of the processing of moving the object includes controlling a moving speed of the object on the basis of the detected moving speed of the touched position.

10. The apparatus according to claim 9, the operations further comprising:
determining a change of the detected moving speed of the touched position, wherein
the performing of the processing of moving the object includes moving the object irrespective of the determination result by the determining a first precision amount and the determining a second precision amount when the determining of a change of the detected moving speed determines that the change of the moving speed is equal to or more than a predetermined amount.

11. The apparatus according to claim 1, wherein
the object is an object corresponding to a golf ball, and wherein the operations further comprise:
controlling a motion of a character which performs a simulation of a golf shot within the virtual game space;
displaying the character by an animation of a backswing motion while the first slide input is performed; and
displaying the character by an animation of at least a downswing motion while the second slide input is performed.

12. The apparatus according to claim 1, wherein the performing of the processing of moving the object includes determining at least one of a direction or a curve for moving the object based upon the first precision amount and/or the second precision amount.

13. The apparatus according to claim 1, wherein the first precision amount and the second precision amount is determined based upon differences between the predetermined path and the first and second paths, respectively.

14. An apparatus for playing a game, comprising:
a display configured to display a game image;
a pointing device; and
a processing system comprising at least one processor communicatively coupled to the display and to the pointing device, configured to perform operations comprising:
acquiring a first input of moving an input position designated by the pointing device in a first direction on the display, and a second input of moving the input position in a second direction opposed to the first direction performed following the first input;
based upon the first input, determining a first precision amount representing how precisely a first path defined by the first input corresponds to a predetermined path, wherein the first precision amount varies based on a magnitude of a difference between the first path and the predetermined path;
based upon the second input, determining a second precision amount representing how precisely a second path defined by the second input corresponds to the predetermined path, wherein the second precision amount varies based on a magnitude of a difference between the second path and the predetermined path;
performing processing of moving an object within a virtual game space at least on the basis of the determined first precision amount and the determined second precision amount; and
displaying a game image from the virtual game space on the display.

15. A non-transitory computer readable storage medium storing a game program of an apparatus having a display for displaying a game image and a touch panel provided on the display,
the game program when executed by a computer of the game apparatus, causes the computer to perform operations comprising:

receive a first slide input of moving a touched position in a first direction on the touch panel, and a second slide input of moving the touched position in a second direction opposed to the first direction performed following the first slide input;

based upon the first slide input, determining a first precision amount representing how precisely a first path defined by the first slide input corresponds to the predetermined path, wherein the first precision amount varies based on a magnitude of a difference between the first path and the predetermined path;

based upon the second slide input, determining a second precision amount representing how precisely a second path defined by the second slide input corresponds to the predetermined path, wherein the second precision amount varies based on a magnitude of a difference between the second path and the predetermined path;

performing processing of moving an object within a virtual game space at least on the basis of the determined first precision amount and the determined second precision amount; and displaying a game image from the virtual game space on the display.

16. A non-transitory computer readable storage medium storing a game program which, when executed by a computer of a game apparatus, causes the computer to perform operations comprising:

acquiring a first input of moving an input position designated by a pointing device in a first direction on a display configured to display a game image, and a second input of moving an input position designated by the pointing device in a second direction opposed to the first direction performed following the first input;

based upon the first input, determining a first precision amount representing how precisely a first path defined by the first input corresponds to a predetermined path, wherein the first precision amount varies based on a magnitude of a difference between the first path and the predetermined path;

based upon the second input, determining a second precision amount representing how precisely a second path defined by the second input corresponds to the predetermined path, wherein the second precision amount varies based on a magnitude of a difference between the second path and the predetermined path;

performing processing of moving an object within a virtual game space at least on the basis of the first precision amount and the second precision amount; and displaying a game image of the virtual game space on the display.

17. A game system, comprising:

a display configured to display a game image;

a touch panel provided on the display;

a processing system comprising at least one processor communicatively coupled to the display and to the touch panel, configured to perform operations comprising:

receive a first slide input of moving a touched position in a first direction on the touch panel, and a second slide input of moving the touched position in a second direction opposed to the first direction performed following the first slide input;

based upon the first slide input, determining a first precision amount representing how precisely a first path defined by the first slide input corresponds to a predetermined path, wherein the first precision amount varies based on a magnitude of a difference between the first path and the predetermined path;

based upon detecting the second slide input, determining a second precision amount representing how precisely a second path defined by the second slide input corresponds to the predetermined path, wherein the second precision amount varies based on a magnitude of a difference between the second path and the predetermined path;

performing processing of moving an object within a virtual game space at least on the basis of the first precision amount and the second precision amount; and displaying a game image from the virtual game space on the display.

18. A game system, comprising:

a display configured to display a game image;

a pointing device;

a processing system comprising at least one processor communicatively coupled to the display and to the pointing device, configured to perform operations comprising:

acquiring a first input of moving an input position designated by the pointing device on the display in a first direction, and a second input of moving the input position designated by the pointing device on the display in a second direction opposed to the first direction performed following the first slide input;

based upon the first input, determining a first precision amount representing how precisely a first path defined by the first input corresponds to the predetermined path, wherein the first precision amount varies based on a magnitude of a difference between the first path and the predetermined path;

based upon the second input, determining a second precision amount representing how precisely a second path defined by the second input corresponds to the predetermined path, wherein the second precision amount varies based on a magnitude of a difference between the second path and the predetermined path;

performing processing of moving an object within a virtual game space at least on the basis of the first precision amount and the second precision amount; and displaying a game image from the virtual game space on the display.

19. A game controlling method of a game apparatus having a display displaying a game image and a touch panel provided on the display, comprising:

receive a first slide input of moving a touched position in a first direction on the touch panel, and a second slide input of moving the touched position in a second direction opposed to the first direction performed following the first slide input;

determining, based upon the first slide input, a first precision amount representing how precisely a first path defined by the first slide input corresponds to the predetermined path, wherein the first precision amount varies based on a magnitude of a difference between the first path and the predetermined path;

determining, based upon the second slide input, a second precision amount representing how precisely a second path defined by the second slide input corresponds to the predetermined path, wherein the second precision amount varies based on a magnitude of a difference between the second path and the predetermined path;

performing processing of moving an object within a virtual game space at least on the basis of the first precision amount and the second precision amount; and displaying a game image based upon the virtual game space on the display.

20. A game controlling method comprising:

acquiring a first input of moving an input position designated by a pointing device in a first direction on a display configured to display a game image, and a second input of moving the input position in a second direction opposed to the first direction performed following the first input;

determining, based upon the first input, a first precision amount representing how precisely a first path defined by the first input corresponds to a predetermined path, wherein the first precision amount varies based on a magnitude of a difference between the first path and the predetermined path;

determining, based upon the second input, a second precision amount representing how precisely a second path defined by the second input corresponds to the predetermined path, wherein the second precision amount varies based on a magnitude of a difference between the second path and the predetermined path;

performing processing of moving an object within a virtual game space at least on the basis of the first precision amount and the second precision amount; and displaying a game image based upon the virtual game space on the display.

21. An apparatus comprising:

a display;

an input device for designating input positions; and processing circuitry coupled to the display and to the input device, the processing circuitry configured to:

receive input positions designated using the input device;

determine a precision amount indicative of how precisely the designated input positions correspond to back and forth movement along a predetermined path displayed on the display, wherein the precision amount varies based on a magnitude of a difference between the designated input positions and the predetermined path;

move an object in a three-dimensional virtual space based on the determined precision amount; and generate an image of the virtual space for display on the display.

22. The apparatus according to claim 21, wherein the input device comprises a touch-screen.

23. The apparatus according to claim 21, wherein the input device comprises a pointing device.

24. The apparatus according to claim 21, wherein the processing circuitry is further configured to determine a speed associated with designating the input positions using the input device and to move the object in the virtual space based on the determined precision amount and speed.

25. The apparatus according to claim 21, wherein the processing circuitry is further configured to determine a smoothness associated with designating the input positions using the input device and to move the object in the virtual space based on the determined precision amount, speed and smoothness.

26. The apparatus according to claim 21, wherein the display comprises an autostereoscopic display.

27. The apparatus according to claim 21, embodied as a cellular telephone.

28. The apparatus according to claim 21, embodied as a game apparatus.

* * * * *